US008160837B2

(12) United States Patent
Cormode et al.

(10) Patent No.: US 8,160,837 B2
(45) Date of Patent: Apr. 17, 2012

(54) METHODS AND APPARATUS TO DETERMINE STATISTICAL DOMINANCE POINT DESCRIPTORS FOR MULTIDIMENSIONAL DATA

(75) Inventors: Graham Cormode, Summit, NJ (US); Philip Korn, New York, NY (US); Divesh Srivastava, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 620 days.

(21) Appl. No.: 12/334,252

(22) Filed: Dec. 12, 2008

(65) Prior Publication Data
US 2010/0153064 A1   Jun. 17, 2010

(51) Int. Cl.
*G06F 17/18* (2006.01)
(52) U.S. Cl. .......... 702/179; 707/769; 707/E17.03; 707/999.107; 707/999.002; 382/162; 382/167; 342/90; 342/192; 342/146
(58) Field of Classification Search .......... 702/179; 707/600, 769, 999.002, 999.03, 776, E17.03; 382/168, 103; 342/90, 192, 193, 195, 146; 345/650, 661, 676, 156
See application file for complete search history.

(56) References Cited

U.S. PATENT DOCUMENTS

| | | | |
|---|---|---|---|
| 6,108,658 A | 8/2000 | Lindsay et al. | |
| 6,341,284 B1 * | 1/2002 | Floratos et al. | ........................ 1/1 |
| 6,343,288 B1 | 1/2002 | Lindsay et al. | |
| 6,636,860 B2 | 10/2003 | Vishnubhotla | |
| 6,704,721 B1 * | 3/2004 | Hellerstein | ........................ 1/1 |
| 6,799,181 B2 | 9/2004 | Vishnubhotla | |
| 6,820,089 B2 | 11/2004 | Vishnubhotla | |
| 7,352,321 B2 * | 4/2008 | Szajnowski et al. | ............. 342/90 |
| 7,657,503 B1 * | 2/2010 | Cormode et al. | ...... 707/999.002 |
| 7,730,019 B1 * | 6/2010 | Graham | ................................ 1/1 |
| 2003/0014420 A1 | 1/2003 | Jessee et al. | |
| 2003/0030637 A1 | 2/2003 | Grinstein et al. | |
| 2004/0010505 A1 | 1/2004 | Vishnubhotla | |
| 2005/0043896 A1 * | 2/2005 | Braun et al. | ........................ 702/19 |
| 2005/0047648 A1 * | 3/2005 | Newman et al. | ............... 382/162 |
| 2005/0193015 A1 * | 9/2005 | Logston et al. | ............ 707/104.1 |
| 2006/0072816 A1 * | 4/2006 | Szajnowski et al. | ........... 382/168 |

(Continued)

OTHER PUBLICATIONS

Cormode et al., "Summarizing Two-Dimensional Data with Skyline-Based Statistical Descriptors," in the Proceedings of the 20th International Conference on Scientific and Statistical Database Management, SSDBM 2008, Jul. 2008 (pre-publication version, 18 pages).

(Continued)

*Primary Examiner* — Carol Tsai
(74) *Attorney, Agent, or Firm* — Hanley, Flight & Zimmerman, LLC

(57) ABSTRACT

Methods and apparatus to determine statistical dominance point descriptors for multidimensional data are disclosed. An example method disclosed herein comprises determining a first joint dominance value for a first data point in a multidimensional data set, data points in the multidimensional data set comprising multidimensional values, each dimension corresponding to a different measurement of a physical event, the first joint dominance value corresponding to a number of data points in the multidimensional data set dominated by the first data point in every dimension, determining a first skewness value for the first data point, the first skewness value corresponding to a size of a first dimension of the first data point relative to a combined size of all dimensions of the first data point, and combining the first joint dominance and first skewness values to determine a first statistical dominance point descriptor associated with the first data point.

20 Claims, 21 Drawing Sheets

U.S. PATENT DOCUMENTS

| | | | |
|---|---|---|---|
| 2006/0287607 A1* | 12/2006 | Sackellares et al. | 600/544 |
| 2007/0136285 A1 | 6/2007 | Cormode et al. | |
| 2008/0046455 A1 | 2/2008 | Behm et al. | |
| 2008/0133454 A1 | 6/2008 | Markl et al. | |
| 2010/0153379 A1* | 6/2010 | Cormode et al. | 707/723 |
| 2010/0223276 A1* | 9/2010 | Al-Shameri et al. | 707/769 |

OTHER PUBLICATIONS

Cormode et al., "Space- and Time-Efficient Deterministic Algorithms for Biased Quantiles over Data Streams," pp. 263-272, Proceedings of the twenty-fifth ACM SIGMOD-SIGACT-SIGART symposium on Principles of database systems, held in Chicago, USA, Jun. 26-28, 2006 (10 page).

Cormode et al., "Finding Frequent Items in Data Streams," pp. 1530-1541, vol. 1, Issue 2, Proceedings of the VLDB Endowment, Aug. 2008 (12 pages).

Babcock et al., "Models and Issues in Data Stream Systems," Proceedings of the twenty-first ACM SIGMOD-SIGACT-SIGART symposium on Principles of database systems, held in Madison, USA, 2002 (30 pages).

Borzsonyi et al., "The Skyline Operator," Proceedings of the 17th International Conference on Data Engineering, 2001 (20 pages).

Bruno et al., "STHoles: A Multidimensional Workload-Aware Histogram," pp. 211-222, vol. 30, Issue 2, ACM SIGMOD Record, held in Santa Barbara, USA, on May 21-24, 2001 (12 pages).

Chan et al., "On High Dimensional Skylines," pp. 478-495, vol. 3896, Advances in Database Technology (EDBT 2006), 10$^{th}$ International Conference on Extending Database Technology, held in Munich, Germany, on Mar. 26-31, 2006 (18 pages).

Chaudhuri, Probal, "On a Geometric Notion of Quantiles for Multivariate Data," pp. 862-872, vol. 91, No. 434, Journal of the American Statistical Association, Jun. 1996 (12 pages).

Cormode et al., "Holistic UDAFs at Streaming Speeds," pp. 35-46, International Conference on Management of Data, Proceedings of the 2004 ACM SIGMOD International Conference on Management of Data, held in Paris, France, 2004 (12 pages).

Cranor et al., "Gigascope: A Stream Database for Network Applications," pp. 647-651, International Conference on Management of Data, Proceedings of the 2003 ACM SIGMOD international conference on Management of data, held in San Diego, USA, on Jun. 9-12, 2003 (5 pages).

Einmahl et al., "Generalized Quantile Processes," pp. 1062-1078, vol. 20, No. 2, The Annals of Statistics, 1992 (17 pages).

Eppstein, David, "ICS 280, Spring 1999: Computational Statistics," Department of Information and Computer Sciences of University of California, Irvine, Graduate Seminar on Computational Statistics, held on Apr. 7-Jun. 9, 1999 (4 pages).

Goncalves et al., "Top-k Skyline: A Unified Approach," pp. 790-799, vol. 3762, Lecture Notes in Computer Science, On the Move to Meaningful Internet System 2005: OTM Workshops, 2005 (10 pages).

Greenwald et al., "Space-Efficient Online Computation of Quantile Summaries," pp. 58-66, vol. 30, Issue 2, ACM SIGMOD Record, published in Jun. 2001 (9 pages).

Hershberger et al., "Adaptive Spatial Partitioning for Multidimensional Data Streams," pp. 97-117, vol. 46, Issue 1, Algorithmica, published in Sep. 2006 (18 pages).

Johnson et al., "Fast Computation of 2-Dimensional Depth Contours," pp. 224-228, Proceedings of Fourth International Conference on Knowledge Discovery and Data Mining, held in 1998 (5 pages).

Koltchinskii, V. I., "M-Estimation, Convexity and Quantiles," pp. 435-477, vol. 25, No. 2, The Annals of Statistics, 1997 (43 pages).

Kumar et al., "Data Streaming Algorithms for Efficient and Accurate Estimation of Flow Size Distribution," pp. 177-188, Joint International Conference on Measurement and Modeling of Computer Systems, Proceedings of the joint international conference on Measurement and modeling of computer systems, held in New York, USA, on Jun. 12-16, 2004 (12 pages).

Lin et al., "Selecting Stars: The κ Most Representative Skyline Operator," pp. 86-95, IEEE 23$^{rd}$ International Conference, held in Istanbul, Turkey, on Apr. 15-20, 2007 (10 pages).

Muralikrishna et al., "Equi-Depth Histograms for Estimating Selectivity Factor for Multi-Dimensional Queries," pp. 28-36, Proceedings of ACM SIGMOD, 1988 (9 pages).

Muthukrishnan, S., "Data Streams: Algorithms and Applications," vol. 1, Issue 2, Foundations and Trends in Theoretical Computer Science, Mar. 10, 2005 (39 pages).

Papadias et al., "Progressive Skyline Computation in Database Systems," pp. 41-82, vol. 30, No. 1, ACM Transactions on Database Systems, Mar. 2005 (42 pages).

Shrivastava et al., "Medians and Beyond: New Aggregation Techniques for Sensor Networks," pp. 239-249, Conference on Embedded Networked Sensor Systems, Proceedings of the 2nd international conference on Embedded networked sensor systems, held in Baltimore, USA, on Nov. 3-5, 2004 (11 pages).

Suri et al., "Range Counting over Multidimensional Data Streams," pp. 160-169, Annual Symposium on Computational Geometry, Proceedings of the twentieth annual symposium on Computational geometry, held in Brooklyn, USA, on Jun. 8-11, 2004 (10 pages).

Thaper et al., "Dynamic Multidimensional Histograms," pp. 428-439, International Conference on Management of Data, Proceedings of the 2002 ACM SIGMOD international conference on Management of data, held in Madison, USA, on Jun. 4-6, 2002 (12 pages).

GSP Services, Inc., "FreeBSD Man Pages, Manual Reference Pages—BPF (4)," article retrieved from http://www.gsp.com/cgi-bin/man.cgi?section=4&topic=bpf on Mar. 31, 2009 (8 pages).

Ethereal, "Ethereal—Interactively Dump and Analyze Network Traffic," article retrieved from http://www.ethereal.com/docs/man-pages/ethereal.1.html on Mar. 31, 2009 (32 pages).

Gilbert et al., "How to Summarize the Universe: Dynamic Maintenance of Quantiles," pp. 454-465, Very Large Data Bases, Proceedings of the 28th international conference on Very Large Data Bases, held in Hong Kong, China, in 2002 (12 pages).

Papadimitriou et al., "Multiobjective Query Optimization," pp. 52-59, Symposium on Principles of Database Systems, Proceedings of the twentieth ACM SIGMOD-SIGACT-SIGART symposium on Principles of database systems, held in Santa Barbara, USA, in 2001 (7 pages).

Yiu et al., "Efficient Quantile Retrieval on Multi-Dimensional Data," pp. 167-185, vol. 3896, Advances in Database Technology: (EDBT 2006), Proceedings of the 10$^{th}$ International Conference on Extending Database Technology, held in Munich, Germany, on Mar. 26-31, 2006 (18 pages).

* cited by examiner

METHODS AND APPARATUS TO DETERMINE STATISTICAL DOMINANCE POINT DESCRIPTORS FOR MULTIDIMENSIONAL DATA

FIELD OF THE DISCLOSURE

This disclosure relates generally to statistical data analysis and, more particularly, to methods and apparatus to determine statistical dominance point descriptors for multidimensional data.

BACKGROUND

Many types of data sets determined by measuring physical events contain data points that can be characterized as having more than one dimension. Examples of such multidimensional data sets include financial transaction data sets containing data points representing price in one dimension and volume in another dimension, Internet protocol (IP) network flow data sets containing data points representing numbers of packets in one dimension and packet sizes in another dimension, etc. In addition to possessing statistical characteristics in each individual dimension, such multidimensional data sets can also possess statistical relationships between dimensions. For one-dimensional data, quantiles representing statistical rankings of the data can be intuitive, robust statistical point descriptors of the underlying one-dimensional data. However, applying such single-dimensional quantile methods to summarize a multidimensional data set typically ignores the potentially rich statistical information characterizing the inter-dimensional relationship(s) between the data points. Also, existing methods to determine multidimensional quantile descriptors typically yield algebraic curves or region-based statistical descriptors, rather than statistical point descriptors capable of being associated with particular data points in an underlying multidimensional data set.

DETAILED DESCRIPTION

Figure 1:
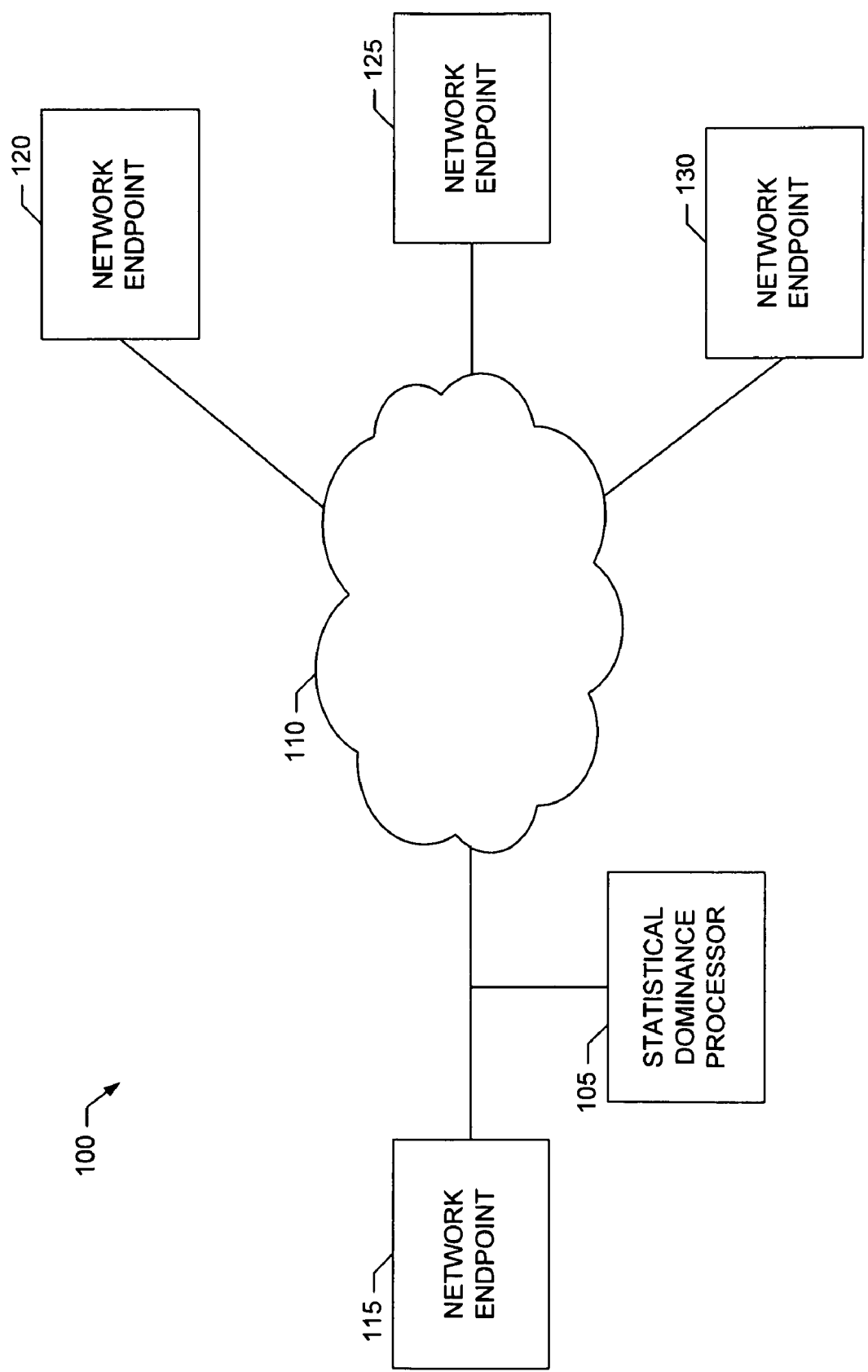
FIG. 1 is block diagram of an example environment of use for an example statistical dominance processor implemented according to the methods and/or apparatus described herein.

Methods and apparatus to determine statistical dominance point descriptors for multidimensional data are disclosed herein. An example statistical dominance processor described operates to determine statistical dominance point descriptors for a multidimensional data set. In an example operating scenario, the multidimensional data set includes data points, each having a multidimensional value where each dimension of the multidimensional value corresponds to a different measurement of a physical event. Such measurements of physical events could correspond to monitoring of data network traffic, processing of examination scores, etc. The statistical dominance point descriptors determined by the example statistical dominance processor characterize the statistical relationships among data points in the multidimensional data set, including the inter-dimensional relationships between the data points.

In an example implementation, a statistical dominance point descriptor includes a joint dominance value (also referred to as "$\phi$-dominance" herein) and a skewness value (also referred to as "$\alpha$-skewness" herein). In such an example, the statistical dominance processor operates to determine a joint dominance value and a skewness value for each data point in the multidimensional data set, the combination of which is also unique for the particular data point. In the fields of probability and statistics, each dimension of a multidimensional data set corresponds to a separate marginal distribution of the joint distribution governing the multidimensional data set. Thus, joint dominance refers to the dominance of a particular data point examined for each marginal (or dimension) of the joint distribution of data points in the multidimensional data set. For example, the statistical dominance processor may determine the joint dominance value for a particular data point to be a number, percentage, fraction, etc., of data points in the multidimensional data set that are dominated by the particular data point in every dimension. As described in greater detail below, for data points having separate dimensional values in each dimension, a first data point is said to jointly dominate another data point when each dimensional value of the first data point is greater than or equal to the corresponding dimensional value of the second data point.

The example statistical dominance processor may also determine a skewness value for a particular data point to correspond to a size of a first dimension of the particular data point relative to a combined size of all dimensions of the particular data point. In an example implementation, the size of the first dimension of the particular data point corresponds to its rank n the first dimension relative to the other data points, and the combined size of all dimensions of the particular data point corresponds to a combination of the data point's ranks for all dimensions. For example, as described in greater detail below, for data points having separate dimensional values in each dimension, the skewness value of a first data point is given by a ratio of the rank of the first data point relative to the other data points in one particular dimension to a sum of the ranks of the first data point relative to the other data points in all dimensions.

The combination of the joint dominance and skewness values determined for a particular data point form the statistical dominance point descriptor for the point and represent a relative, multidimensional dominance, or strength, of the particular point relative to the other data points in the multidimensional data set. For example, the joint dominance value represents how many of the other data points are dominated by the particular data point in all dimensions, whereas the skewness value represents how much the disparity between the dimensions of the particular data point dominates the dimensional disparities of the other data points. Additionally, and as described in detail below, the combination of joint dominance and skewness values included in a statistical dominance point descriptor associated with a particular point uniquely describe statistical properties of the data point relative to all other data points in the multidimensional data set.

In the preceding example implementation, the statistical dominance processor operated to determine statistical dominance point descriptors for data points in the multidimensional data set. In another example implementation, the statistical dominance processor is provided an input statistical dominance point descriptor in the form of specified joint dominance and skewness values and operates to determine the particular data point associated with the input statistical dominance point descriptor. Because statistical dominance point descriptors are unique to their respective data points, the example statistical dominance processor can return a single particular data point whose actual (or determined) statistical dominance point descriptor is substantially equal to, or most closely related to, the specified input statistical dominance point descriptor.

In still other example implementations, the statistical dominance processor operates to determine joint dominance quantours and/or skewness radials. As described in greater detail below, a joint dominance quantour (also referred to as a "joint dominance quantile contour," a "φ-dominance quantile contour," a "φ-dominance quantour," a "dominance quantour" or "φ quantour" herein) represents a skyline of a subset of data points having associated joint dominance values not exceeding a particular specified joint dominance value. Similarly, as described in greater detail below, a skewness radial (also referred to as an "α-radial" herein) represents a skyline of a subset of data points having skewness values not exceeding a particular specified skewness value. Such joint dominance quantours and skewness radials can be used to identify, bound, etc. subsets of data points having particular joint dominance and/or skewness characteristics.

In at least some example implementations, the methods and apparatus to determine statistical dominance point descriptors for multidimensional data described herein offer substantial benefits over existing statistical characterization techniques. For example, unlike existing one-dimensional techniques, the methods and apparatus to determine statistical dominance point descriptors described herein characterize the statistical relationships of data points between dimensions. Additionally, unlike existing multidimensional techniques, the methods and apparatus to determine statistical dominance point descriptors described herein yield point descriptors uniquely associated with particular data points in the multidimensional data set.

For example, a quantile-quantile (QQ) plot is an existing data analysis tool for comparing two, one-dimensional distributions. In an example QQ plot implementation, values from a first distribution form an x-axis of the plot, and values from a second distribution form the y-axis. If $x_\psi$ is the $\psi$-quantile of the first distribution and $y_\psi$ is the $\psi$-quantile of the second distribution, then the pair $(x_\psi, y_\psi)$ is a point on the QQ-plot. However, unlike the statistical dominance point descriptor methods and apparatus described herein, the QQ plot provides a fundamentally one-dimensional view of the underlying distributions and fails to fully characterize the interrelationships between the dimensions. Additionally, when used to characterize two-dimensional data, a resulting $(x_\psi, y_\psi)$ point on the QQ-plot may not actually correspond to any data point from the two-dimensional data set, unlike the unique, direct association of statistical dominance point descriptors to underlying data points achieved by the example methods and apparatus described herein.

As another example, "onion peeling" techniques have been proposed as a way to order points based on a proximity to a "center" of a data set, which is procedurally defined based on recursively stripping away convex hull layers to determine a contour depth of a point. Tools such as the PolytopeQuantile [data, q] function in Mathematica® use this technique to find multidimensional "q-quantiles" representing contours at each 1/q-th depth. However, because an arbitrary number of points may exist at any given depth, points are not uniquely identified by a q-quantile. Thus, these "onion peeling" techniques do not yield point descriptors. Other approaches, such as multidimensional equidepth histograms have similar deficiencies and are fundamentally ad hoc in nature.

As yet another example, the skyline operator has been proposed as a technique to determine a subset of data points not dominated by other data points. Furthermore, generalized skyline operators, referred to as k-skybands, can be used to represent data points not dominated by more than a particular number (k) of data points. Skylines are also known as Pareto curves and have been studied in the context of multi-objective optimization. However, skylines and, more generally, k-skybands may contain an arbitrary number of data points from the data set (perhaps even the entire data set) and, therefore, are also not point descriptors that can be uniquely associated with data points in an underlying multidimensional data set.

Turning to the figures, a block diagram of an example environment of use 100 for an example statistical dominance processor 105 implemented according to the methods and/or apparatus described herein is illustrated in FIG. 1. The example environment of use 100 includes a data network 110 configured to interconnect multiple network endpoints 115, 120, 125 and 130. Although the example environment of use 100 depicted in FIG. 1 envisions a data networking application of the example statistical dominance processor 105, the example statistical dominance processor 105 may be used in any application in which multidimensional data is available for analysis.

The example data network 110 included in the example environment of use 105 may be implemented by any type of data networking technology. For example, the data network 110 may be implemented by a local area network (LAN), a wide area network (WAN), a wireless LAN and/or WAN, a cellular network, the Internet, etc., and/or any combination thereof. Additionally, the example network endpoints 115, 120, 125 and 130 may be implemented by any type or combination of network endpoints. For example, some or all of the example network endpoints 115, 120, 125 and 130 could be implemented using individual networkable devices, such as personal computers, workstations, servers, personal digital assistants (PDAs), mobile telephones, etc. Additionally or alternatively, some or all of the example network endpoints 115, 120, 125 and 130 could be implemented by multiple networkable devices forming one or more data networks to be interconnected by the example data network 110.

In the illustrated example environment of use 100, the example statistical dominance processor 105 is configured to obtain a multidimensional data set including data points determined by measuring the data network traffic carried by the example data network 110. In the illustrated example, each data point corresponds to a multidimensional value having two or more dimensions, with each dimension corresponding to a different measurement of the data network traffic. For example, a first dimensional value of a data point in the obtained multidimensional data set could correspond to a number of packets in a particular data flow measured during a particular measurement interval. In such an example, a second dimensional value of the data point could correspond to a measured size (such as measured instantaneous or average numbers of bytes) of the packets during the measurement interval.

In another example implementation, the example statistical dominance processor 105 is configured to obtain the multidimensional data set by querying and/or downloading the multidimensional data set from one or more of the example network endpoints 115, 120, 125 and 130. In such an example implementation, one or more of the example network endpoints 115, 120, 125 and 130 act as one or more data repositories for collecting and/or storing data points determined by measuring one or more physical events. For example, one or more of the example network endpoints 115, 120, 125 and 130 could store the data points determined by measuring the data network traffic described in the preceding example. In another example, one or more of the example network endpoints 115, 120, 125 and 130 could store multidimensional data sets including data points representative of examination scores for examination taken by a group of participants. In the latter example, each data point could correspond to a multidimensional value having two or more dimensions, with each dimension corresponding to a different component score used to determine an overall examination for a particular participant. In yet another example, one or more of the example network endpoints 115, 120, 125 and 130 could store multidimensional data sets including data points representative of financial data measured over a period of time. In still other examples, the multidimensional data sets stored on the example network endpoints 115, 120, 125 and/or 130 could include multidimensional data points corresponding to measured observations of almost any type of physical event, with each dimension corresponding to a different attribute of the measured physical event.

Having obtained a multidimensional data set for analysis, the example statistical dominance processor 105 is configured to then process the multidimensional data set to determine statistical dominance point descriptors associated with the multidimensional data points. In the illustrated example, the statistical dominance processor 105 operates to determine statistical dominance point descriptors that each include a joint dominance value (or a "φ-dominance") and a skewness value (or an "α-skewness"). For example, the statistical dominance processor 105 is configured to determine a joint dominance value for a particular data point that corresponds to a number (or percentage, fraction, etc.) of data points in the multidimensional data set that are jointly dominated by the particular data point. As mentioned above, a particular data point jointly dominates another data point when each and every dimensional value of the particular data point is greater than or equal to a corresponding dimensional value of the jointly dominated data point. (As used herein, two values are considered equal if they are exactly equal or at least substantially equal to each other within some numerical precision/accuracy for determining equality).

Additionally, the example statistical dominance processor 105 is configured to determine a skewness value for the particular data point that corresponds to a size of a first dimension of the particular data point relative to a combination of the sizes of all dimensions of the particular data point. For example, the skewness value determined by the example statistical dominance processor 105 may correspond to the rank of the particular data point relative to the other data points in a first, specified dimension (such as the y-dimension in the case of two-dimensional data points having x and y dimensions) divided by the sum of each rank of the particular data point relative to the other data points in every dimension.

In an example implementation, the statistical dominance processor 105 is also configured to determine which particular data point in the multidimensional data set is associated with a specified statistical dominance point descriptor or, in other words, a specified combination of joint dominance and skewness values. Additionally or alternatively, the example statistical dominance processor 105 is also configured to determine joint dominance quantours and/or skewness radials as described above.

Figure 2:
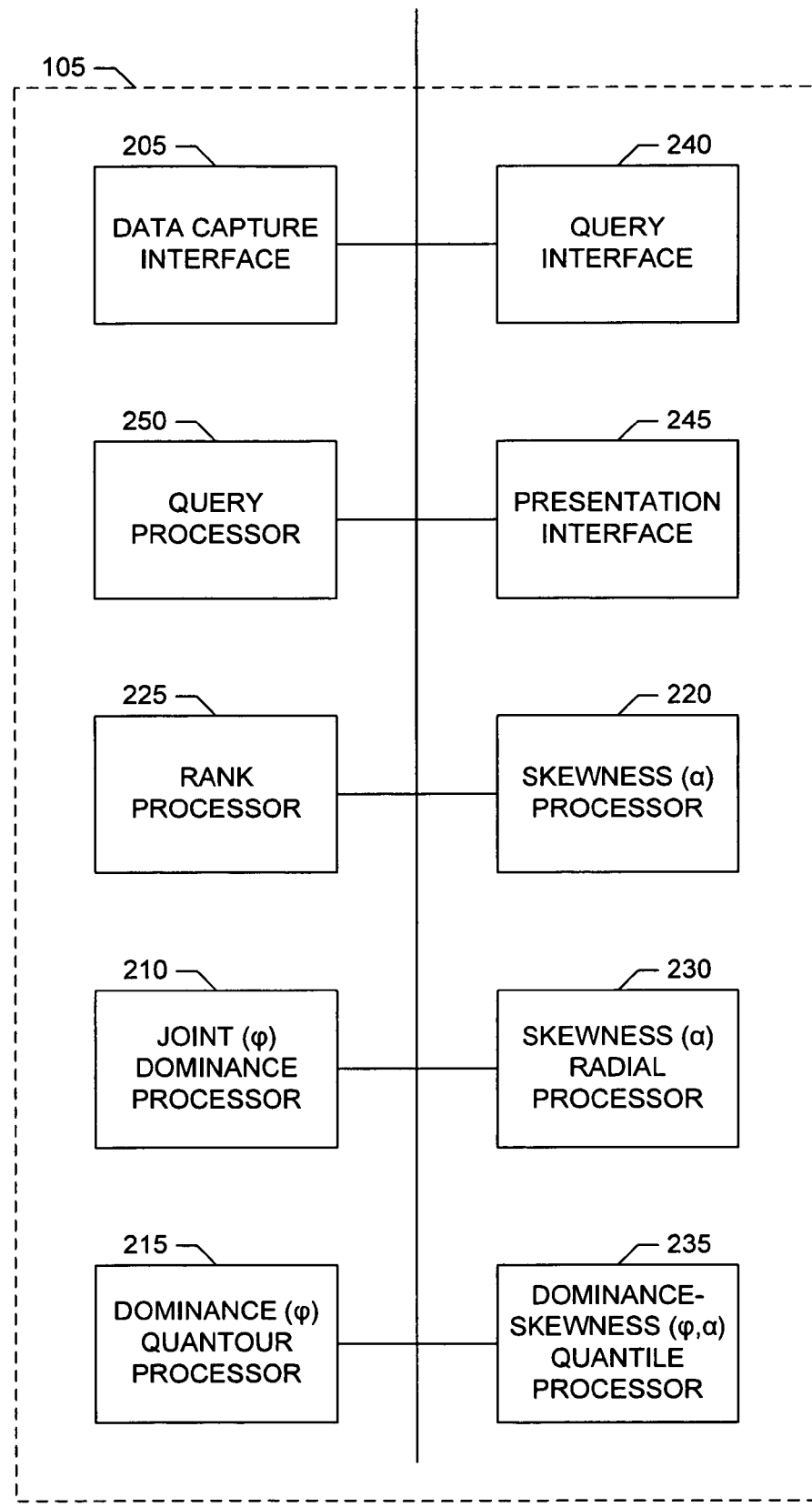
FIG. 2 is a block diagram of an example implementation of the example statistical dominance processor of FIG. 1.

An example implementation of the statistical dominance processor 105 of FIG. 1 is illustrated in FIG. 2. Before proceeding with a detailed description of FIG. 2, a review of one-dimensional rank determination and one-dimensional quantiles is provided. To define one-dimensional ranks and one-dimensional quantiles, consider an input one-dimensional data set including N items. After sorting the one-dimensional data set, the item a which is the $i^{th}$ item in the sorted data set is defined to have a rank equal to i or, alternatively, a is said to dominate i data points. In other words, an item a (which may or may not be actually present in the input one-dimensional data set), has a rank, denoted by rank(a), equal to its position (actual or potential) within the sorted data set. Furthermore, the rank of an item that appears multiple times in the input data set is a range of positions at which the same item occurs in the sorted data set.

Next, a one-dimensional quantile for a given quantile value φ corresponds to an item a whose rank is φN. More generally, using ε to denote a permitted tolerance for rank error, the φ-quantile corresponds to one or more items a whose rank(s) satisfy Equation 1 below.

$$(\phi-\epsilon)N \leq \text{rank}(a) \leq (\phi+\epsilon)N \qquad \text{Equation 1}$$

For example, finding the median of the data set corresponds to querying for the φ=½-quantile. In the following description, uniform (εN) error guarantees are assumed, although other error guarantees, such as biased guarantees that require higher accuracy for queries near the tail of the distribution can also be supported by the example methods and apparatus described herein.

Turning to FIG. 2, the illustrated example statistical dominance processor 105 includes a data capture interface 205 to obtain a multidimensional data set for subsequent processing. The example data capture interface 205 is capable of obtaining all of the data points included in the multidimensional data set at one time, for example, via a single batch operation. Additionally, the example data capture interface 205 is capable of obtaining the data points sequentially, for example, via a streaming operation. In the illustrated example, each data point represents a multidimensional value, with each dimension of the multidimensional value corresponding to a different measurement of a physical event. As such, a particular data point has a first dimensional value corresponding to a first dimension, a second dimensional value corresponding to a second dimension, and so on. In the description that follows, the data points included in the multidimensional data set obtained by the example data capture interface 205 are assumed to have two-dimensions, with the first dimension also referred to as the x-dimension, and second dimension also referred to as the y-dimension. However, other higher-dimensional data sets are readily supported, as described in greater detail below. Furthermore, in the description that follows, the two-dimensional data set is referred to mathematically as the data set P and is assumed to include N data points, each from a domain of size U such that each dimensional value is in the range $[0, \ldots, U-1]$.

The example statistical dominance processor 105 of FIG. 2 also includes a joint dominance processor 210 configured to determine the joint dominance values associated with the data points included in the data set obtained by the example data capture interface 205. In the illustrated example, the joint dominance processor 210 determines a joint dominance value for a particular point to be a fraction of the data points jointly dominated by the particular point in each and every dimension. Mathematically, the example joint dominance processor 210 determines the joint dominance value, or the φ-dominance, of a point $p=(p_x,p_y)$ to be the fraction φ of points $q=(q_x,q_y)$ from the input data set that are φ-dominated by p as given by Equation 2 below.

$$q \epsilon P, (q_x \leq p_x) \hat{\ } (q_y \leq p_y) \qquad \text{Equation 2}$$

In other words, the set of points q from the input data set that are φ-dominated by p are those points having x-dimensional values and y-dimensional values that are not greater than the respective x-dimensional and y-dimensional values of p. Then, if rank(p) is the number of input data points $q=(q_x,q_y)$ such that p φ-dominates q, which may be a single value or range of values, then the φ-dominance of p, denoted as φ(p), is rank(p)/N.

Additionally, the example statistical dominance processor 105 of FIG. 2 includes a dominance quantour processor 215 to process the joint dominance values determined by the example joint dominance processor 210 to determine corresponding joint dominance quantile contours, referred to as quantours herein, for particular joint dominance values φ. In the illustrated example, the dominance quantour processor 215 implements a skyline-like operator that identifies data points with similar joint dominance that are not themselves dominated by other data points. Mathematically, the example dominance quantour processor 215 determines a dominance quantour for a given joint dominance value φ by first determining a subset $P_\phi$ from the input data set P according to Equation 3 below.

$$p_\phi = \{p \epsilon P | \phi(p) \leq \phi\} \qquad \text{Equation 3}$$

Then, the φ-dominance quantile contour (or φ-quantour for short) is the skyline of $P_\phi$ using the φ-dominance relation provided above in Equation 2. Thus the φ-quantour includes data points associated with joint dominance values that are most φ, and that are not dominated by any other points with dominance at most φ. Such an implementation of the dominance quantour, or φ-quantour, is well defined for any $1/N \leq \phi \leq 1$. When φ=1, this maximal quantour "touches the sky" or, in other words, is equivalent to the standard skyline.

The example statistical dominance processor 105 of FIG. 2 further includes a skewness processor 220 configured to determine skewness values associated with the data points included in the data set obtained by the example data capture interface 205. In the illustrated example, the skewness processor 220 determines a skewness value for a particular point to be a size, or rank, of the y-dimension of the particular data point relative to a combination of the sizes, or ranks, of the x-dimension and y-dimension of the particular data point. Mathematically, the example skewness processor 220 determines the skewness value, or the α-skewness, denoted as α(p), of a point p as given by Equation 4 below.

$$\alpha(p) = \frac{rank_y(p)}{rank_x(p) + rank_y(p)} \qquad \text{Equation 4}$$

In Equation 4, $rank_x(p)$ is the one-dimensional rank of the point p along the x-dimension, and $rank_y(p)$ is the one-dimensional rank of the point p along the y-dimension. As such, α(p) lies in the range $0<\alpha(p)<1$. Intuitively, α(p) represents how skewed the data point p is in terms of the ordering of its two dimensions, and α(p)=½ indicates that the data point p is balanced between dimensions. Furthermore, if the data points in the original data set are all reflected across the line y=x to generate a new point set $P^r = \{p^r = (p_y, p_x) | (p_x, p_y) \epsilon P\}$, then the skewness values for the new data points $P^r = \{p^r\}$ are $\alpha(p^r)=1-\alpha(p)$, demonstrating the symmetry of the α-skewness operator.

To determine the one-dimensional ranks $rank_x(p)$ and $rank_y(p)$, the example statistical dominance processor 105 of FIG. 2 includes a rank processor 225. The example rank processor 225 operates to determine a one dimensional rank for a particular data point and for a particular dimension, such as the rank along the x-dimension or the rank along the y-dimension, by sorting the input data points along the particular dimension and then determining the position of the particular point in the sorted set of data points. The example rank processor 225 performs data sorting using any appropriate data sorting technique, such as any data sorting technique optimized to perform data sorting in O(N log N) operations.

Furthermore, the example statistical dominance processor 105 of FIG. 2 includes a skewness radial processor 230 to process the skewness values determined by the example skewness processor 220 to determine corresponding skewness radials for particular skewness values α. In the illustrated example, the skewness radial processor 230 implements a skyline-like operator that identifies a skewness radial to be a skyline of a subset of data points having skewness values not exceeding the specified skewness value α. Mathematically, the example skewness radial processor 230 determines a skewness radial for a given skewness value α by first determining a subset $P_\alpha$ from the input data set P according to Equation 5 below.

$$P_\alpha = \{p \epsilon P | \alpha(p) \leq \alpha\}. \qquad \text{Equation 5}$$

In the subset $P_\alpha$, a point p α-dominates (or radially dominates) q if $p_y > q_y$ and $p_x < q_x$ (and hence $\alpha(p) > \alpha(q)$). Using this definition of α-dominance, the example skewness radial processor 230 then determines the α-radial based for $P_\alpha$, as the skyline of $P_\alpha$ using the α-dominance relation.

To determine statistical dominance point descriptors using the joint dominance values determined by the example joint dominance processor 210 and the skewness values determined by the skewness processor 220, the example statistical dominance processor 105 of FIG. 2 includes a dominance-skewness quantile processor 235. For example, to determine the statistical dominance point descriptor associated with a particular point p, the dominance-skewness quantile processor 235 combines the joint dominance value $\phi(p)$ and the skewness value $\alpha(p)$ to form the statistical dominance point descriptor $(\phi,\alpha)$ associated with the point p.

The preceding definitions of $\phi$-dominance and $\alpha$-dominance ensure that, given any two points p and q, either one $\phi$-dominates the other or one $\alpha$-dominates the other. Furthermore, it can be seen from the preceding descriptions that the dominating point in both $\phi$-dominance and $\alpha$-dominance will be the one having a maximum y value. If both data points share the same y value, then the dominating point is the one with the greater x value. As such, a statistical dominance point descriptor $(\phi,\alpha)$ that is a combination of $\phi$-dominance and $\alpha$-dominance is a unique point descriptor or, in other words, can be associated uniquely with an individual data point in the input data set.

With this uniqueness in mind, the example dominance-skewness quantile processor 235 is also configured to support identification of particular data points from the input data set that are associated with specified statistical dominance point descriptor values $(\phi,\alpha)$. A particular data point associated with a statistical dominance point descriptor value $(\phi,\alpha)$ denotes the $(\phi,\alpha)$-quantile for the input data set, thereby extending the concept of quantiles into multiple dimensions. Mathematically, the example dominance-skewness quantile processor 235 determines the $(\phi,\alpha)$-quantile for the input data set (or, in other words, the data point associated with a particular statistical dominance point descriptor values $(\phi,\alpha)$) by first determining the subset of data points $P_\phi$ from the input data set associated with joint dominance values $\phi(p)$ less than or equal to the specified joint dominance value $\phi$, and the subset of data points $P_\alpha$ from the input data set associated with skewness values $\alpha(p)$ less than or equal to the specified skewness value $\alpha$.

Next, the example dominance-skewness quantile processor 235 identifies the subset of data points $P_\phi \cap P_\alpha$ forming the intersection of the $P_\phi$ and $P_\alpha$ data sets. Then, the example dominance-skewness quantile processor 235 determines the skyline of the data set $P_\phi \cap P_\alpha$ based on $\phi$-dominance or, in other words, identifies a subset of data points from the data set $P_\phi \cap P_\alpha$ that are not jointly dominated by any other data point in the data set $P_\phi \cap P_\alpha$. Finally, the example dominance-skewness quantile processor 235 identifies the $(\phi,\alpha)$-quantile for the input data set to be the particular data point determined by taking the skyline of the data set $P_\phi \cap P_\alpha$ based on $\alpha$-dominance after already determining the skyline based on $\phi$-dominance. In other words, the $(\phi,\alpha)$-quantile for the input data set is determined to be the particular data point having a largest skewness value relative to all other data points after taking the skyline of the data set $P_\phi \cap P_\alpha$ based on $\phi$-dominance.

Figure 3:
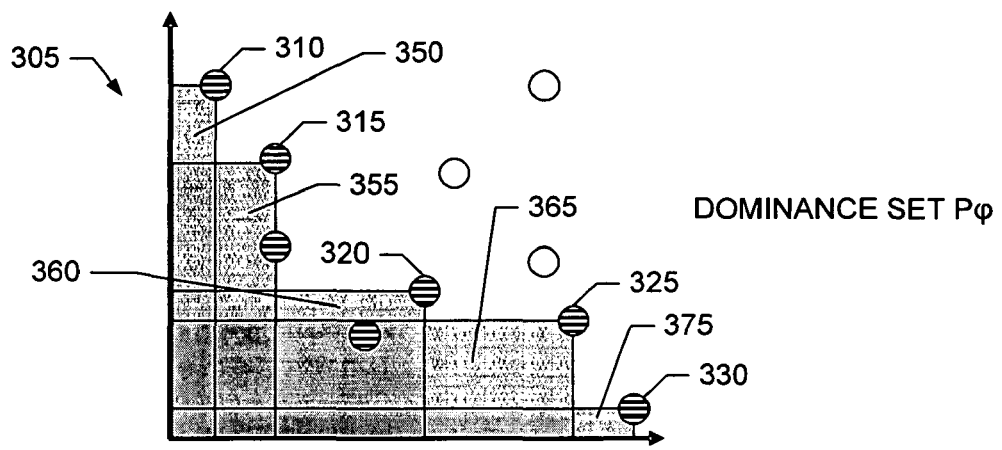
FIGS. 3-5 illustrate an example operation of the example statistical dominance processor of FIG. 2.
Figure 4:
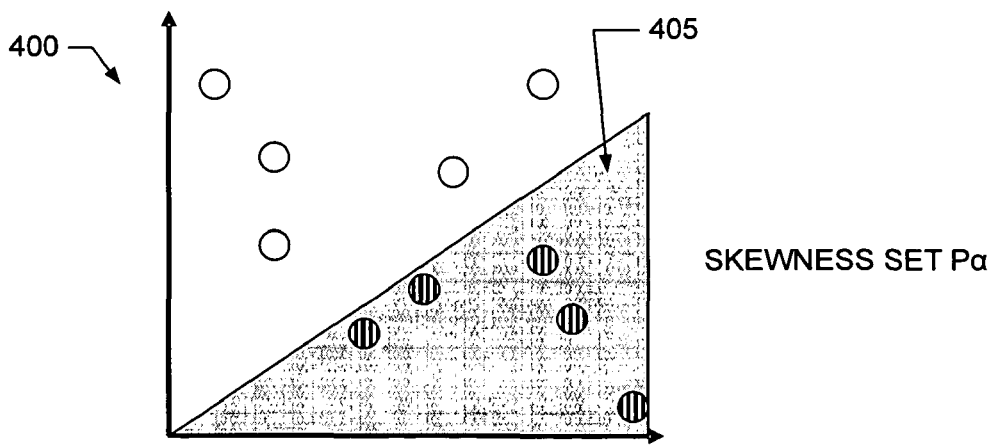
Figure 5:
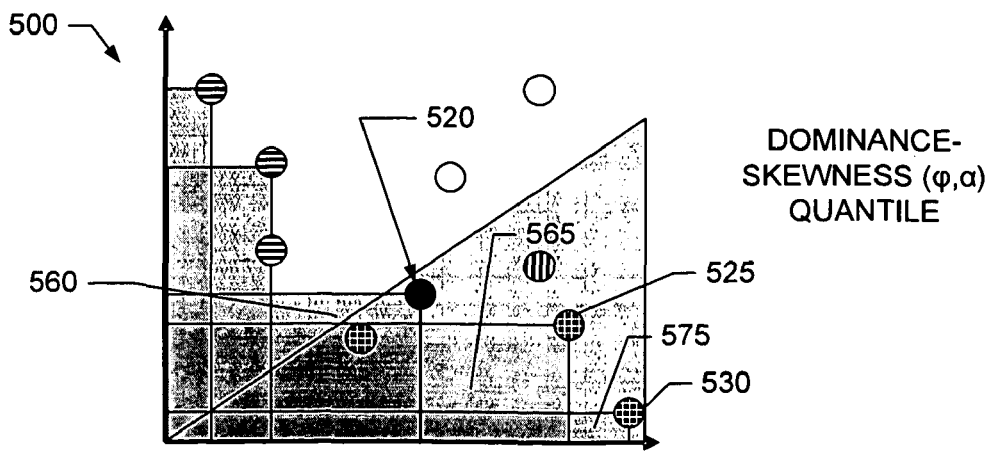

An example sequence of operations that may be performed by the statistical dominance processor 105 of FIG. 2 to determine a $(\phi,\alpha)$-quantile or, in other words, the data point associated with a particular statistical dominance point descriptor values $(\phi,\alpha)$, is depicted by the example graphs 300, 400 and 500 of FIGS. 3, 4 and 5, respectively. The example graph 300 of FIG. 3 depicts an example two-dimensional data set obtained by the example data capture interface 205, with each two-dimensional data point represented by a circle. Each two-dimensional data point is associated with a particular joint dominance value $\phi(p)$ as determined by the example joint dominance processor 210. For a specified joint dominance value $\phi$, the set of data points represented by circles shaded using horizontal lines form the subset $P_\phi$ of data point having joint dominance values $\phi(p) \leq \phi$. Furthermore, each of the data points 310, 315, 320, 325 and 330 jointly dominate any data point lying in the respective regions 350, 355, 360, 365 and 370. Therefore, the data points 310, 315, 320, 325 and 330 for the skyline of $P_\phi$ using the $\phi$-dominance relation and, thus, these data points are the $\phi$-quantour for the input data set for the specified joint dominance value $\phi$.

Next, the example graph 400 of FIG. 4 depicts the same example two-dimensional data set obtained by the example data capture interface 205, with each two-dimensional data point represented by a circle. Each two-dimensional data point is associated with a particular skewness value $\alpha(p)$ as determined by the example skewness processor 220. For a specified skewness value $\alpha$ represented by the line bounding the shaded region 405, the set of data points represented by circles shaded using vertical lines form the subset $P_\alpha$ of data point having skewness values $\alpha(p) \leq \alpha$.

The example graph 500 of FIG. 5 depicts the same example two-dimensional data set obtained by the example data capture interface 205, with each two-dimensional data point represented by a circle. Furthermore, the example graph 500 depicts the subset of data points $P_\phi \cap P_\alpha$ forming the intersection of the $P_\phi$ and $P_\alpha$ data sets as determined by the dominance-skewness quantile processor 235. The subset of data points $P_\phi \cap P_\alpha$ is represented by circles shaded using both horizontal and vertical lines and by a circle shaded in solid black. Additionally, the data point 520, 525 and 530 form the skyline of the data set $P_\phi \cap P_\alpha$ based on $\phi$-dominance or, in other words, are the subset of data points from the data set $P_\phi \cap P_\alpha$ that are not jointly dominated by any other data point in the data set $P_\phi \cap P_\alpha$ (because these data points are located on the vertices of the corresponding shaded regions 560, 565 and 575). Finally, the data point 520 is the $(\phi,\alpha)$-quantile for the input data set for the specified joint dominance value $\phi$ and the specified skewness value $\alpha$ because the data point 520 represents the skyline of the data points 520, 525 and 530 based on $\alpha$-dominance or, in other words, is the data point having the largest skewness value among the data points 520, 525 and 530.

Returning to FIG. 2, the example statistical dominance processor 105 depicted therein further includes a query interface 240 configured to enable specification of query parameters. For example, the query interface 240 is configured to allow specification of whether the example dominance-skewness quantile processor 235 is to provide (or output) statistical dominance point descriptor values $(\phi,\alpha)$ for some or all of the data points included in the input data set obtained by the example data capture interface 205, or whether the example dominance-skewness quantile processor 235 is to provide (or output) one or more particular $(\phi,\alpha)$-quantiles for the input data set that are associated with specified $\phi$ and $\alpha$ combinations. Additionally, the example query interface 240 is configured to allow specification of one or more joint dominance values $\phi$ and/or one or more skewness values $\alpha$ for which $(\phi,\alpha)$-quantiles are to be determined. Furthermore, the example query interface 240 is configured to allow specification of whether one or more dominance $(\phi)$ quantours and/or skewness $(\alpha)$ radials are to be output for the specified joint dominance value(s) $\alpha$ and skewness value(s) $\alpha$.

The example statistical dominance processor 105 of FIG. 2 also includes a presentation interface 245 to output and/or present generated statistical dominance point descriptor information. In the illustrated example, the presentation interface 245 implements a graphical user interface (GUI) to present the statistical dominance point descriptor values $(\phi,\alpha)$, the $(\phi,\alpha)$-quantiles, the dominance $(\phi)$ quantours and/or skewness $(\alpha)$ radials, etc., determined by the example statistical dominance processor 105. Example data presentation outputs supported by the example presentation interface 245 are illustrated in FIGS. 6-15 and discussed in greater detail below.

Figure 16:
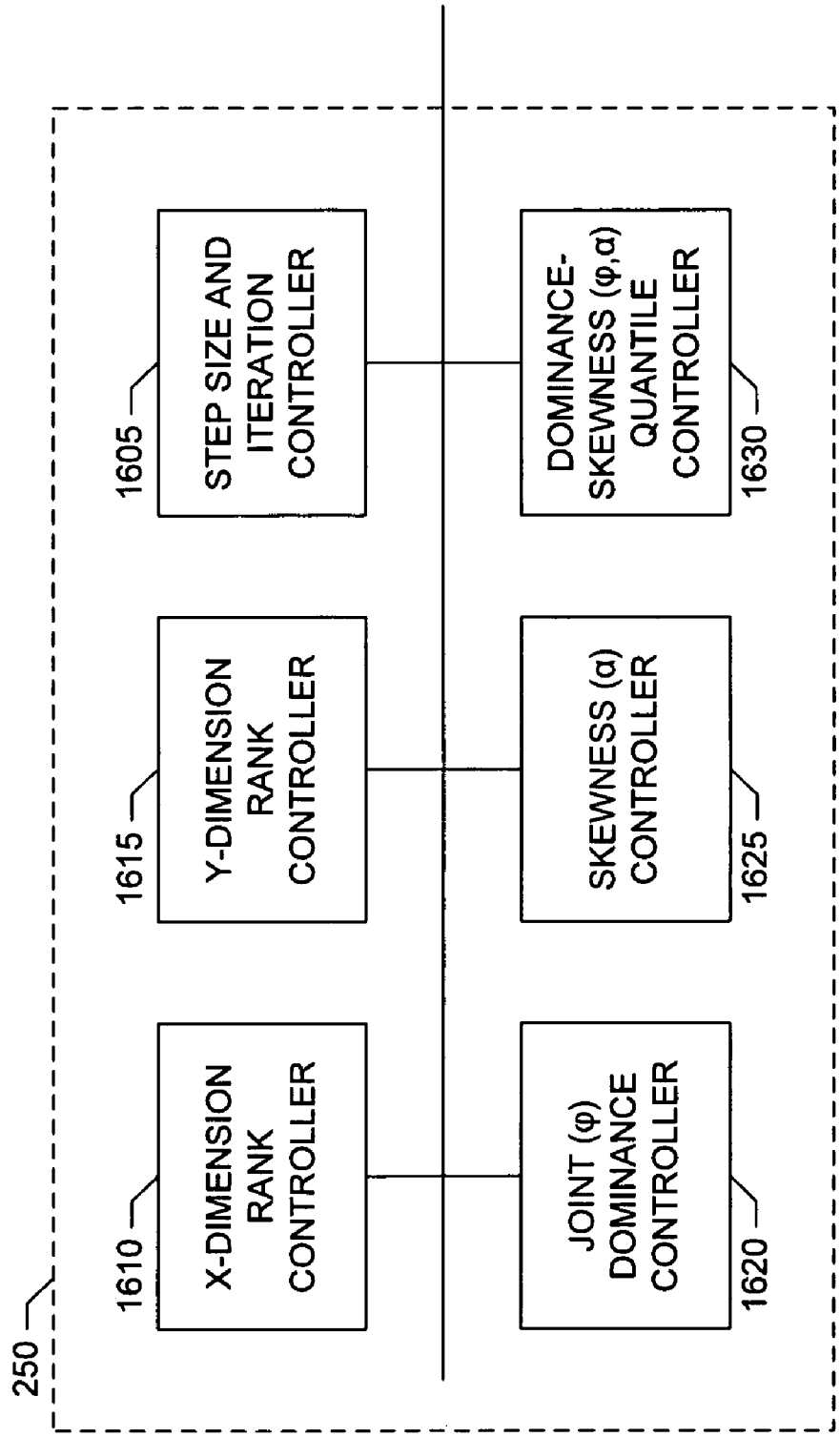
FIG. 16 is a block diagram of a first example query processor that may be used to implement the example statistical dominance processor of FIG. 2.
Figure 17:
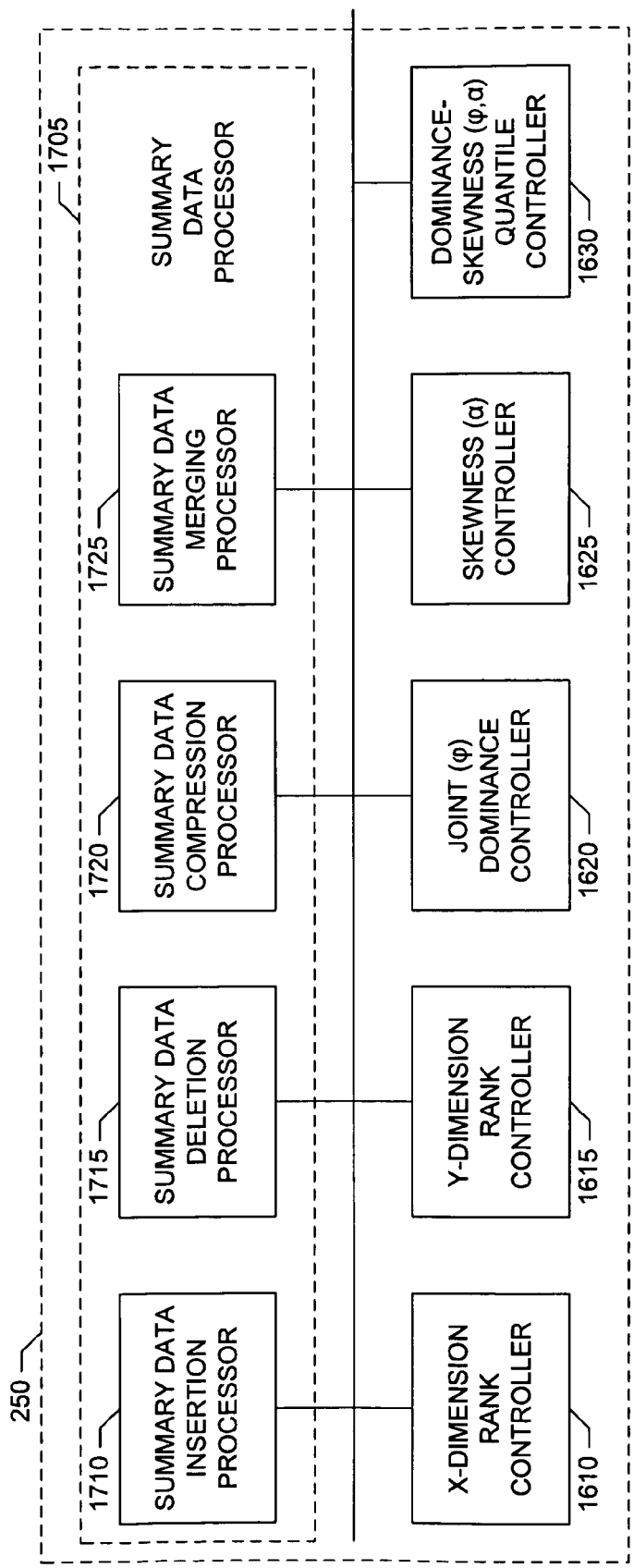
FIG. 17 is a block diagram of a second example query processor that may be used to implement the example statistical dominance processor of FIG. 2.

Additionally, the example statistical dominance processor 105 of FIG. 2 includes a query processor 250 to control operation of the example statistical dominance processor 105 depending upon how the input data set is obtained by the example data capture interface 205. As described above, the example data capture interface 205 is capable of obtaining the data points to be included in the input data set all at once via a batch operation, or sequentially via a streaming operation. As discussed in greater detail below, in the case of data obtained sequentially via the streaming operation, the input data set will be transformed into a summary data set which is updated as each new input data point is obtained. Accordingly, the elements of the example statistical dominance processor 105 will need to be controlled to operate on the summary data set rather than on the individual data points forming the actual input data set. The example query processor 250 facilitates controlling the elements of the example statistical dominance processor 105 to operate on either the individual data points forming the actual input data set or on a reduced, summary data set. Example implementations of the query processor 250 are illustrated in FIGS. 16-17 and discussed in greater detail below.

While an example manner of implementing the statistical dominance processor 105 of FIG. 1 has been illustrated in FIG. 2, one or more of the elements, processes and/or devices illustrated in FIG. 2 may be combined, divided, re-arranged, omitted, eliminated and/or implemented in any other way. Further, the example data capture interface 205, the example joint dominance processor 210, the example dominance quantour processor 215, the example skewness processor 220, the example rank processor 225, the example skewness radial processor 230, the example dominance-skewness quantile processor 235, the example query interface 240, the example presentation interface 245, the example query processor 250 and/or, more generally, the example statistical dominance processor 105 of FIG. 2 may be implemented by hardware, software, firmware and/or any combination of hardware, software and/or firmware. Thus, for example, any of the example data capture interface 205, the example joint dominance processor 210, the example dominance quantour processor 215, the example skewness processor 220, the example rank processor 225, the example skewness radial processor 230, the example dominance-skewness quantile processor 235, the example query interface 240, the example presentation interface 245, the example query processor 250 and/or, more generally, the example statistical dominance processor 105 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example statistical dominance processor 105, the example data capture interface 205, the example joint dominance processor 210, the example dominance quantour processor 215, the example skewness processor 220, the example rank processor 225, the example skewness radial processor 230, the example dominance-skewness quantile processor 235, the example query interface 240, the example presentation interface 245 and/or the example query processor 250 are hereby expressly defined to include a tangible medium such as a memory, digital versatile disk (DVD), compact disk (CD), etc., storing such software and/or firmware. Further still, the example statistical dominance processor 105 of FIG. 2 may include one or more elements, processes and/or devices in addition to, or instead of, those illustrated in FIG. 2, and/or may include more than one of any or all of the illustrated elements, processes and devices.

Figure 6:
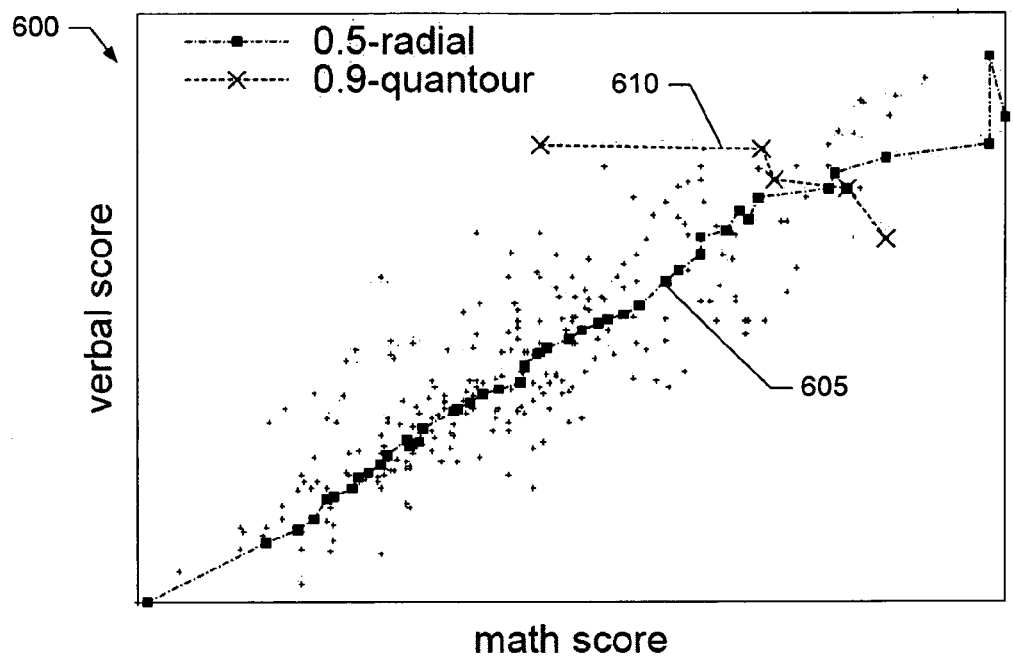
FIGS. 6-15 illustrate presentations of example statistical analysis results produced by the example statistical dominance processor of FIG. 2 for different types of multidimensional input data sets.

A first example data presentation 600 that could be generated by the example statistical dominance processor 105 for an input data set corresponding to examination scores is illustrated in FIG. 6. The American College Board measures academic performance of students using a standardized test called the Standard Aptitude Test, or SAT. The SAT historically included two sections: a math section and a verbal section. A test participant receives scores and percentiles for each section. The participant may choose to have these SAT results sent to one or more colleges, universities, etc., for consideration during the admission process. The example presentation 600 of FIG. 6 corresponds to a two-dimensional data set of average SAT scores reported by 2244 colleges and available at http://www.ivywest.com/satscore.htm.

However, each section on its own is a very narrow indicator of overall scholastic aptitude. For example, a student with a top score on the math section may have weak verbal skills. Considering the percentiles for each section independently does not reveal the overall academic dominance of a particular test participant relative to the other participants. For example, if 10% of the participants scored above 1300 on the math section and 10% of the participants scored above 1200 on the verbal section, it does not necessarily follow that 10% of students exceeded these respective scores on both sections combined.

Instead, the example statistical dominance processor 105 supports analysis of such SAT results that takes into account both the math section dimension and the verbal section dimension of the test score data. For example, the example query interface 240 can be used to request a presentation of the test results corresponding to students who achieved a approximately the same percentile score in both the math and verbal sections or, in other words, which students performed equally as well on the math and verbal sections. Such test scores could be presented by the example presentations interface 245 as the $\alpha=0.5$ radial of the two-dimensional data set of SAT test score data points, which is depicted as the 0.5-radial curve 605 in FIG. 6. Additionally, other $\alpha$-radials, or skewness radials, may be specified to identify test scores indicating a skewed proficiency for one section relative to the other section, such as scores representing a bias for mathematical prowess over verbal proficiency.

Additionally, the example query interface 240 of the example statistical dominance processor 105 could be used to request a presentation of the test results corresponding to students whose scores dominated approximately an equal percentage of other scores on both sections. For example, the query interface 240 could be used to request that presentation interface 245 present the $\phi=0.9$ quantour of the two-dimensional data set of SAT test score data points, which corresponds to the math and verbal score combinations dominating 90% of test scores achieved by participants on both the math and verbal sections. The $\phi=0.9$ quantour of the example SAT data set is depicted as the 0.9-quantour 610 in FIG. 6. Other $\phi$-quantour, or dominance quantour, values could be specified to identify and present other subsets of test scores dominating other percentages or ratios of the combined test score results. In this way, the example statistical dominance processor 105 may be used to perform a thorough analysis of the trade-offs between score combinations.

Figure 7:
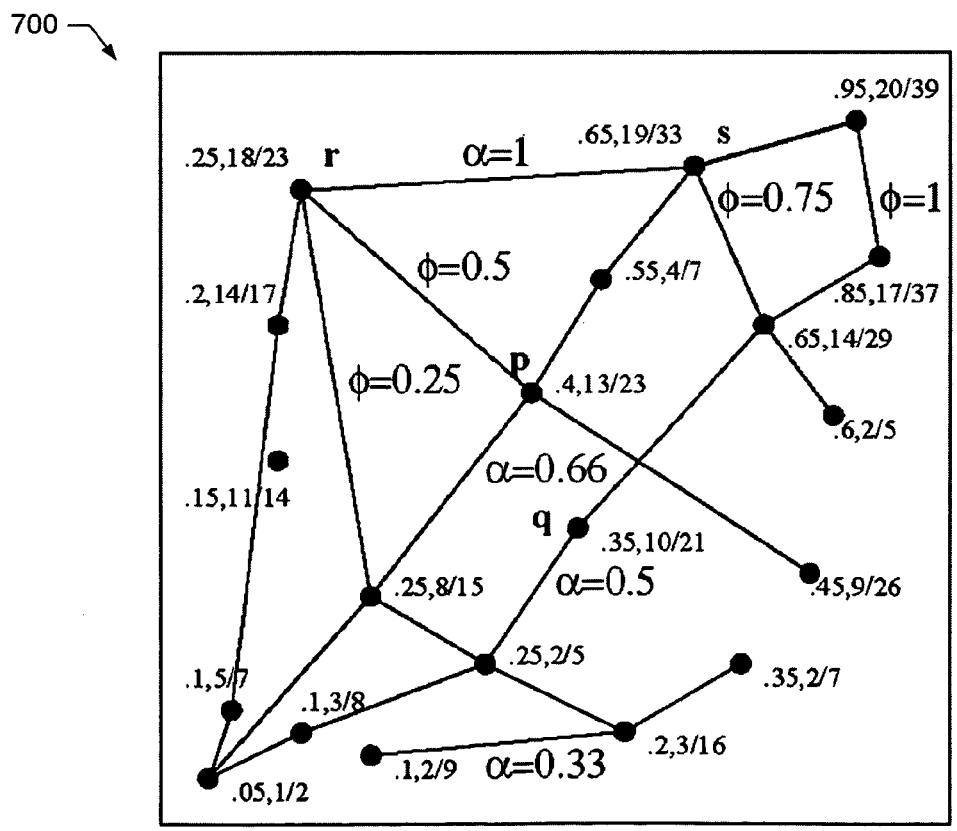

A second example data presentation 700 that could be generated by the example statistical dominance processor 105 for another example input data set is illustrated in FIG. 7.

The example data presentation 700 corresponds to an example two-dimensional data set of 20 data points and depicts points from the same quantours and radials using connected line segments. For each point, the example data presentation 700 indicates the (φ, α) statistical dominance point descriptor associated with the particular data point. For example, the data point labeled p has (φ, α)=(0.4, 13/23). For the depicted graph, the data point p can be seen to φ-dominate 8 data points (including itself). The data point p also can be seen to have $rank_y$=13 and $rank_x$=10. Thus, the point p is associated with respective φ-dominance and α-skewness values of φ=0.4 and α=13/23. The data point p also falls on the intersection of φ=0.5 quantour and the α=2/3 radial, and therefore is the unique (0.5, 2/3)-quantile for the example data set.

To determine the (0.5, 0.5) quantile, there are several possible points that have (φ≦0.5, α≦0.5). These data points are included in the data set Pα∩Pφ={(0.05, 1/2), (0.1, 3/8), (0.1, 2/9), (0.25, 2/5), (0.2, 3/16), (0.35, 2/7), (0.35, 10/21), (0.45, 9/26)}. However, the unique point q at (0.35, 10/21) either φ-dominates or α-dominates every other point in Pα∩Pφ. Therefore, the data point q is the (0.5, 0.5)-quantile for the example data set. As such, this data point q has the greatest y rank among the set of data points which obey the (φ, α) predicates (that is, (φ≦0.5, α0.5)), and which falls on the α=0.5-radial.

Figure 8:
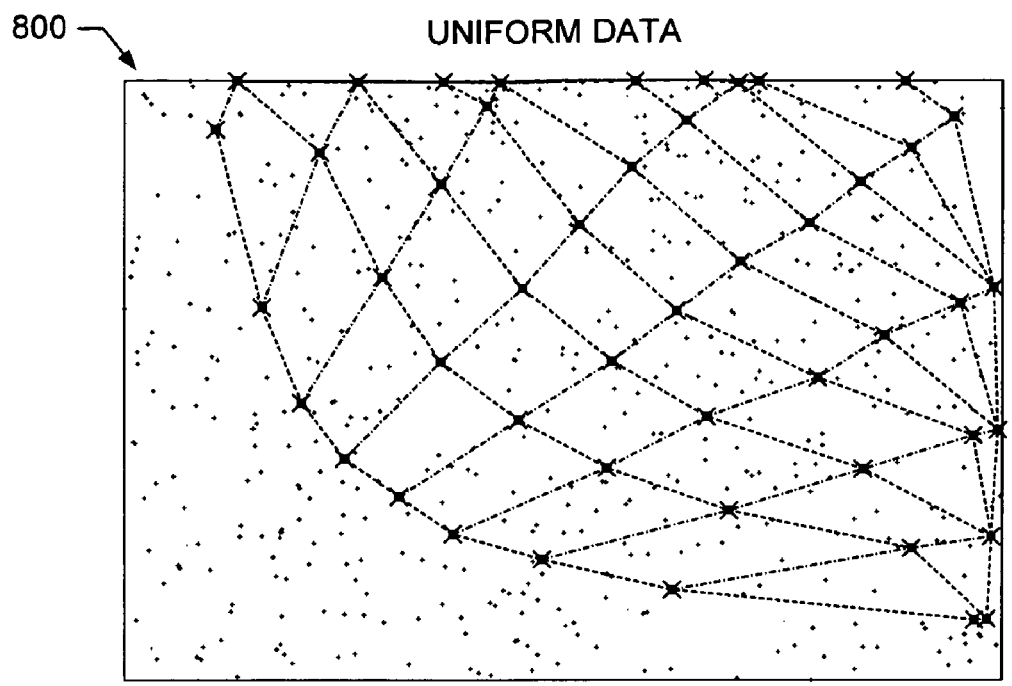
Figure 9:
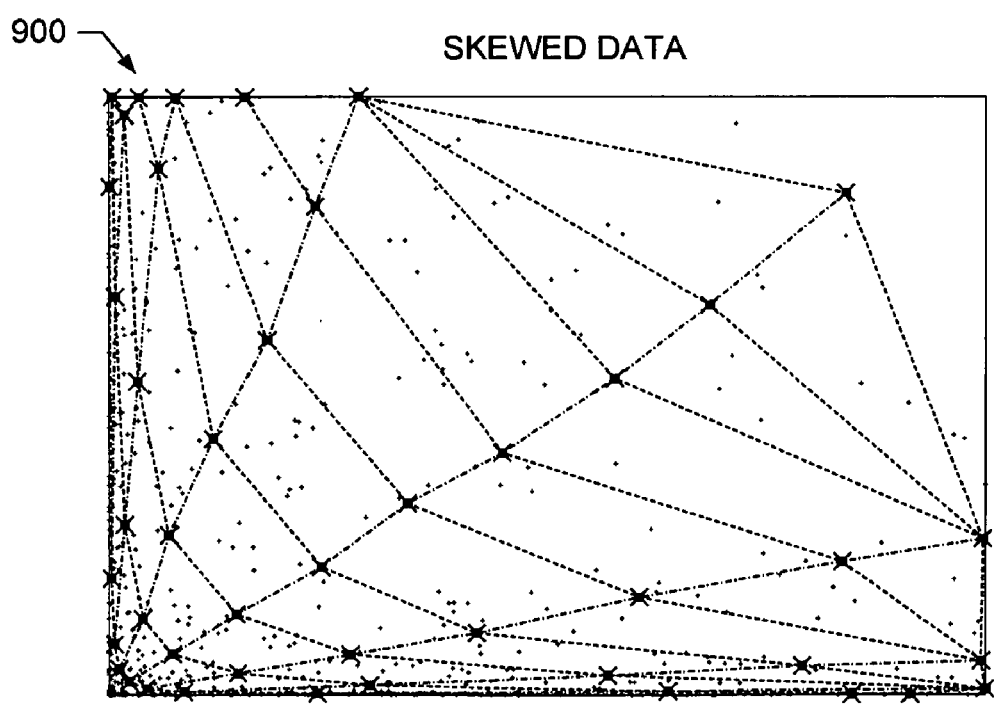

FIGS. 8-13 illustrate further example presentations that could be generated by the example statistical dominance processor 105 for several different example synthetic data sets. In these illustrated examples, the presentations provide plots of the φ-quantours, α-radials and (φ, α)-quantiles for φϵ{0.1, ..., 0.9} and αϵ{0.1, ..., 0.9}. FIG. 8 depicts an example data presentation 800 corresponding to two-dimensional data having a uniform distribution in both dimensions, whereas FIG. 9 depicts an example data presentation 900 corresponding to data having a skewed distribution in each dimension. Comparing the example data presentations 800 and 900 demonstrates how skew affects the angles between radials, causing them to diverge when both the x and y dimensions have higher skew.

Figure 10:
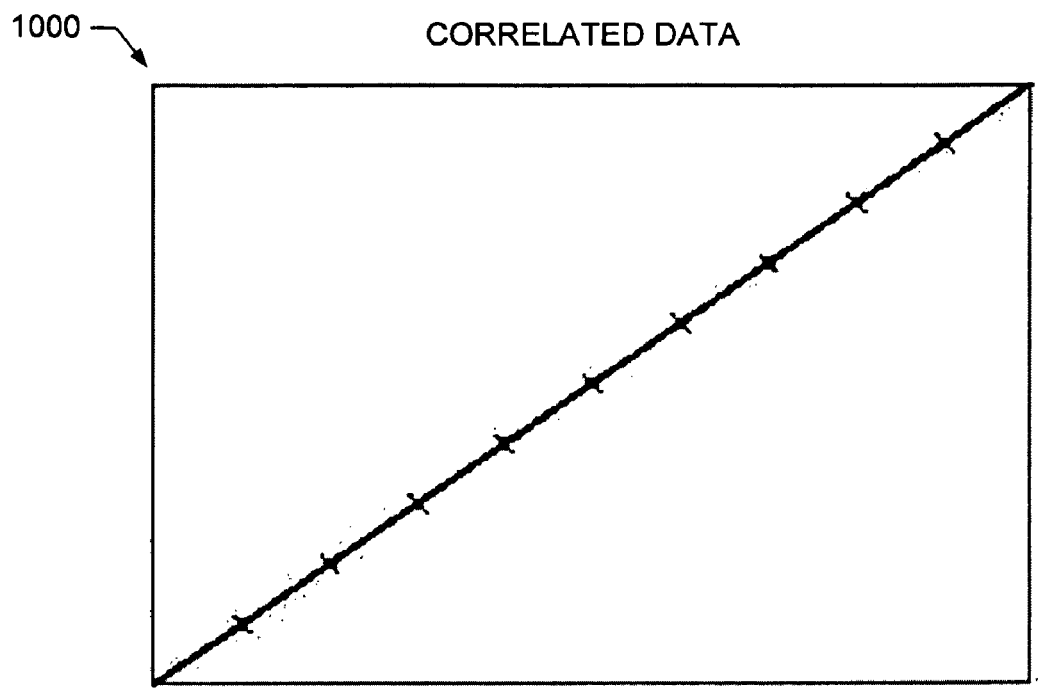
Figure 11:
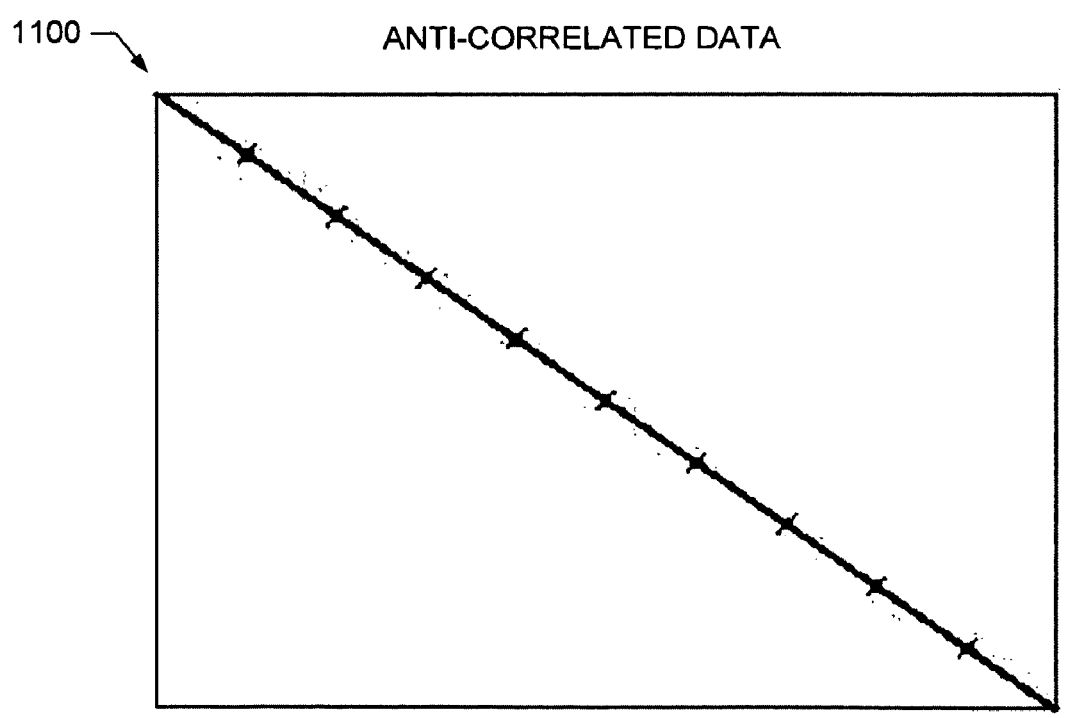

FIG. 10 depicts an example data presentation 1000 corresponding to correlated two-dimensional data in which every point p has skewness α(p)=0.5. As such, the (φ,α)-quantiles effectively collapse to one-dimensional quantiles. FIG. 11 depicts an example data presentation 1100 corresponding to anti-correlated two-dimensional data in which every point p has a joint dominance φ(p)=1/N such that every point is on the skyline, effectively collapsing the (φ,α)-quantiles to one-dimensional quantiles along the skyline as well.

Figure 12:
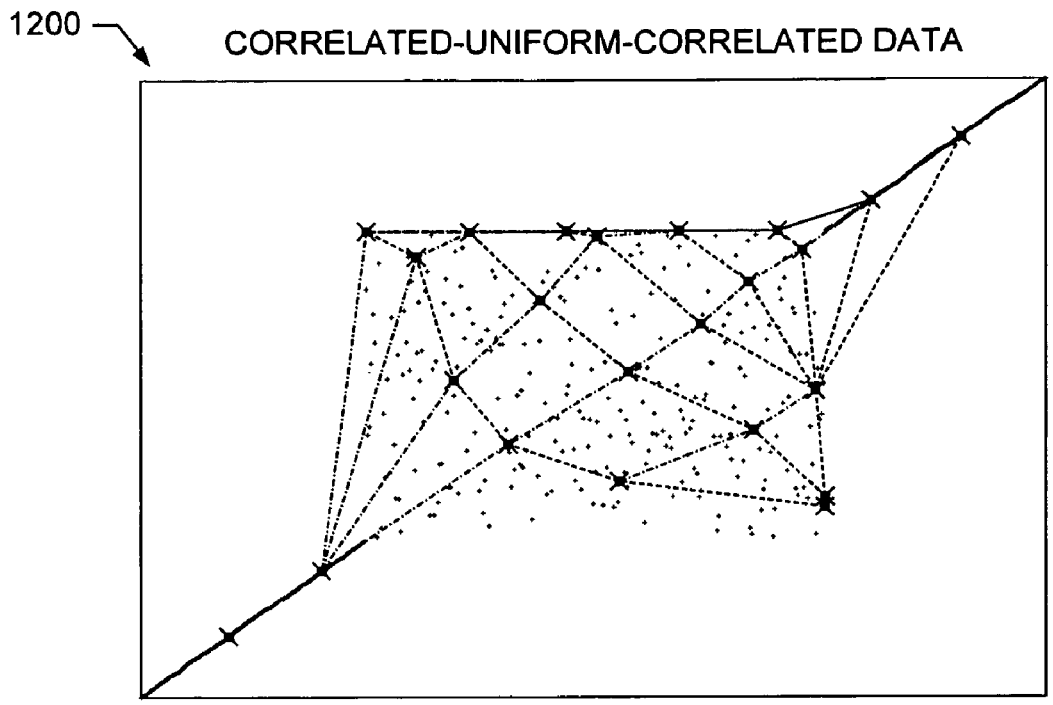
Figure 13:
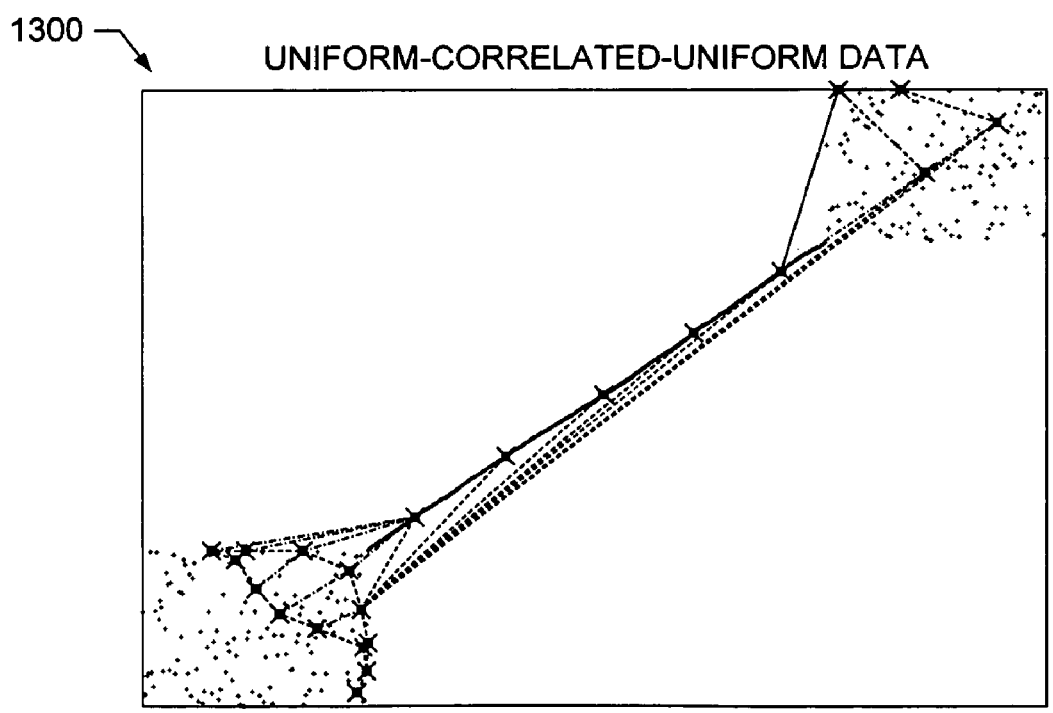

FIG. 12 depicts an example data presentation 1200 corresponding to two-dimensional data characteristics having a central uniform distribution but correlated extremes regions. In contrast, FIG. 12 depicts an example data presentation 1300 corresponding to two-dimensional data having a central correlated section but with uniform distributions in the extreme regions. The example data presentations 1200 and 1300 demonstrate how (φ,α) quantiles follow the shape of a point cloud on hybrid data sets having or lacking regional correlations. Also, in the example data presentation 1300, only points above the diagonal merge into the diagonal due to the definition of α-radial points p having α(p)≦α.

Figure 14:
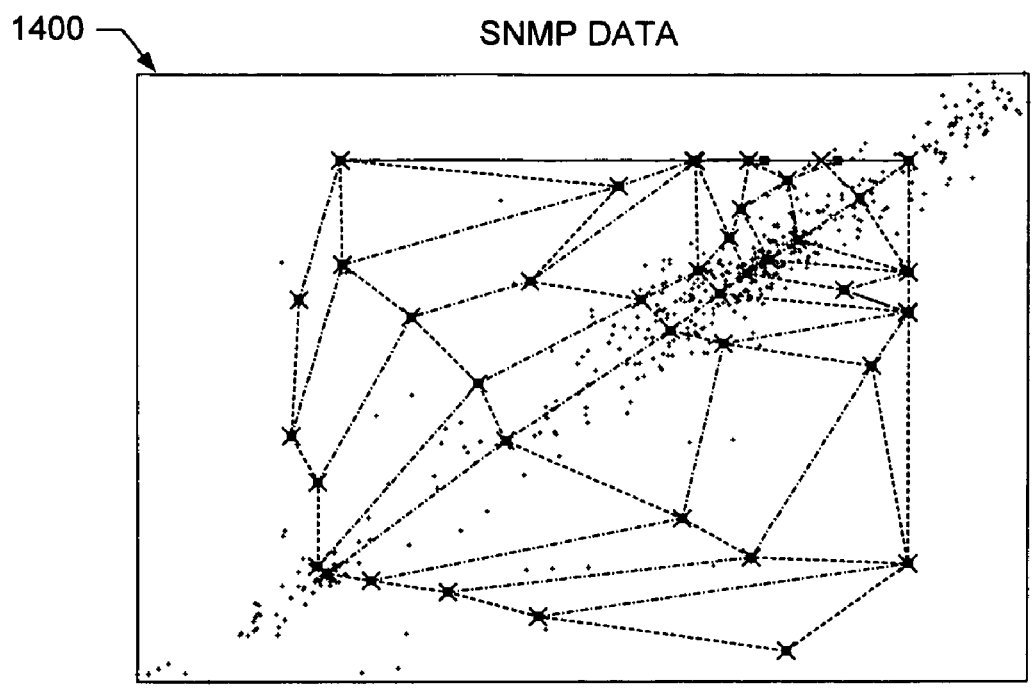
Figure 15:
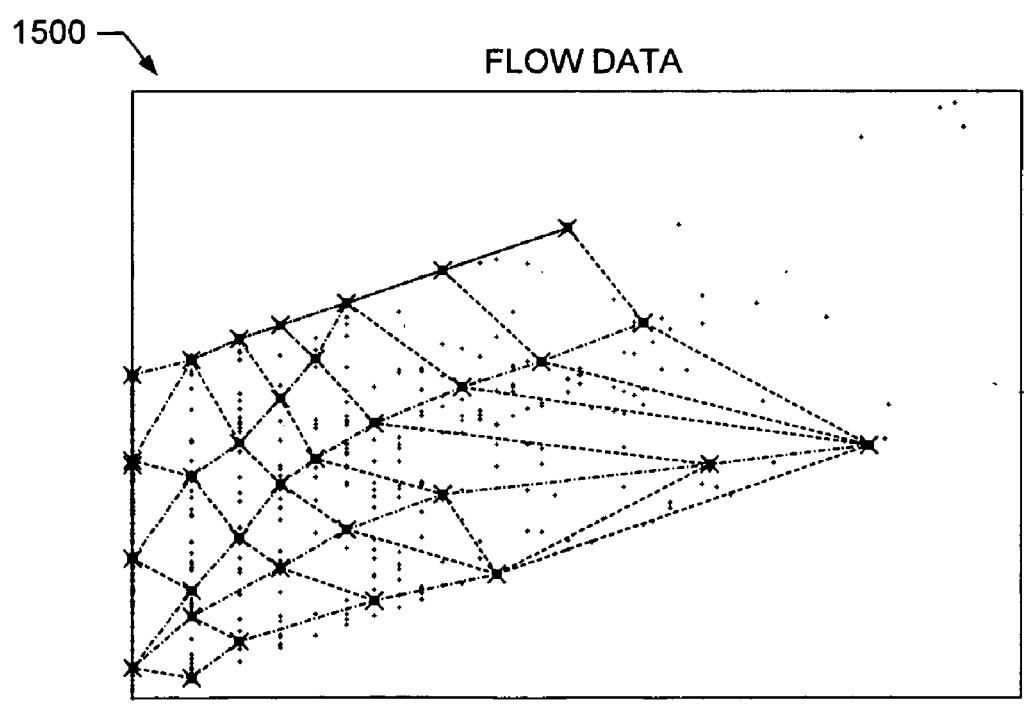

FIGS. 14-15 illustrate additional example data presentations that could be generated by the example statistical dominance processor 105 for two different example real data sets. In these illustrated examples, the presentations provide plots on log-log scales and depict the φ-quantours, α-radials and (φ, α)-quantiles for φϵ{0.1, ..., 0.9} and αϵ{0.1, ..., 0.9}. FIG. 14 depicts an example data presentation 1400 corresponding to two dimensional data obtained by measuring simple network management protocol (SNMP) data transmissions. The example data presentation 1400 plots outbound versus inbound SNMP traffic volumes and illustrates that the correlation varies by region of the plot. In particular, the example data presentation 1400 depicts radials that bend inwards or, in other words, have high correlation (acute quantour angles) at small traffic volumes, low correlation (obtuse angles) at medium traffic volumes, and high correlation (acute angles) again at large traffic volumes. Therefore, the example data presentation 140 suggests that inbound and outbound traffic is balanced for medium traffic levels, but the traffic parity does not remain when the throughput in either direction is too large or small.

FIG. 15 depicts an example data presentation 1500 corresponding to two-dimensional data obtained by measuring Internet protocol (IP) network flows. Flow size distribution has been used to track sudden anomalies such as denial of service (DoS) attacks and route flaps. In the illustrated example, the input arrives in the form of IP traffic flows, which are a sequence of packets defined by source and destination IP addresses and possibly also the ports used. The input IP traffic flows may arrive at a rate of many millions per hour per router, making storing of the input stream impractical. The size of a flow can be measured as numbers of packets or bytes, but the combination of these measurements together yields a richer analysis than either (or both) independently. For example, a file transfer protocol (FTP) session may be characterized by many packets having many bytes, a hypertext transfer protocol (HTTP) session by many bytes over few packets, a ping session by many packets having few bytes, a dynamic host configuration protocol (DHCP) request by both few packets and few bytes, etc. Thus, a summary of the joint distribution of number of packets and number of bytes can be used to make inferences about the service provided. In the illustrated example, the data presentation 1500 plots flow sizes in bytes versus packets. The example data presentation 1500 suggests that the distributions of both of these attributes are skewed, as indicated by the divergence of the radials away from the center. The curvature of the 0.5-radial shows that the relationship between packets and bytes is different for small, balanced flows as compared to larger flows.

Several potentially beneficial properties of φ-quantours, α-radials and (φ, α)-quantiles can be discerned from the example data presentations of FIGS. 8-15, as well as the detailed description of the example statistical dominance processor 105 of FIG. 2 For example, a specified statistical dominance point descriptor value (φ,α) is associated with a unique data point from the input multidimensional data set. This property follows because, after taking the φ-dominance skyline, the resulting subset of points is such that no pair is comparable under φ-dominance. Thus, the subset of data points must all be comparable under α-dominance, and there must be a unique maximal point.

Also, the order of the taking the φ-dominance skyline and the α-dominance skyline to determine the (φ,α)-quantile is unimportant. Moreover, the unique point that is returned is the point in the intersecting $P_\varphi \cap P_\alpha$ data set which has the greatest y value and, if more than one data point has this y value, the one among these data points having the greatest x value.

Next, the returned data point that is the (φ,α)-quantile for specified φ joint dominance and α skewness lies on the α-radial or the φ-quantour, or possibly both if they intersect. When the maximal points on the α-radial and φ-quantour have differing y-values, then the (φ, α)-quantile is guaranteed to be on the α-radial.

As yet another potentially useful property, for any two data points p and q, if the joint dominance $\phi(p)$ equals the joint dominance $\phi(q)$, and if the skewness $\alpha(p)$ equals the skewness $\alpha(q)$, then the two data points p and q must be the same. In other words, all distinct input data points have distinct statistical dominance point descriptor ($\phi$, $\alpha$) values. This property may be proven by observing that if two points share the same $\alpha$ skewness value, then one must $\phi$-dominate the other unless both are the same data point. Thus, each data point p corresponds to a unique the ($\phi(p),\alpha(p)$)-quantile from the input data points having $\alpha(p) \leq \alpha$ and $\phi(p) \leq \phi$.

Building upon the preceding descriptions of some properties of $\phi$-quantours, $\alpha$-radials and ($\phi$, $\alpha$)-quantiles, the descriptions of the example data presentations of FIGS. 8-15, as well as the detailed description of the example statistical dominance processor 105 of FIG. 2, an example implementation of the query processor 250 of FIG. 2 is illustrated in FIG. 16. As mentioned above, the example query processor 250 facilitates controlling the elements of the example statistical dominance processor 105 to generate $\phi$-quantours, $\alpha$-radials, ($\phi$, $\alpha$)-quantiles, etc. from, for example, an actual input data set obtained via a batch operation or a summary data set obtained by processing data points obtained sequentially via a streaming operation. The example query processor 250 of FIG. 16 corresponds to an implementation targeted at processing an actual input data set obtained via a batch operation.

Turning to FIG. 16, the example query processor 250 a step size and iteration controller 1605 to allow a range of $\phi$-quantours, $\alpha$-radials, ($\phi$, $\alpha$)-quantiles, etc., to be determined by the example statistical dominance processor 105 by specifying joint dominance ($\phi$) and/or skewness ($\alpha$) step sizes, as well as a number of iterations to be examined. For example, the data presentations depicted in FIGS. 8-15 were generated using joint dominance ($\phi$) and/or skewness ($\alpha$) step sizes both equal to 0.1, and a number of iterations set to 9 for both $\phi$-quantour and $\alpha$-radial determination.

The example query processor 250 of FIG. 16 also includes an x-dimension rank controller 1610 and a y-dimension rank controller 1615 to control the example rank processor 225 to sort each marginal dimension independently and computing the $rank_x$ and $rank_y$ values for the input data points. The example query processor 250 of FIG. 16 also includes a joint dominance controller 1620 to control the example joint dominance processor 210 to determine joint dominance $\phi$-values for the input data point. In the illustrated example, the joint dominance controller 1620 causes the example joint dominance processor 210 to determine the $\phi$-values by processing the data set in order of $rank_y$, then $rank_x$ of the data points, and then implementing a joint dominance query as Order(log N), or O(log N), dominance queries, using the binary form of the value of the $rank_x$ of each point being considered. The example query processor 250 of FIG. 16 also includes a skewness controller 1625 to control the example skewness processor 220 to process the determined $rank_y$ and $rank_x$ values to determine the skewness values for the input data set. Thus, the example joint dominance controller 1620 and the example skewness controller 1625 allow $\alpha$-skewness values and $\phi$-dominance values for an input data set having N data points to be computed in time O(N log N).

The example query processor 250 of FIG. 16 also includes a dominance-skewness quantile control 1630 to control the example dominance-skewness quantile processor 235 to determine ($\phi$, $\alpha$)-quantiles for the specified joint dominance ($\phi$) and/or skewness ($\alpha$) step sizes, as well as the specified number of iterations. In the illustrated example, the example dominance-skewness quantile control 1630 causes the example dominance-skewness quantile processor 235 to determine a particular ($\phi,\alpha$)-quantile by performing a linear scan over the ($\phi$, $\alpha$) values to find the data point which satisfies the ($\phi,\alpha$) predicate (or, in other words, the point p that satisfies $\phi(p) \leq \phi$ and $\alpha(p) \leq \alpha$), and dominates all other points that also satisfy the predicate.

While an example manner of implementing the example query processor 250 of FIG. 2 has been illustrated in FIG. 16, one or more of the elements, processes and/or devices illustrated in FIG. 16 may be combined, divided, re-arranged, omitted, eliminated and/or implemented in any other way. Further, the example step size and iteration controller 1605, the example x-dimension rank controller 1610, the example y-dimension rank controller 1615, the example joint dominance controller 1620, the example skewness controller 1625, the example dominance-skewness quantile control 1630 and/or, more generally, the example query processor 250 of FIG. 16 may be implemented by hardware, software, firmware and/or any combination of hardware, software and/or firmware. Thus, for example, any of the example step size and iteration controller 1605, the example x-dimension rank controller 1610, the example y-dimension rank controller 1615, the example joint dominance controller 1620, the example skewness controller 1625, the example dominance-skewness quantile control 1630 and/or, more generally, the example query processor 250 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example query processor 250, the example step size and iteration controller 1605, the example x-dimension rank controller 1610, the example y-dimension rank controller 1615, the example joint dominance controller 1620, the example skewness controller 1625 and/or the example dominance-skewness quantile control 1630 are hereby expressly defined to include a tangible medium such as a memory, digital versatile disk (DVD), compact disk (CD), etc., storing such software and/or firmware. Further still, the example query processor 250 of FIG. 16 may include one or more elements, processes and/or devices in addition to, or instead of, those illustrated in FIG. 16, and/or may include more than one of any or all of the illustrated elements, processes and devices.

A second example implementation of the query processor 250 of FIG. 2 is illustrated in FIG. 17. The query processor 250 of FIG. 17 corresponds to an implementation targeted at processing a summary data set obtained by processing data points obtained sequentially via a streaming operation. The second example implementation of the query processor 250 illustrated in FIG. 17 includes many elements in common with the first example implementation of the query processor 250 illustrated in FIG. 16. As such, like elements in FIGS. 16 and 17 are labeled with the same reference numerals. The detailed descriptions of these like elements are provided above in connection with the discussion of FIG. 16 and, in the interest of brevity, are not repeated in the discussion of FIG. 17.

Turning to FIG. 17, the example query processor 250 includes the example x-dimension rank controller 1610, the example y-dimension rank controller 1615, the example joint dominance controller 1620, the example skewness controller 1625 and the example dominance-skewness quantile control 1630 described above in connection with FIG. 16, but modified to treat a summary data set as the input data set to be processed. As such, the example x-dimension rank controller 1610, the example y-dimension rank controller 1615, the example joint dominance controller 1620, the example skewness controller 1625 and the example dominance-skewness quantile control 1630 operate in the context of the example query processor 250 of FIG. 17 to determine joint dominance estimates $\hat{\phi}(p)$ and skewness estimates $\hat{\phi}(p)$ for input data points p, as well as dominance-skewness quantile estimates $(\hat{\phi}, \hat{\alpha})$ for given specified $\phi$ and $\alpha$ values because processing is performed on a summary data set instead of the actual input data set Additionally, the example query processor 250 of FIG. 17 includes a summary data processor 1705 to generate a summary data set from data points obtained sequentially as discussed in greater detail below.

Before proceeding with a description of the example summary data processor 1705, some comments concerning summary data sets and determining $\phi$-quantours, $\alpha$-radials and ($\phi$, $\alpha$)-quantiles, etc., from summary data sets are provided as context for the description to follow. Generally, a summary data set requires less space than the corresponding complete actual data set. Furthermore, summary data sets allow queries to be processed and query estimates to be returned as individual data points are obtained sequentially, even though a complete actual data set has not, and may never be, fully obtained. In other words, an implementation based on a summary data set provides $\phi$-quantour estimates, $\alpha$-radial estimates, ($\phi$, $\alpha$)-quantile estimates, etc.

For example, given a stream of data points in two dimensions, the approximate ($\phi$, $\alpha$) quantile problem involves determining a ($\phi$, $\alpha$)-quantile estimate by processing the stream so that, given any point p, an approximate ($\phi$, $\alpha$)-quantile, ($\hat{\phi}(p)$, $\hat{\alpha}(p)$), is determined that satisfies the following two constraints:

$$\phi(p)-Q \leq \hat{\phi}(p) \leq \phi(p)+Q \qquad \text{Equation 6}$$

$$(1-\epsilon)\alpha(p) \leq \hat{\alpha}(p) \leq (1+\epsilon)\alpha(p) \qquad \text{Equation 7}$$

As another example, using the preceding two constraints, the reverse approximate ($\phi$,$\alpha$)-quantile problem is, given a specified joint dominance and skewness value pair ($\phi$, $\alpha$), find a point p to be the approximate ($\phi$, $\alpha$)-quantile, ($\hat{\phi}(p)$,$\hat{\alpha}(p)$), such that: (1) $\phi(p) \leq \phi+\epsilon$, $\alpha(p) \leq (1+\epsilon)\alpha$, and (2) either $\phi(p) \geq \phi(q)-\epsilon_\phi(\phi(q),\epsilon)$ or $\alpha(p) \geq (1-\epsilon)(\alpha(q)-\epsilon_\alpha(\phi(q),\epsilon))$, where q is the exact ($\phi$, $\alpha$)-quantile, and $\epsilon_\phi$ and $\epsilon_\alpha$ are functions which give error bounds less than 1.

The second part of the preceding definition for the approximate ($\phi$, $\alpha$)-quantile, ($\hat{\phi}(p)$,$\hat{\alpha}(p)$), is explained as follows. Initially, it would seem more appropriate to require that p satisfy $\phi(p) \geq \phi-Q$ and $\alpha(p) \geq (1-Q)\alpha$, which would be symmetric to the upper bound. However, consider the query (0.5, 1) on the example data set shown in FIG. 7. The exact ($\phi$, $\alpha$) quantile is the point r with $\phi(r)=0.25$, $\alpha(r)=18/23$. Thus even the exact answer may have quite different actual $\phi$ and $\alpha$ values than those specified by the query. This is a consequence of requiring the returned quantile to be a data point from the input, and means that the requirements on the approximate ($\phi$, $\alpha$)-quantile, ($\hat{\phi}(p)$,$\hat{\alpha}(p)$), should be stated in terms of q, the data point which is the true ($\phi$, $\alpha$) quantile. As such, the preceding definition the approximate ($\phi$, $\alpha$)-quantile, ($\hat{\phi}(p)$,$\hat{\alpha}(p)$), requires a disjunctive guarantee that either (i) there is a bound related to $\phi(q)$, or (ii) there is a bound related to $\alpha(q)$. However, it is not possible to guarantee both bounds.

For example, again consider the data set shown in FIG. 7, and assume that the errors in estimating $\phi(p)$ and $\alpha(p)$ are bounded by $\epsilon=0.05$. Suppose the query (0.6, 0.75) is specified. Then, the exact answer to this query is the point marked r, but the data point marked s could be provided instead if $\phi(s)$ is underestimated. Then we find that $\phi(r) \leq \phi(s) \leq \phi+\epsilon$, but $\alpha(s) << \alpha(r) \leq \alpha(1+\epsilon)$. Similarly, if the query (0.65, 0.6) is specified, the exact answer is the point s, but s might be overlooked and r output instead if $\phi(s)$ is overestimated. In this case, we have $\alpha(s) \leq \alpha(r) \leq \alpha(1+\epsilon)$, but $\phi(r) << \phi(s) \leq \phi+\epsilon$. That is, in these examples, while one of joint dominance value $\phi$ or the skewness value $\alpha$ of the data point identified to be the approximate quantile is lower bounded by the value of the true quantile and upper bounded in terms of the query parameter, the other of these values can be lower than the value of the true quantile. So it is reasonable to require one of these bounds to hold.

Two aspects of addressing the approximate ($\phi$, $\alpha$) quantile problem involve estimating $\alpha$ skewness values and estimating $\phi$ joint dominance values. Estimating $\alpha$ is relatively straightforward, as $\alpha$ skewness can be determined by combining independent estimations of one dimensional ranks/quantiles. Thus, the more significant challenge involves estimating the $\phi$-dominance of the input data points, and storing appropriate summary data sets representative of the actual input data values that ensure sufficient information is retained to be able to find good approximate ($\phi$, $\alpha$) quantiles.

Returning to FIG. 17, the example summary data processor 1705 is configured to support any of a number of different techniques for determining appropriate summary data sets that ensure sufficient information is retained to be able to find good approximate ($\phi$, $\alpha$) quantiles. For example, the summary data processor 1705 includes a summary data insertion processor 1710 to insert a new incoming data point $x \in [0, \ldots, U-1]$ into the summary data set. Additionally, the summary data processor 1705 includes a summary data deletion processor 1715 to delete information from the summary data set representative of one or more actual data point.

Figure 18:
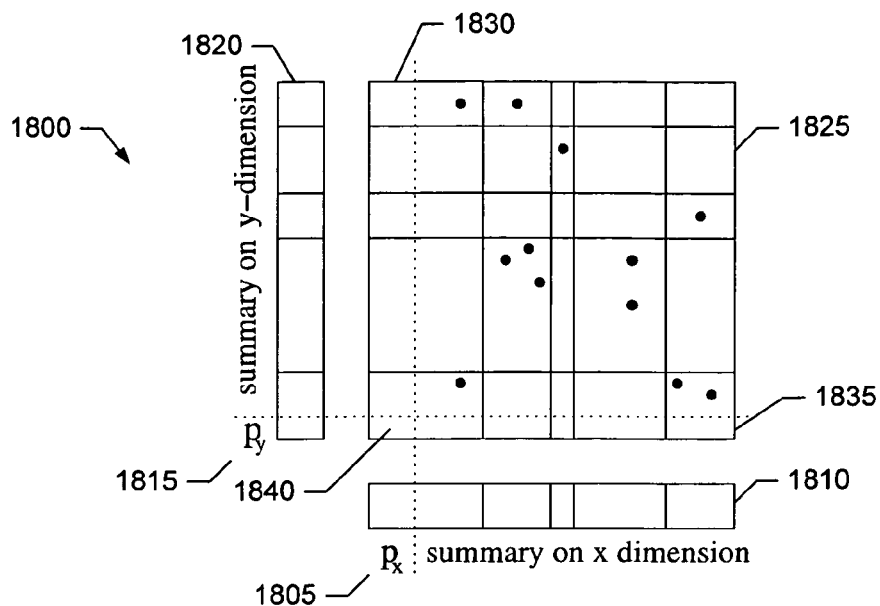
FIG. 18 illustrates a first example summary data implementation for use by the second example query processor of FIG. 17.

The example summary data processor 1705 further includes a summary data compression processor 1720 to compress or, in other words, compact the data structure(s) representing the summary data set. To implement such compression, the example summary data compression processor 1720 may invoke a summary data merging processor 1725 to merge information included in the summary data set. Operation of the example summary data processor 1705, including the example summary data insertion processor 1710, the example summary data deletion processor 1715, the example summary data compression processor 1720 and the example summary data merging processor 1725, to implement several different summary data implementations is discussed in greater detail below in connection with FIGS. 18-20.

While an example manner of implementing the example query processor 250 of FIG. 2 has been illustrated in FIG. 17, one or more of the elements, processes and/or devices illustrated in FIG. 17 may be combined, divided, re-arranged, omitted, eliminated and/or implemented in any other way. Further, the example step size and iteration controller 1605, the example x-dimension rank controller 1610, the example y-dimension rank controller 1615, the example joint dominance controller 1620, the example skewness controller 1625, the example dominance-skewness quantile control 1630, the example summary data processor 1705, the example summary data insertion processor 1710, the example summary data deletion processor 1715, the example summary data compression processor 1720, the example summary data merging processor 1725 and/or, more generally, the example query processor 250 of FIG. 17 may be implemented by hardware, software, firmware and/or any combination of hardware, software and/or firmware. Thus, for example, any of the example step size and iteration controller 1605, the example x-dimension rank controller 1610, the example y-dimension rank controller 1615, the example joint dominance controller 1620, the example skewness controller 1625, the example dominance-skewness quantile control 1630, the example summary data processor 1705, the example summary data insertion processor 1710, the example summary data deletion processor 1715, the example summary data compression processor 1720, the example summary data merging processor 1725 and/or, more generally, the example query processor 250 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example query processor 250, the example step size and iteration controller 1605, the example x-dimension rank controller 1610, the example y-dimension rank controller 1615, the example joint dominance controller 1620, the example skewness controller 1625 and/or the example dominance-skewness quantile control 1630, the example summary data processor 1705, the example summary data insertion processor 1710, the example summary data deletion processor 1715, the example summary data compression processor 1720, the example summary data merging processor 1725 are hereby expressly defined to include a tangible medium such as a memory, digital versatile disk (DVD), compact disk (CD), etc., storing such software and/or firmware. Further still, the example query processor 250 of FIG. 17 may include one or more elements, processes and/or devices in addition to, or instead of, those illustrated in FIG. 17, and/or may include more than one of any or all of the illustrated elements, processes and devices.

In general, the summary data implementations supported by the example query processor 250 and the example summary data processor 1705 of FIG. 17 exhibit the properties of being mergable, compressing and/or hierarchical. A technique for summary data implementation is considered mergable (or, more specifically, strongly mergable) if two summaries of different inputs can be combined to create a summary of the union of the two inputs. The focus herein is on summaries that can be merged arbitrarily many times and still retain the same asymptotic space bounds. Other techniques for implementing data summaries are weakly mergable, in that their output can be merged to answer a query on the union of their inputs, but could result in an increasing use of space over time.

A technique for summary data implementation is considered to be compressing if it stores tuples of information representative of the input data set and, when the size of the summary data set is being reduced, the tuples are compressed together by summing the counts of particular items or ranges included in the tuples. Furthermore, a compressing algorithm is considered to be hierarchical if it follows a predetermined, hierarchical approach to tuple merging. For example, a tree-structure may be placed over the domain, with merges allowed only between child nodes and their respective parent nodes.

Three possible multidimensional summary data implementation techniques supported by the example query processor 250 of FIG. 17 are described in greater detail below. Each of these multidimensional summary data implementation techniques build upon existing techniques for implementing one-dimensional summaries. Possible one-dimensional data summary techniques that can be used to implement the multidimensional techniques described below include the Greenwald-Khanna (GK) technique, the Quantile-Digest (QD) technique and the Biased Quantile (BQ), although other techniques may alternatively be used.

The GK technique is described in M. Greenwald and S. Khanna, *Space-efficient online computation of quantile summaries*, ACM SIGMOD, pages 58-66, 2001, which is incorporated by reference herein in its entirety. The GK technique operates to retain a set of tuples, with each tuple including of an example item from the input, a count of how many items have been merged into that tuple, and an upper bound on the rank of the item.

The QD technique is described in N. Shrivastava, C. Buragohain, D. Agrawal, and S. Suri, *Medians and beyond: New aggregation techniques for sensor networks*, ACM SenSys, 2004, which is incorporated by reference herein in its entirety. The QD technique retains a set of tuples, with each tuple including of an item or (dyadic) range of items from the input and a count of how many items have been merged into that tuple.

The BQ technique is described in G. Cormode, F. Korn, S. Muthukrishnan, and D. Srivastava, *Space- and time-efficient deterministic algorithms for biased quantiles over data streams*, ACM PODS, 2006, which is incorporated by reference herein in its entirety. The BQ technique employs a QD-like data structure with different manipulation routines to estimate quantiles associated of data points with stronger relative error guarantees, but at the cost of somewhat increased space usage. Because the QD and BQ techniques do not by default retain an example item from the input, the QD and BQ techniques would require modification to retain, for each retained tuple, an example data point falling in the range represented by the tuple. Some properties of the BK, QD and BQ algorithms are listed in Table 1 below.

TABLE 1

| Method | Space cost | Update time | Compressing | Mergability | Hierarchical |
|---|---|---|---|---|---|
| GK | $O\left(\frac{1}{\varepsilon}\log \varepsilon N\right)$ | $O\left(\log\left(\frac{1}{\varepsilon}\log \varepsilon N\right)\right)$ | Yes | Weakly | No |
| QD | $O\left(\frac{1}{\varepsilon}\log U\right)$ | $O(\log \log U)$ | Yes | Strongly | Yes |
| BQ | $O\left(\frac{1}{\varepsilon}\log U \log \varepsilon N\right)$ | $O(\log \log U)$ | No | Strongly | Yes |

As noted above, estimating α is relatively straightforward, as α skewness can be determined by combining independent estimations of one dimensional ranks/quantiles. Thus, the following descriptions of possible multidimensional summary data implementation techniques supported by the example query processor 250 of FIG. 17 focus on estimation of φ joint dominance values. However, before proceeding with the detailed descriptions of these techniques, it is noted that the example skewness controller 1625 of the example query processor 250 of FIG. 17 can be configured to compute α skewness values with relative error efficiently in a small memory space. In particular, using a memory space of $$O\left(\frac{1}{\varepsilon}\log U\log\varepsilon N\right),$$

it is possible to determine an approximate skewness value $\hat{\alpha}(q)$ for a data point q such that the error of the approximation is bounded by $(1-\varepsilon)\alpha(q)\leq\hat{\alpha}(q)\leq(1+\varepsilon)\alpha(q)$, where $\alpha(q)$ is the actual skewness value for q. This space and error bound can be shown by first noting that skewness is defined as. $\alpha(q)=\text{rank}_y(q)/(\text{rank}_x(q)+\text{rank}_y(q))$. By maintaining, for example, BQ data summaries on the x-values and y-values of the input data points independently, $\text{rank}_x$ and $\text{rank}_y$ can be approximated by $\hat{r}_x$ and $\hat{r}_y$ as such that the error of these approximations is bounded by $(1-\varepsilon)\text{rank}_x(q)\leq\hat{r}_x(q)\leq(1+\varepsilon)\text{rank}_x(q)$ and $(1-\varepsilon)\text{rank}_y(q)\leq\hat{r}_y(q)\leq(1+\varepsilon)\text{rank}_y(q)$. Thus, using these rank approximations to determine the approximated skewness value as $\hat{\alpha}(q)=\hat{r}_y(q)/(\hat{r}_x(q)+\hat{r}_y(q))$ ensures that the relative error for the skewness approximation is bounded by $(1-\varepsilon)/(1+\varepsilon)\geq 1-2\varepsilon$ and $(1-\varepsilon)/(1+\varepsilon)\leq 1+2\varepsilon$ for $\varepsilon\leq 1/3$. Rescaling $\varepsilon$ by a factor 3, which does not affect the known asymptotic memory space costs of the BQ summary given above, yields the previously mentioned error bound on the approximate skewness value $\hat{\alpha}(q)$.

A first possible multidimensional summary data implementation technique supported by the example query processor 250 of FIG. 17 is the cross-product summary data technique. In the cross-product summary data technique, one-dimensional sample-based summaries are maintained on each dimension independently, with the summaries having the compressing property discussed above. Each data summary includes a set of items and ranges from each dimension. Additional information concerning the cross product is maintained across dimensions. For example, if information is kept concerning a set X of points or ranges from the x-dimension, and concerning a set Y of points or ranges from the y-dimension, then information can also be kept concerning the Cartesian product X×Y. In such an example, for each cell in the cross-product, a count of the number of input items associated with the cell is stored, as well as an example data point value falling in the data range represented by the cell when the count is non-zero. In an example implementation, cross-product counts satisfy the property that summing the counts of all cells within a rectangle gives a lower bound on the number of input data points falling within the data range represented by the rectangle.

In an example implementation, a one-dimensional compression operation is performed periodically by the example summary data compression processor 1720 on the X summary data set, and then the Y summary data set. When such a compression merges two tuples together in at least one of the one-dimensional X and/or Y summary data sets, the appropriate cells in cross-product X×Y are also merged by the example summary data merging processor 1725. For example, cross-product cells may be merged by summing the counts in the individual cells and storing the resulting sum of the counts in the merged cell. The example data point value to be retained as representing the merged cell is chosen arbitrarily from the example data point representative of the individual merged cells.

When a newly obtained data point $p=(p_x, p_y)$ is to be inserted into the cross-product data summary, the X×Y cross-product data structure is updated accordingly by the example summary data insertion processor 1710 to reflect the insertion of the individual one-dimensional values $p_x$ and $p_y$ into the respective one-dimensional X and Y data summaries. For example, consider the example cross-product summary data structure 1800 illustrated in FIG. 18. With reference to the example cross-product summary data structure 1800, after inserting the value $p_x$ (indicated by the numeric identifier 1805) into the X data summary 1810 and the value $p_y$ (indicated by the numeric identifier 1815) into the Y data summary 1820, the X×Y cross-product data structure 1825 is updated (as indicated by the dashed lines in FIG. 18) with a new column 1830 representing the cross product $\{p_x\}\times Y$, a new row 1835 representing the cross-product $X\times\{p_y\}$, and a cell 1840 is updated to represent the data point $(p_x, p_y)$. For example, if the data point $(p_x, p_y)$ was not previously represented in the example cross-product summary data structure 1800, the cell 1840 can be initialized to have a count=1, with all the other cells newly added to the cross-product summary data structure 1800 initialized to have counts=0. Otherwise, if the data cell 1840 already exists, the data point $(p_x, p_y)$ can be added to the example cross-product summary data structure 1800 by simply incrementing the count maintained by this data cell.

In order to determine an approximate joint dominance value $\hat{\phi}(q)$ for a particular data point q, the example joint dominance controller 1620 of the example query processor 250 is configured to identify all cells dominated by q and sum their respective counts. The approximation error in $\hat{\phi}(q)$ arises because q may fall within a cell. In such a scenario, and with reference to the example cross-product summary data structure 1800, all cells below and to the left of a cell corresponding to the data point q represent data points that are strictly dominated by q, and all cells above or to the right contain points are not dominated by q. The remaining cells represent data points that may or may not have been dominated by q. However, this uncertainty can be bounded. For example, consider a data point $q=(q_x, q_y)$. Suppose the one-dimensional X and Y data summaries are quantile summaries with accuracy parameters $\varepsilon_x$ and $\varepsilon_y$ respectively. In such an example, an estimate of $\text{rank}_x(q)$ will have an uncertainty of at most $\varepsilon_x N$, with this uncertainty arising from the unknown rankings of the input data points whose x values fall in the cell represented by $q_x$. Similarly, an estimate of $\text{rank}_y(q)$ will have an uncertainty of at most $\varepsilon_y N$, with this uncertainty arising from the unknown rankings of the input data points whose y values fall in the cell represented by $q_y$. Consequently, the approximation error is at most $(\varepsilon_x+\varepsilon_y)N$. By setting the parameter $\varepsilon_x=\varepsilon_y=\varepsilon/2$, it is possible to obtain the required error guarantee X to estimate the φ-dominance of any point. The memory space used by the cross-product technique depends on the product of the sizes of the one-dimensional summary data structures employed. Example combinations include GK×GK, QD×QD or even GK×QD.

In an example implementation, the query processor 250 of FIG. 17 is configured to determine approximate (φ, α)-quantiles using the cross-product technique as follows. First, the example skewness controller 1625 and the example joint dominance controller 1620 operate to determine approximate skewness values $\hat{\alpha}$ and joint dominance values $\hat{\phi}$ for each example data point value corresponding to each cell in the example cross-product data summary X×Y. Next, the example dominance-skewness quantile controller 1630 operates on the summary data cells as if they were actual input data points to identify the cell associated with specified statistical dominance point descriptor values (φ,α) to be the approximate (φ,α)-quantile corresponding to these specified values. Generally, there will be an example data point p stored in the example cross-product data summary that is sufficiently close to the data point q that is the true ($\phi$, $\alpha$)-quantile for particular $\phi$ and $\alpha$ values such that p would be a good approximate quantile. However, if the some other point p' instead of p is identified to be the approximate ($\phi$, $\alpha$)-quantile, this is because p' either approximately $\alpha$-dominates p or approximately $\phi$-dominates p, and so is close to p in this sense. Consequently, the cross-product data summary technique can be used to determine the approximate ($\phi$, $\alpha$) values and also determine approximate ($\phi$, $\alpha$)-quantiles with $\epsilon_\phi=2\epsilon$ and $\epsilon_\phi=\epsilon/(4\phi(q))$.

Because the GK technique typically attains the best space usage on one-dimensional data, it is expected that GK×GK will attain the best space usage of possible the cross-product implementation identified above. Asymptotically, the space usage of GK×GK is bounded by $$O\left(\frac{1}{\varepsilon^2}\log^2 \varepsilon N\right).$$

The time cost of many, if not all, cross-product algorithms can be somewhat high. For efficiency, a hash table may be used to store only those cells (x, y) in the grid that having a non-zero count. The GK technique (along with other one-dimensional algorithms) adds a new item to the data structure for each data point insertion operation. In two dimensions, a new insertion adds $$O\left(\frac{1}{\varepsilon}\log \varepsilon N\right)$$

new cells, but by using the hash table approach, only O(1) operations to update cells with non-zero counts because it is necessary to create or increment the count of only a single cell, ($p_x$, $p_y$), with all other cells in the column $\{p_x\}\times Y$ and the row $X\times\{p_y\}$ being implicitly created with a count of zero, or left alone. Performing a compression operation requires time linear in the worst case size of the data structure or, in other words, $$O\left(\frac{1}{\varepsilon^2}\log^2 \varepsilon N\right).$$

Such a compression operation involves compressing each of the one dimensional data structures independently, and when two tuples are merged in the one-dimensional data structures, merging together the cells associated with the corresponding rows and/or columns of the cross-product data structure. Merging a row takes time linear in its size, and compressing each one-dimensional data structure also takes linear time, so the total time cost a compression operation is worst case bounded by the size of the data structure. By performing a compression operation after every $$O\left(\frac{1}{\varepsilon}\log \varepsilon N\right)$$

insertion operations, the space bounds are preserved, while the amortized time cost is $$O\left(\frac{1}{\varepsilon}\log \varepsilon N\right)$$

per update. The time to compute an approximate joint dominance value is $\hat{\phi}(p)$ is at most linear in the size of the data structure, and to compute $\hat{\phi}$ for every stored point is at most logarithmically longer in the size of the data structure.

Figure 19:
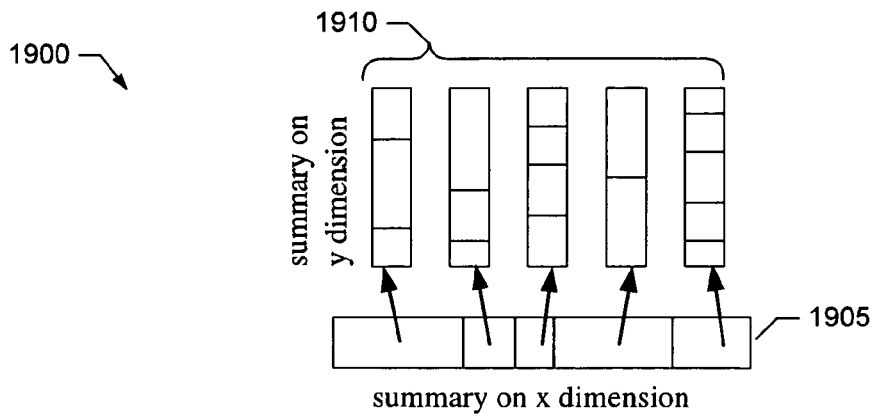
FIG. 19 illustrates a second example summary data implementation for use by the second example query processor of FIG. 17.

A second possible multidimensional summary data implementation technique supported by the example query processor 250 of FIG. 17 is the deferred-merge summary data technique. An example deferred-merge summary data structure 1900 illustrated in FIG. 19. With reference to FIG. 19, in the deferred-merge summary data technique, a processing order is assigned to the dimensions, with a compressing one-dimensional data summary structure 1905 having a uniform error guarantee of $\epsilon_x$ used on a primary dimension (such as the x-dimension). Multiple strongly mergable one-dimensional data summary structures 1910 having a uniform error guarantee of $\epsilon_y$ are then used on a secondary dimension (such as the y-dimension). Responding to statistical dominance queries will require the merging of multiple secondary data structures 1910, but this merging is deferred to query time. In an example implementation, either the GK or QD one-dimensional data summary technique is used for the primary axis, whereas the QD technique is used for the secondary access due to its mergable properties. The example deferred-merge summary data structure 1900 demonstrates how information concerning ranks of x-values is tracked in the primary data structure 1905. Within each range represented by the primary data structure 1905, a separate secondary data structure 1910 stores information about concerning of y-values.

In an example two-dimensional implementation, such as the example of FIG. 19, the x-dimension to set to be the primary dimension, and the y-dimension is set to be secondary. For each newly obtained input data point p=($p_x$, $p_y$), the x-value $p_x$ is inserted by the example summary data insertion processor 1710 into the compressing one-dimensional data summary structure 1905 representing the x-dimension. Instead of just keeping a count of the number of items retained in each tuple of the primary data structure 1905, the deferred-merge technique also maintains a secondary one-dimensional data structure 1910 that summarizes the y-values of all points that are summarized in the tuple. Thus, after finding the tuple into which $p_x$ is to be inserted, $p_y$ is then inserted by the example summary data insertion processor 1710 into the corresponding secondary one-dimensional data structure 1910. To compress the data structure 1900, the example summary data compression processor 1720 performs a compression operation on the one-dimensional data summary 1905 of x-values. If the compression operation merges tuples in this structure, then example summary data merging processor 1725 also merges together the respective data summaries 1910 of y-values and the example summary data compression processor 1720 performs a one-dimensional compression on the result.

In order to determine an approximate joint dominance value $\hat{\phi}(q)$ for a particular data point q=($q_x$, $q_y$), the example joint dominance controller 1620 can use the x-value $q_x$ to find the tuple in the primary data structure 1905 corresponding to $q_x$. Then, the example joint dominance controller 1620 operates to merge together all secondary data summaries 1910 of y-values to the left of the identified tuple in the primary data structure 1905 corresponding to $q_x$. The example joint dominance controller 1620 then operates to identify the tuple of resulting merged secondary data summaries 1910 corresponding to the y-value $q_y$. The approximation error from this approach comes from two sources: (1) uncertainty due to data summary of x-values, and (2) uncertainty due to the data summary of y-values. The error guarantees for the data summary 1905 of the x-values ensure that the uncertainty is at most $\epsilon N$ points. Similarly, the merged summary of y-values gives an error guarantee depending on $\epsilon_y$. In order to get the required accuracy bounds, the parameters $\epsilon_x$ and $\epsilon_y$ less than or equal to $\epsilon/2$, giving accuracy $\epsilon N$ or better for each query.

In an example implementation, the query processor 250 of FIG. 17 is configured to determine approximate $(\phi, \alpha)$-quantiles using the deferred-merge technique similar to the previously described example implementations using the cross-product technique. For example, the example skewness controller 1625 and the example joint dominance controller 1620 operate to determine approximate skewness values $\hat{\alpha}$ and joint dominance value $\hat{\phi}$ for each data point represented in the example deferred-merge data structure 1900. The error guarantees on the accuracy of each estimated $\hat{\alpha}$ and $\hat{\phi}$ are as before in the case of the cross-product technique. Also, the example deferred-merge data structure 1900 implicitly covers the input data space using a set of rectangles, and retains one example data point from the input for each rectangular area. Consequently, the deferred-merge technique determines approximate $(\phi, \alpha)$-quantiles with $\phi(q)$ and $$\frac{1}{4}\left(\frac{1}{\varphi(q)}-1\right).$$

Lastly, we observe that the memory space bound for the deferred-merge technique is at most the product of the space bounds of the techniques used on each axis. For example, the deferred merge technique can be implemented using either GK or QD on the primary (x) axis, but require a strongly mergable algorithm for the secondary (y) axis, which results in implementation combinations of GK×QD or QD×QD.

In the case of a GK×QD implementation, the GK technique is a compressing summary data technique that typically achieves the best space in one dimension. The QD technique is a mergable summary data technique that also has relatively small space cost. The worst case bound on the space needed is the product of the space bounds, that is, $$O\left(\frac{1}{\varepsilon^2}\log\varepsilon N\log U\right).$$

To insert a new data point $p=(p_x, p_y)$, into the example deferred-merge data structure 1900, $p_x$ is inserted into the GK structure, and $p_y$ along with the inserted point itself is stored in a QD summary of size 1. To compress the example deferred-merge data structure 1900, a one-dimensional compression operation is performed on the GK structure 1905 with error parameter $\epsilon_x=\epsilon/2$, and when two tuples in the GK structure 1905 are merged, their corresponding QD summaries 1910 along the y-axis are also merged. A one-dimensional compression operation is then run on the resulting merged y-axis QD data summary 1910 with error parameter $\epsilon_y=\epsilon/2$. The time to perform the compression is thus worst case bounded by time linear in the total data structure. This can be amortized by running a compression operation only after every $$O\left(\frac{1}{\varepsilon^2}\log\varepsilon N\log U\right)$$

updates, which retains the asymptotic space bounds, and ensures that the update cost is dominated by the cost of inserting into one GK structure and one QD structure, which is $$O\left(\log\left(\frac{1}{\varepsilon}\right)+\log\log U\right).$$

The overall uncertainty in $\phi$-dominance queries is at most $\epsilon$, with half due to the uncertainty in querying the final merged summary of y values, and half coming from the uncertainty due to the summary of the x-values.

A potentially useful feature of the deferred-merge summary data technique is that the size of the data structure 1900 is never more than the size of the input data set, since each input point corresponds to at most one tuple in the summary. This is in contrast to the following technique to be described, which has the potential during early processing phases to represent the data in a memory space several times the size of the input data set.

A third possible multidimensional summary data implementation technique supported by the example query processor 250 of FIG. 17 is the eager-merge summary data technique. The eager-merge summary data technique for multidimensional data also utilizes one-dimensional data summary techniques. In an example implementation, the eager-merge summary data technique employs a compressing hierarchical one-dimensional data summary technique on the primary dimension/axis, such as the x-axis, with a uniform error guarantee of $\epsilon_x$. However, instead of utilizing a one-dimensional technique on the secondary dimension/axis, such as the y-axis, that is strongly mergable (as in the deferred-merge case), the eager merge technique inserts the secondary (y) dimensional value of a particular data point into each level of a hierarchical summary, and (weakly) merges appropriate outputs from these structures at query time.

Figure 20:
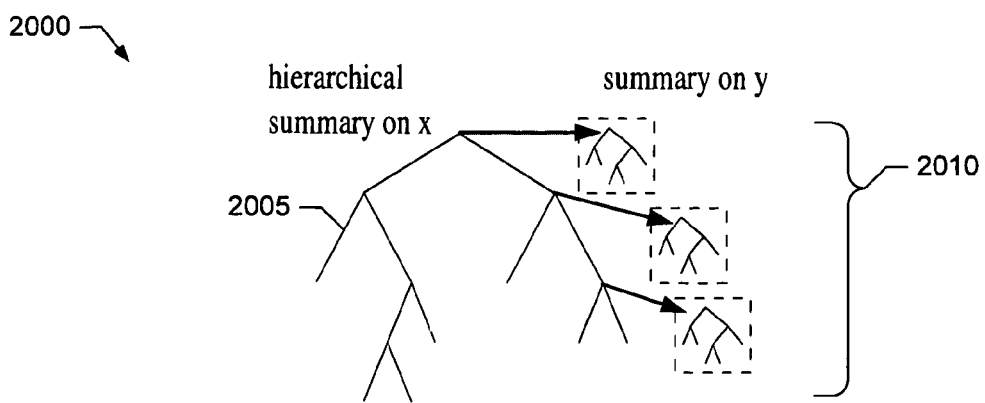
FIG. 20 illustrates a third example summary data implementation for use by the second example query processor of FIG. 17.

An example eager-merge summary data structure 2000 illustrated in FIG. 20. With reference to FIG. 20, a summary data structure 2005 representative of the primary dimension/axis is arranged in a hierarchical manner. In the illustrated example, the primary summary structure 2005, therefore, divides the x-dimensional values into ranges represented by different nodes in a hierarchical tree. Furthermore, for each materialized node in the primary data structure 2005, a separate secondary data structure 2010 is maintained that is representative of the y-dimensional values of all points allocated to the particular node or any of its descendants, with an appropriate error guarantee set to ensure accurate answers. For each newly obtained input data point $p=(p_x, p_y)$, the example summary data insertion processor 1710 first locates the node in the x-dimension primary data structure 2005 corresponding to $p_x$. Then, the example summary data insertion processor 1710 inserts $p_y$ into the corresponding y-dimension secondary data structure 2010 of the node corresponding to $p_x$, and also into the y-dimension secondary data structures 2010 of every ancestor of the node corresponding to $p_x$. When a new node is added to the primary data structure 2005 or a secondary data structure 2010, the value of the data point p causing the node to be created is also stored as the example data point value associated with the newly created node.

To perform compression, the example summary data compression processor 1720 first compresses the primary data structure 2005 corresponding to the x-dimension/axis. The example summary data compression processor 1720 then performs compression on each of the secondary data structures 2010 corresponding to the y-dimension/axis. For example, to compress the primary (x) data structure 2005, the summary data compression processor 1720 merges child nodes into respective parent nodes, when appropriate, by updating the counts associated with the nodes. The secondary (y) data structures 2010 corresponding to deleted child nodes can simply be deleted. In other words, there is no need to merge a secondary (y) data structure 2010 into a respective secondary structure associated with a parent node because, during insertions, every newly inserted data point was placed into the secondary (y) data structure 2010 of every ancestor node. After deleting secondary (y) data structure 2010 associated with nodes merged in the primary (x) data structure 1005, the example summary data compression processor 1720 then compressed the remaining summary data structures. A straightforward memory space bound can be determined as the product of the x-dimension and y-dimension space bounds, but tighter bounds can be determined by using the fact that each point is represented at most once per hierarchical level. In an example implementation, hierarchical one-dimensional data summary technique, such as QD, is used for the primary (x) data structure 2005, with (weakly) mergable one-dimensional data summary techniques being used for the secondary (y) data structures 2010. Example implementation possibilities include QD×QD and QD×GK.

The primary (x) data structure 2005 and the secondary (y) data structures 2010 implicitly cover the entire data space with rectangular regions, each of which stores points from the actual data input. Thus, it is possible to determine approximate ($\phi$, $\alpha$) quantiles as in the cross-product and/or deferred-merge technique, that is, by determining approximate $\phi$-dominance and $\alpha$-skewness of every example data point value that is retained in the example eager-merge data summary 2000, and then determining proximate ($\phi$, $\alpha$)-quantiles using these values. The bounds for approximate ($\phi$, $\alpha$) dominance values and the approximate ($\phi$, $\alpha$)-quantiles determined by the eager-merge technique are the same as for the deferred-merge technique.

In the case of a QD×QD implementation, the eager-merge technique uses QD as the one-dimensional summary data technique on the primary (x) dimension, as this technique is hierarchical. This example implementation also uses QD on the second dimension. An example implementation using the QD×GK combination was also considered, but the QD×QD instantiation appears to exhibit better worst case space bounds. Rather than using the number of points within the secondary (y) data summaries 2010 as a basis for determining when to perform compression, compression is performed based on N, the total number of points in the eager-merge summary data structure 2000. This is because the overall error guarantee is in terms of $\epsilon$N, and also gives a tight space bound. Within each secondary (y) data summary 2010, a local error tolerance is set to $\epsilon/(2 \log U)$. This tolerance is chosen to ensure that the error tolerance are summed over log U different summaries, the total error will be bounded by $\epsilon/2$.

Additionally, two-dimension data point insertion operations in the eager-merge technique take time $O(\log U \log \log U)$. For example, a one-dimensional insertion operation is performed for $O(\log U)$ nodes in the primary (x) data summary 2005, and each of the insertion can be completed in time $O(\log \log U)$ on the y-dimensional summaries. Furthermore, two-dimension compression operations in the eager-merge technique takes time linear in the size of the data structure, since compression reduces to performing one-dimensional compression on multiple one-dimensional data structures, each of which takes time linear in the size of their substructure. The amortized update time is therefore $O(\log U \log \log U)$.

To determine approximate $\phi$-dominance values for a given data point $q=(q_x, q_y)$ using the eager-merge technique, a set of nodes in the primary (x) data summary 2005 is identified by representing $q_x$ as a union of disjoint ranges from the hierarchy. The binary tree structure of the QD technique ensures that there are at most log U nodes in this set. For each node in the set, the secondary y data summary 2010 is analyzed to identify those hierarchical nodes associated with values less than $q_y$, and the count information in those identified nodes is then summed to obtain the estimate of the two-dimensional rank of q, rank(q), used to determine the approximate $\phi$-dominance value. For example, referring to the example eager-merge summary data structure 2000 of FIG. 20, $q_x$ is broken into two secondary (y) data summaries, one on the first half of the horizontal span, another on the next quarter. Summing the accuracy bounds over the at most log U queries gives error at most $\epsilon/2$ when determining the number of points within a region corresponding to a computed dominance value. The uncertainty associated with the primary (x) data summary is also at most $\epsilon/2$, so the total error is at most $\epsilon$. Since $\phi$-dominance value determination examines at most log U secondary (y) data summaries, each in time $O(\log U)$, the total time cost is $O(\log^2 U)$ per query after a compression operation has updated counts in time $O((\log^3 U)/\epsilon)$.

The space and time bounds of certain example implementations of the cross-product, deferred-merge and eager-merge summary data techniques are shown in Table 2. At first glance, it is difficult to compare these techniques, especially because the relative asymptotic cost depends on the setting of the parameter $\epsilon$, relative to log U. However, comparing eager-merge costs to deferred-merge costs, the space cost trades off roughly a factor $O(1/\epsilon)$ for one of $O(\log U)$. This suggests that for very fine accuracy situations in which $$\varepsilon << \frac{1}{\log U},$$

the eager-merge approach will have better space cost performance. Also, comparing cross-product to deferred-merge, it seems possible that the cross-product technique will use less space, especially since GK has been observed to use closer to $O(1/\epsilon)$ space in practice. However, the amortized running time of the deferred-merge technique is exponentially smaller than the amortized running time of the cross-product technique, which can be important in applications involving high speed data streams.

In terms of query time for estimating $\phi$-dominance, all of the examined techniques require a linear pass over the entire two-dimensional data structure to answer the query, so those with smaller space have faster queries. However, if many queries are being computed in a batch, then the time cost of the eager-merge technique can be improved to $O(\log^2 U)$ by taking advantage of the hierarchical structure of the summary. Such an improvement relies on utilizing stored counts within the data structure that are needed by the data insertion and compression operations. By recomputing these counts in a linear pass before each computation of $\hat{\phi}(p)$ the running time is much reduced for each query.

TABLE 2

| Type & Instance | Space | Amortized Time | φ-Query Time | (φ,α)-Quantile Accuracy |
|---|---|---|---|---|
| Cross Product (GK × GK) | $O\left(\frac{\log^2 \varepsilon N}{\varepsilon^2}\right)$ | $O\left(\frac{\log \varepsilon N}{\varepsilon}\right)$ | $O\left(\frac{\log^2 \varepsilon N}{\varepsilon^2}\right)$ | $\varepsilon_\varphi = 2\varepsilon,$ $\varepsilon_\alpha = \frac{\varepsilon}{4\varphi(q)}$ |
| Deferred Merge (GK × QD) | $O\left(\frac{\log U \log \varepsilon N}{\varepsilon^2}\right)$ | $O\left(\log \frac{\log U}{\varepsilon}\right)$ | $O\left(\frac{\log U \log \varepsilon N}{\varepsilon^2}\right)$ | $\varepsilon_\varphi = \varphi(q),$ $\varepsilon_\alpha = \frac{\left(\frac{1}{\varphi(q)} - 1\right)}{4}$ |
| Eager Merge (QD × QD) | $O\left(\frac{\log^3 U}{\varepsilon}\right)$ | $O(\log U \log \log U)$ | $O\left(\frac{\log^3 U}{\varepsilon}\right)$ | $\varepsilon_\varphi = \varphi(q),$ $\varepsilon_\alpha = \frac{\left(\frac{1}{\varphi(q)} - 1\right)}{4}$ |

The preceding descriptions have focused on implementing statistical dominance point descriptors for two-dimensional data, but the example methods and results described herein can be readily extend to support higher-dimensional data sets. For example, the concept of joint (φ) dominance can be readily extended to determining a fraction of data points jointly dominated by a particular data point in d dimensions, d>2, by continuing to examine the dominance in each dimension and combining the result. Additionally, the concept of α-skewness can be readily extended to d dimensions, d>2, by letting $rank_i(p)$ denote the rank of the projection of the multidimensional data point p on the $i^{th}$ dimension of d dimensions. Then, the α-skewness in the $i^{th}$ dimension can be defined using Equation 8, given by:

$$\alpha_i(p) = \frac{rank_i(p)}{\sum_{j=1}^{d} rank_j(p)} \quad \text{Equation 8}$$

Furthermore, $$\sum_{i=1}^{d} \alpha_i(p) = 1,$$

and Equation 8 is consistent with the two-dimensional definition of α-skewness.

The summary data techniques described above can also be extended to higher dimensions. For example, the cross-product technique can be readily extended to arbitrary d dimensional streams by tracking the cross-product of d one-dimensional data summaries. As such, a cross-product technique implemented using GK in d dimensions has a space cost of $$O\left(\frac{1}{\varepsilon^d} \log^d(\varepsilon N)\right),$$

and a time cost of $$O\left(\frac{d}{\varepsilon^{d-1}} \log^{d-1}(\varepsilon N)\right).$$

The deferred-merge technique can be generalized to d dimensions by fixing an ordering on the d dimensions, and ensuring that the first dimension utilizes a one-dimensional data summary that is compressing, the $d^{th}$ dimension utilizes a one-dimensional data summary that is mergable, and all intermediate dimensions utilizes one-dimensional data summaries that are both compressing and mergable. An example implementation utilizing the one-dimensional QD technique for every dimension achieves this requirement, with an asymptotic space cost of $$O\left(\frac{1}{\varepsilon^d} \log^d U\right)$$

and an amortized/update time of O(d log log U). Furthermore, the total space can be bounded by N, the size of the input data set.

The eager-merge technique can also be generalized to d dimensions by ensuring the first d−1 dimensions use a hierarchical method. An example implementation utilizing the one-dimensional QD technique for every dimension has a total space cost of $$O\left(\frac{1}{\varepsilon^d} \log^{2d-1} U\right)$$

and an amortized update time of $O(\log^d U)$

Other implementation combinations for higher-dimensional data sets are also feasible. For example, a particular two-dimensional summary data technique (such as cross-product, deferred-merge, eager-merge, etc.) can be designated between the j and $(j+1)^{th}$ dimensions. For example, eager- and deferred-techniques could alternate through the dimensions, provided the merges are carried out by a merge based technique at level j and mergable techniques at level j+1, or a hierarchical technique at level j and a mergable technique at level j+1.

Figure 21:
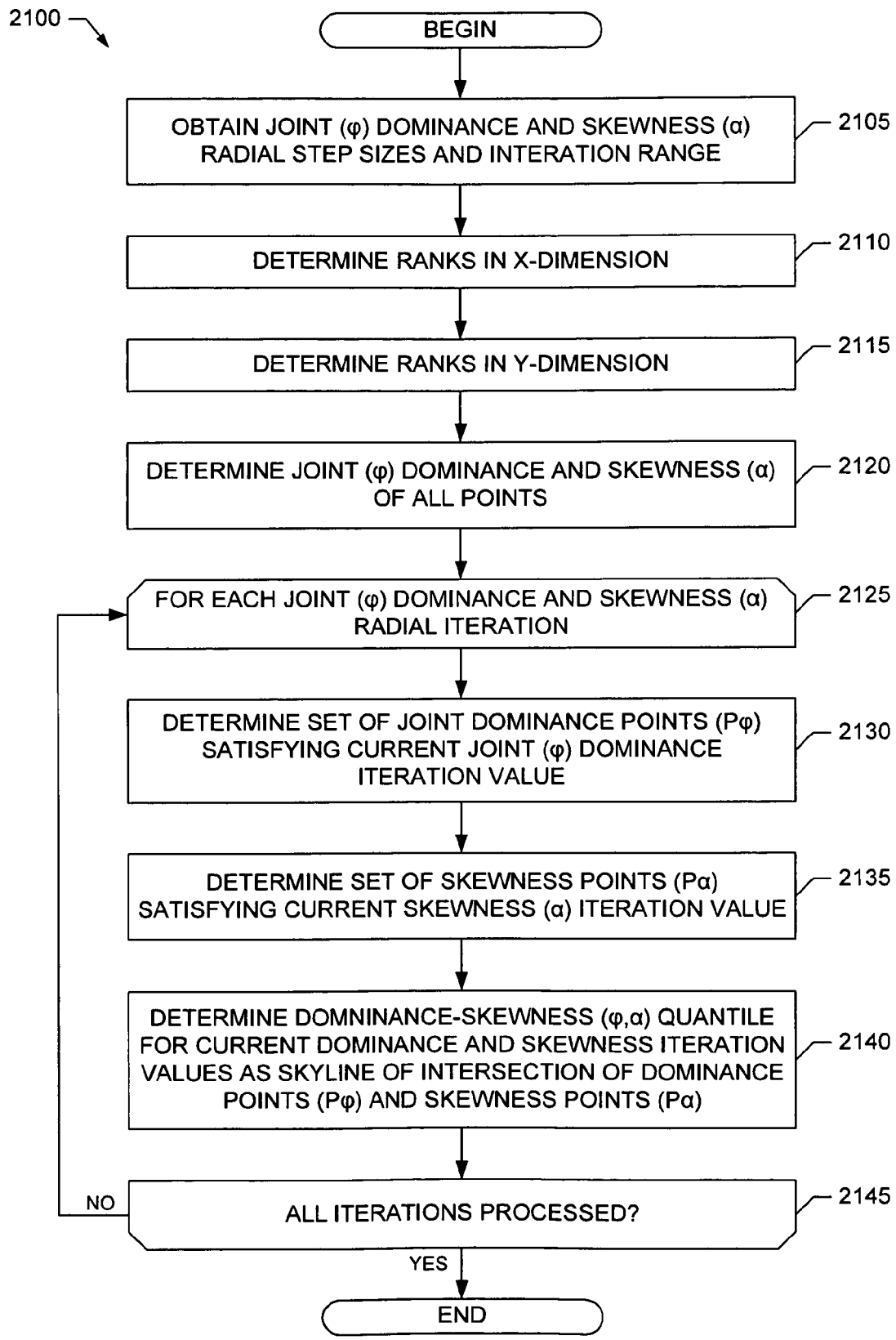
FIG. 21 is a flowchart representative of first example machine readable instructions that may be executed to implement the example statistical dominance processor of FIG. 2.
Figure 22:
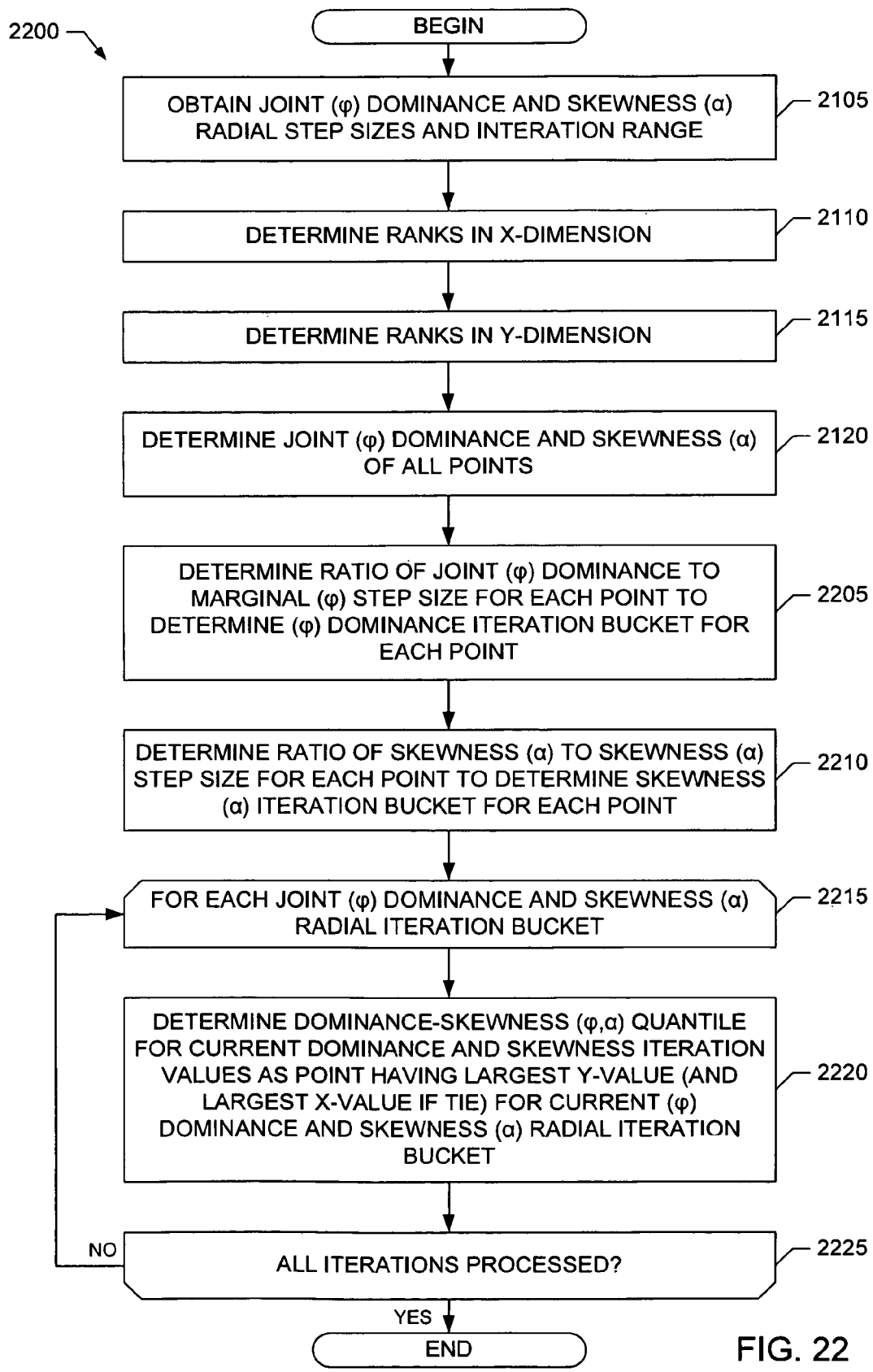
FIG. 22 is a flowchart representative of second example machine readable instructions that may be executed to implement the example statistical dominance processor of FIG. 2.
Figure 23:
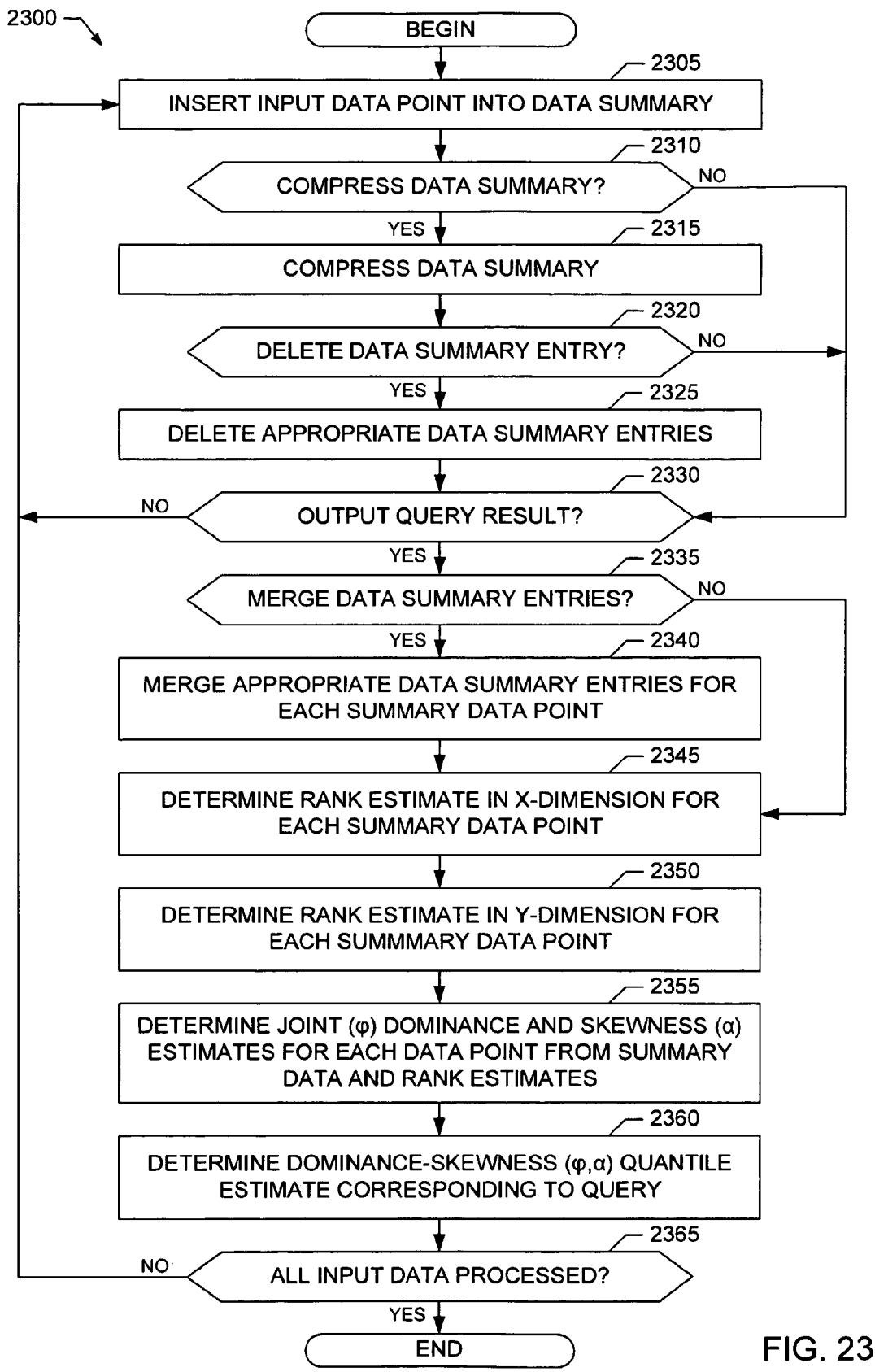
FIG. 23 is a flowchart representative of third example machine readable instructions that may be executed to implement the example statistical dominance processor of FIG. 2.

Flowcharts representative of example machine readable instructions that may be executed to implement the example statistical dominance processor 105, the example data capture interface 205, the example joint dominance processor 210, the example dominance quantour processor 215, the example skewness processor 220, the example rank processor 225, the example skewness radial processor 230, the example dominance-skewness quantile processor 235, the example query interface 240, the example presentation interface 245, the example query processor 250, the example step size and iteration controller 1605, the example x-dimension rank controller 1610, the example y-dimension rank controller 1615, the example joint dominance controller 1620, the example skewness controller 1625, the example dominance-skewness quantile control 1630, the example summary data processor 1705, the example summary data insertion processor 1710, the example summary data deletion processor 1715, the example summary data compression processor 1720 and/or the example summary data merging processor 1725 are shown in FIGS. 21 through 23. In these examples, the machine readable instructions represented by each flowchart may comprise one or more programs for execution by: (a) a processor, such as the processor 3612 shown in the example computer 3600 discussed below in connection with FIG. 36, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 3612, but the entire program or programs and/or portions thereof could alternatively be executed by a device other than the processor 3612 and/or embodied in firmware or dedicated hardware (e.g., implemented by an application specific integrated circuit (ASIC), a programmable logic device (PLD), a field programmable logic device (FPLD), discrete logic, etc.). For example, any or all of the example statistical dominance processor 105, the example data capture interface 205, the example joint dominance processor 210, the example dominance quantour processor 215, the example skewness processor 220, the example rank processor 225, the example skewness radial processor 230, the example dominance-skewness quantile processor 235, the example query interface 240, the example presentation interface 245, the example query processor 250, the example step size and iteration controller 1605, the example x-dimension rank controller 1610, the example y-dimension rank controller 1615, the example joint dominance controller 1620, the example skewness controller 1625, the example dominance-skewness quantile control 1630, the example summary data processor 1705, the example summary data insertion processor 1710, the example summary data deletion processor 1715, the example summary data compression processor 1720 and/or the example summary data merging processor 1725 could be implemented by any combination of software, hardware, and/or firmware. Also, some or all of the machine readable instructions represented by the flowchart of FIGS. 21 through 23 may be implemented manually. Further, although the example machine readable instructions are described with reference to the flowcharts illustrated in FIGS. 21 through 23, many other techniques for implementing the example methods and apparatus described herein may alternatively be used. For example, with reference to the flowcharts illustrated in FIGS. 21 through 23, the order of execution of the blocks may be changed, and/or some of the blocks described may be changed, eliminated, combined and/or subdivided into multiple blocks.

First example machine readable instructions 2100 that may be executed to implement the example statistical dominance processor 105 of FIG. 2 are represented by the flowchart shown in FIG. 21. The example machine readable instructions 2100 may be executed at predetermined intervals, based on an occurrence of a predetermined event (such as when a data set is known to have been obtained), etc., or any combination thereof. Additionally, the example machine readable instructions 2100 are configured to process entire, actual input data sets (as opposed to summary data sets) obtained, for example, via batch data collection operations. As such, the example machine readable instructions 2100 may be executed to implement the example statistical dominance processor 105 with an example query processor 250 implemented as shown in FIG. 16.

Thus, with reference to FIGS. 2 and 16, the example machine readable instructions 2100 of FIG. 21 begin execution at block 2105 at which the example statistical dominance processor 105 obtains a specified joint dominance ($\phi$) step size, a specified skewness ($\alpha$) step size and an iteration range over which joint dominance ($\phi$) and skewness ($\alpha$) are to be determined. For example, to generate the example data presentations depicted in FIGS. 8-15, at block 2105 the example step size and iteration controller 1605 may be configured to obtain joint dominance ($\phi$) and/or skewness ($\alpha$) step sizes both equal to 0.1, and a number of iterations set to 9 for joint dominance ($\phi$) and skewness ($\alpha$) determination.

Next, control proceeds to block 2110 and 2115 at which the example statistical dominance processor 105 determines the one dimensional marginal rank in the x-dimension ($rank_x$) and the one-dimensional marginal rank in the y-dimension ($rank_y$) for all data points in an obtained input two-dimensional data set. For example, at block 2110 the example rank processor 225 included in the example statistical dominance processor 105 may be configured to determine a one dimensional marginal rank for a particular input data point along the x-dimension by sorting the input data points along the particular dimension and then determining the position of the particular point in the sorted set of data points. Similarly, at block 2115 the example rank processor 225 included in the example statistical dominance processor 105 may be configured to determine a one dimensional marginal rank for a particular input data point along the y-dimension by sorting the input data points along the particular dimension and then determining the position of the particular point in the sorted set of data points.

Control next proceeds to block 2120 at which the example statistical dominance processor 105 determines joint dominance ($\phi$) and skewness ($\alpha$) values to be associated with each input data point. For example, at block 2120 the example joint dominance processor 210 included in the example statistical dominance processor 105 may be configured to determine the joint dominance ($\phi$) of an input data point $p=(p_x, p_y)$ to be the fraction $\phi$ of points $q=(q_x, q_y)$ from the input data set that are $\phi$-dominated by p as given by Equation 2. Furthermore, in an example implementation, at block 2120 the example skewness processor 220 included in the example statistical dominance processor 105 may be configured to determine the skewness value $\alpha(p)$ of the point p using $rank_x(p)$, the one-dimensional rank of the point p along the x-dimension, and $rank_y(p)$, the one-dimensional rank of the point p along the y-dimension, as given by Equation 4.

Next, control proceeds to block 2125 at which the example statistical dominance processor 105 begins calculating the dominance-skewness ($\phi$, $\alpha$)-quantile for each specified iteration range and joint dominance ($\phi$) and skewness ($\alpha$) step sizes specified at block 2105. For example, to determine the dominance-skewness ($\phi$, $\alpha$)-quantile for the current iteration, at block 2130 the example dominance-skewness quantile processor 235 included in the example statistical dominance processor 105 identifies the subset of data points $P_\phi$ from the input data set associated with joint dominance values $\phi(p)$ less than or equal to the specified joint dominance value $\phi$ corresponding to the current iteration. Similarly, at block 2135 the example dominance-skewness quantile processor 235 included in the example statistical dominance processor 105 identifies the subset of data points $P_\alpha$ from the input data set associated with skewness values $\alpha(p)$ less than or equal to the specified skewness value $\alpha$ corresponding to the current iteration.

Control then proceeds to block 2140 at which the example dominance-skewness quantile processor 235 included in the example statistical dominance processor 105 determines the dominance-skewness ($\phi$, $\alpha$)-quantile for the current iteration of joint dominance ($\phi$) and skewness ($\alpha$) values to be the data point corresponding to the skyline of the intersection of the subset of dominance points $P_\phi$ and the subset of skewness points $P_\alpha$ determined at block 2130 and 2135. For example, at block 2140 the example dominance-skewness quantile processor 235 may be configured to identify the subset of data points $P_\phi \cap P_\alpha$ forming the intersection of the $P_\phi$ and $P_\alpha$ data sets. The example dominance-skewness quantile processor 235 may be configured to then determine the skyline of the data set $P_\phi \cap P_\alpha$ based on $\phi$-dominance or, in other words, identify a subset of data points from the data set $P_\phi \cap P_\alpha$ that are not jointly dominated by any other data point in the data set $P_\phi \cap P_\alpha$. Finally, the example dominance-skewness quantile processor 235 may be configured to identify the ($\phi$, $\alpha$)-quantile for the input data set to be the particular data point determined by taking the skyline of the data set $P_\phi \cap P_\alpha$ based on Q-dominance or, in other words, having a largest skewness value relative to all other data points after taking the skyline of the data set $P_\phi \cap P_\alpha$ based on $\phi$-dominance.

Control next proceeds to block 2145 at which the example statistical dominance processor 105 determines whether all iterations have been processed. If all iteration have not been processed (block 2145), control returns to block 2125 and blocks subsequent thereto at which the example statistical dominance processor 105 begins calculating the dominance-skewness ($\phi$, $\alpha$)-quantile for the next iteration. Otherwise, execution of the example machine readable instructions 2100 ends.

Second example machine readable instructions 2200 that may be executed to implement the example statistical dominance processor 105 of FIG. 2 are represented by the flowchart shown in FIG. 22. The example machine readable instructions 2200 may be executed at predetermined intervals, based on an occurrence of a predetermined event (such as when a data set is known to have been obtained), etc., or any combination thereof. Additionally, like the example machine readable instructions 2100, the example machine readable instructions 2200 are configured to process entire, actual input data sets (as opposed to summary data sets) obtained, for example, via batch data collection operations. As such, the example machine readable instructions 2200 may be executed to implement the example statistical dominance processor 105 with an example query processor 250 implemented as shown in FIG. 16.

Furthermore, the second example machine readable instructions 2200 illustrated in FIG. 22 includes many blocks in common with the first example machine readable instructions 2100 illustrated in FIG. 21. As such, like blocks in FIGS. 21 and 22 are labeled with the same reference numerals. The detailed descriptions of these like blocks are provided above in connection with the discussion of FIG. 21 and, in the interest of brevity, are not repeated in the discussion of FIG. 22.

Thus, with reference to FIGS. 2 and 16, the example machine readable instructions 2100 of FIG. 22 begin execution at blocks 2105 through 2120 as described above in connection with FIG. 21. Next, control proceeds to block 2205 at which the example statistical dominance processor 105 determines a ratio of the determined joint dominance ($\phi$) to the specified joint dominance ($\phi$) step-size for each input data point to determine a joint dominance ($\phi$) iteration bucket associated with the input data point. The joint dominance ($\phi$) iteration bucket for a particular joint dominance ($\phi$) corresponds to how many integer multiples of the specified joint dominance ($\phi$) step-size make up the joint dominance ($\phi$) value, rounded to the next highest integer. Similarly, at block 2210, the example statistical dominance processor 105 determines a ratio of the determined skewness value ($\alpha$) to the specified skewness ($\alpha$) step-size for each input data point to determine a skewness ($\alpha$) iteration bucket associated with the input data point. The skewness ($\alpha$) iteration bucket for a particular skewness ($\alpha$) corresponds to the how many integer multiples of the specified skewness ($\alpha$) step-size make up the joint dominance ($\alpha$), rounded up to the nearest integer.

Next, at block 2215, the example statistical dominance processor 105 begins iterating through each determined joint dominance ($\phi$) iteration bucket and skewness ($\alpha$) iteration bucket to determine the dominance-skewness ($\phi$, $\alpha$)-quantiles corresponding to all joint dominance ($\phi$) iteration bucket and skewness ($\alpha$) iteration bucket combinations. For example, at block 2220 the example dominance-skewness quantile processor 235 is configured to utilize at least some of the properties of dominance-skewness ($\phi$, $\alpha$)-quantiles described above to determine the dominance-skewness ($\phi$, $\alpha$)-quantile for a particular joint dominance ($\phi$) iteration bucket and skewness ($\alpha$) iteration bucket combination to be the input data point having the largest y-dimensional value that was assigned to the particular combination of joint dominance ($\phi$) iteration bucket and skewness ($\alpha$) iteration bucket. In the case of multiple assigned input data points having equal y-dimensional values, the input data point having the largest x- and y-dimensional values is selected to be the dominance-skewness ($\phi$, $\alpha$)-quantile for the particular joint dominance ($\phi$) iteration bucket and skewness ($\alpha$) iteration bucket combination.

Control next proceeds to block 2225 at which the example statistical dominance processor 105 determines whether iterating through the determined joint dominance ($\phi$) iteration bucket and skewness ($\alpha$) iteration bucket combinations is complete. If such iterating is not complete (block 2225), control returns to block 2215 at which the example statistical dominance processor 105 continues determining dominance-skewness ($\phi$, $\alpha$)-quantile for the remaining joint dominance ($\phi$) iteration bucket and skewness ($\alpha$) iteration bucket combinations. However, if such iterating is complete (block 2225), execution of the example machine readable instructions 2200 ends.

Third example machine readable instructions 2300 that may be executed to implement the example statistical dominance processor 105 of FIG. 2 are represented by the flowchart shown in FIG. 23. The example machine readable instructions 2300 may be executed at predetermined intervals, based on an occurrence of a predetermined event (such as when a data set is known to have been obtained), etc., or any combination thereof. Additionally, example machine readable instructions 2300 are configured to process summary data sets determined from data points obtained sequentially, for example, via a streaming operation. As such, the example machine readable instructions 2300 may be executed to implement the example statistical dominance processor 105 with an example query processor 250 implemented as shown in FIG. 17.

Thus, with reference to FIGS. 2 and 17, the example machine readable instructions 2300 of FIG. 23 begin execution at block 2305 at which the example statistical dominance processor 105 inserts a newly obtained data point into a summary data set, or data summary, typically requiring less memory space than the corresponding complete actual data set. For example, at block 2305 the example summary data insertion processor 1710 included in the example statistical dominance processor 105 may be configured to insert the newly obtained data point into a cross-product, deferred-merge or eager-merge data summary as described above.

Next, control proceeds to block 2310 at which the example statistical dominance processor 105 determines whether the data summary is to be compressed. For example, at block 2310 the example statistical dominance processor 105 may determine that a compression of the data summary is to be performed after a certain number of input data samples have been obtained since a previous compression. If the data summary is to be compressed, control proceeds to block 2315 at which the example statistical dominance processor 105 compresses the data summary, for example, to reduce its memory size. For example, at block 2315 the example summary data compression processor 1720 included in the example statistical dominance processor 105 may be configured to compress the summary data structures implementing the cross-product, deferred-merger or eager-merge summary data structures as described above.

Control next proceeds to block 2320 at which the example statistical dominance processor 105 determines whether one or more entries of the data summary are to be deleted. For example, the compression operation performed at block 2315 may result in one or more summary data structure entries (or cells) being identified for deletion. If one or more entries of the data summary are to be deleted (block 2320), control proceeds to block 2325 at which the example statistical dominance processor 105 via, for example, its example summary data deletion processor 1715, deletes the identified summary data structure entry or entries. Then, control proceeds to block 2330.

At block 2330, the example statistical dominance processor 105 determines whether query results are to be provided. For example, at block 2330 the example statistical dominance processor 105 may be configured to determine one or more statistical dominance values, such as any or all of dominance-skewness ($\phi$, $\alpha$)-quantile estimates, $\phi$-quantour estimates, $\alpha$-radial estimates, etc., associated with the newly obtained input data point and/or one or more specified joint dominance and/or skewness values are to be determined and presented by the example presentation interface 245. If query results are not to be provided (block 2330), control returns to block 2305 and blocks subsequent thereto at which the example statistical dominance processor 105 processes the next newly obtained data point. However, if query results are to be provided (block 2330), control proceeds to block 2335.

At block 2335, the example statistical dominance processor 105 determines whether any entries in the summary data structure(s) need to be merged (as described above) to determine the query results to be provided. If the summary data structure(s) require merging, control proceeds to block 2340 at which the example statistical dominance processor 105 merges the identified summary data structure entries. For example, at block 2340 the example summary data merging processor 1725 included in the example statistical dominance processor 105 merges the appropriate entries in the summary data structures implementing the cross-product, deferred-merge or eager-merge summary data structures as described above.

Next, at block 2345 the example statistical dominance processor 105 determines the marginal rank estimate $rank_x$ in the x-dimension for some or all of the entries (or cells) of the summary data structure. Similar, at block 2350 the example statistical dominance processor 105 determines the marginal rank estimate $rank_y$ in the y-dimension for some or all of the entries (or cells) in the summary data structure. For example, the marginal ranks may be determined at blocks 2345 and 2350 by the x-dimension and y-dimension rank controllers 1610 and 1615 included in the example statistical dominance processor 105 for an entry (or cell) of a cross-product, deferred-merge or eager-merge summary data structure as described above.

Next, at block 2355 the example statistical dominance processor 105 determines the joint dominance estimates $\hat{\phi}$ and skewness estimates $\hat{\alpha}$ for some or all of the entries (or cells) of the summary data structure. For example, at block 2355 the joint dominance estimates $\hat{\phi}$ and skewness estimates $\hat{\alpha}$ may be determined by the joint dominance and skewness controllers 1629 and 1625 included in the example statistical dominance processor 105 for an entry (or cell) of a cross-product, deferred-merge or eager-merge summary data structure as described above.

Next at block 2360 the example statistical dominance processor 105 determines the approximate ($\phi$,$\alpha$)-quantile corresponding to the particular query being processed. For example, the statistical dominance processor 105 may be configured to output the ($\phi$,$\alpha$)-quantile corresponding to the newly obtained input data point and/or determine an example data point value representative of the entry (or cell) of the summary data structure corresponding to an approximate ($\phi$,$\alpha$)-quantile for specified input joint dominance $\phi$ and skewness $\alpha$ values. In an example implementation involving the latter determination, at block 2360 the example joint dominance controller 1620 included in the example statistical dominance processor 105 may be configured to determine the approximate ($\phi$,$\alpha$)-quantile of a cross-product, deferred-merge or eager-merge summary data structure for specified input joint dominance $\phi$ and skewness $\alpha$ values as described above. Execution of the example machine readable instructions 2300 then ends.

Example experimental performance results for different multidimensional summary data techniques used to implement the example statistical dominance processor 105 of FIG. 2 are illustrated in FIGS. 24-35. In particular, three example summary data implementations for determining approximate dominance-skewness ($\phi$, $\alpha$) estimation queries are examined, namely, the cross-product technique based on a GK×GK implementation, the deferred-merge technique based on a GK×QD implementation and an eager-merge technique based on a QD×QD implementation.

In the illustrated examples, memory space usage is shown in terms of the number of tuples and as a function of the number of stream tuples that have arrived. Additionally, performance is shown in terms of the throughput, that is, the number of tuples processed per second. The depicted results were generated using a Linux machine with a 2.8 GHz Pentium CPU, 2 GB RAM and 512K cache to implement the example statistical dominance processor 105 using the examined multidimensional data summary techniques. Various synthetic data sets were examined, including data points generated as random uniform data with universe size (U) of $2^{32}$ on each axis independently, Zipfian data having a skew parameter of 1.3 and bivariate Gaussian data sets with varying correlation strengths. Data sets of real network flow data from a router used by a large Internet service provider (ISP) were also examined, with various two-dimensional (2D) data sets obtained by projecting on the fields (numPkts, numBytes), (duration, numBytes) and (srcIP, destIP).

Additionally, performance using a live stream of IP packet traffic monitored at a network interface of a large ISP was also examined. In an example analysis, the traffic speeds varied throughout the day, with a rate of about 200K TCP packets per second at mid-day. The stream data was monitored using a Gigascope system implemented on a FreeBSD machine with a dual Intel Xeon 3.2 GHz CPU and 3.75 GB RAM. The Gigascope system, which is a highly optimized system for monitoring very high speed data streams, is described in C. Cranor, T. Johnson, O. Spatscheck, and V. Shkapenyuk, *Gigascope: A stream database for network applications*, ACM SIGMOD, 2003, pp. 647-651, which is hereby incorporated by reference in its entirety. The examined cross-product, deferred-merge and eager-merge data summary techniques were implemented in the Gigascope system as user-defined aggregate functions (UDAFs).

Figure 24:
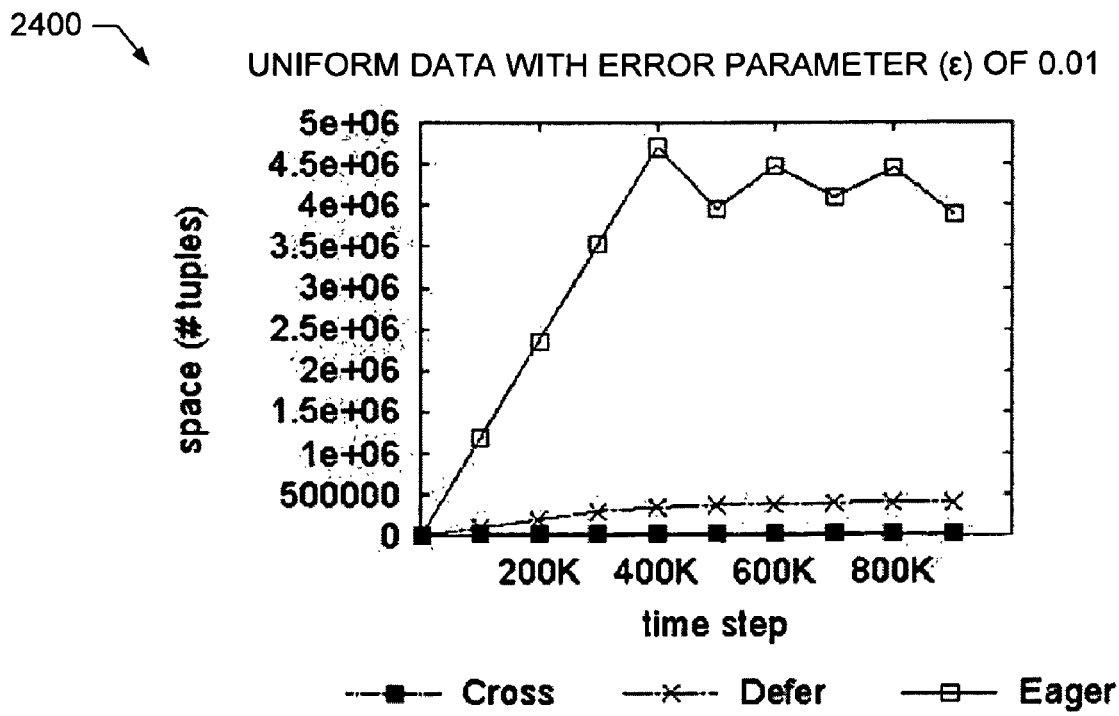
FIGS. 24-35 illustrate example performance results for the example statistical dominance processor of FIG. 2 implemented using the example query processor of FIG. 17 and using the different summary data implementations illustrated in FIGS. 18-20 for different types of multidimensional input data sets and different error criteria.
Figure 25:
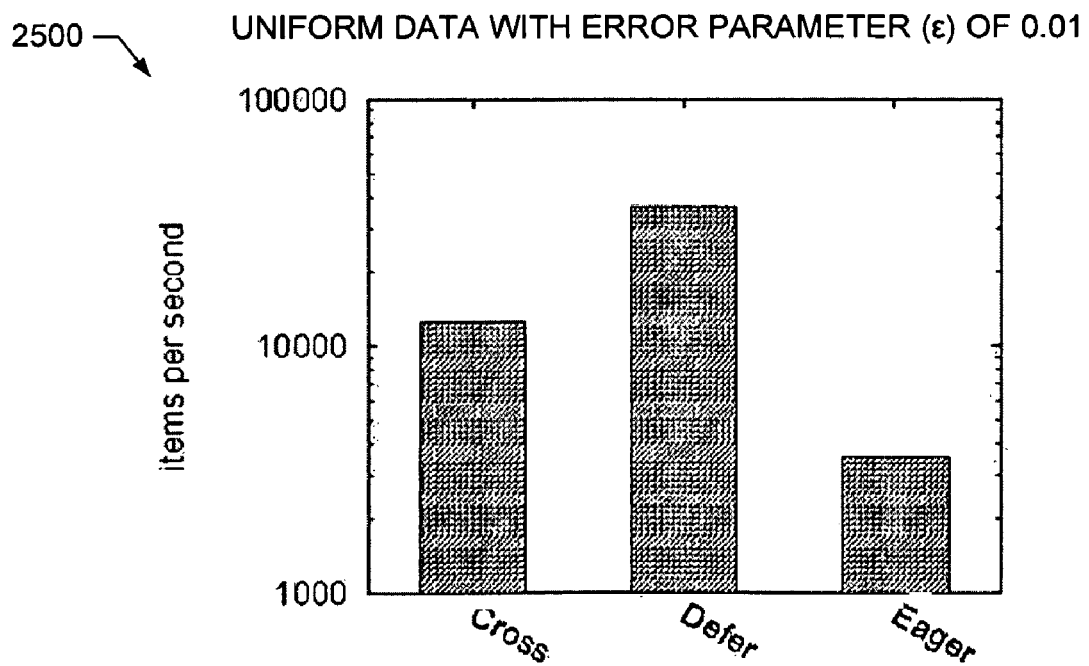
Figure 26:
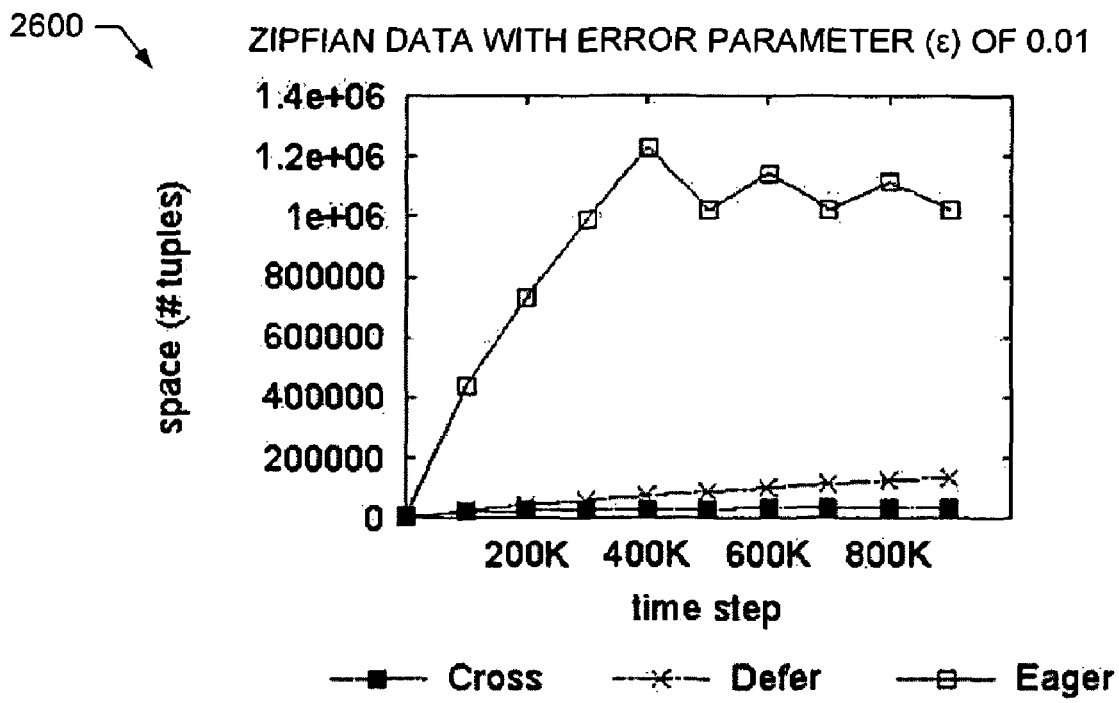
Figure 27:
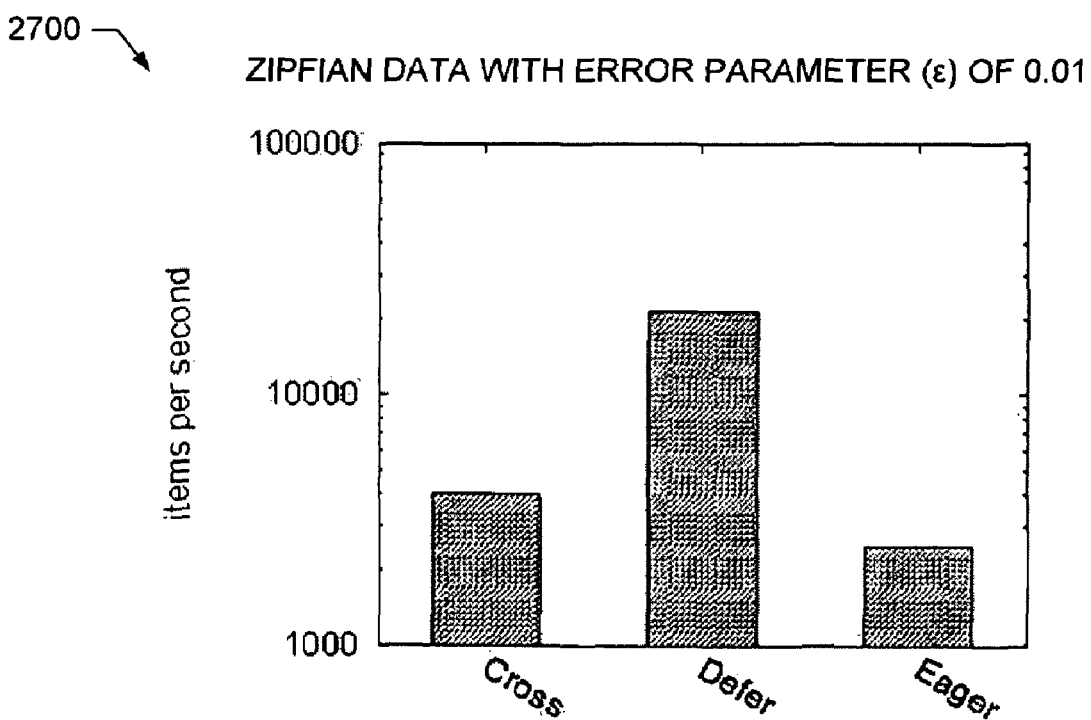
Figure 29:
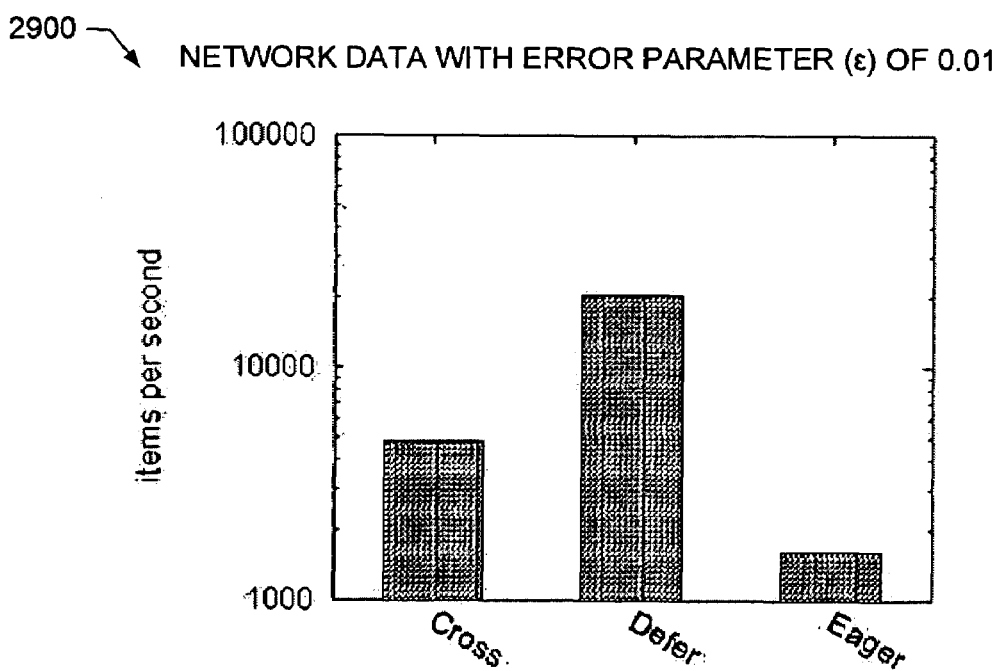
Figure 30:
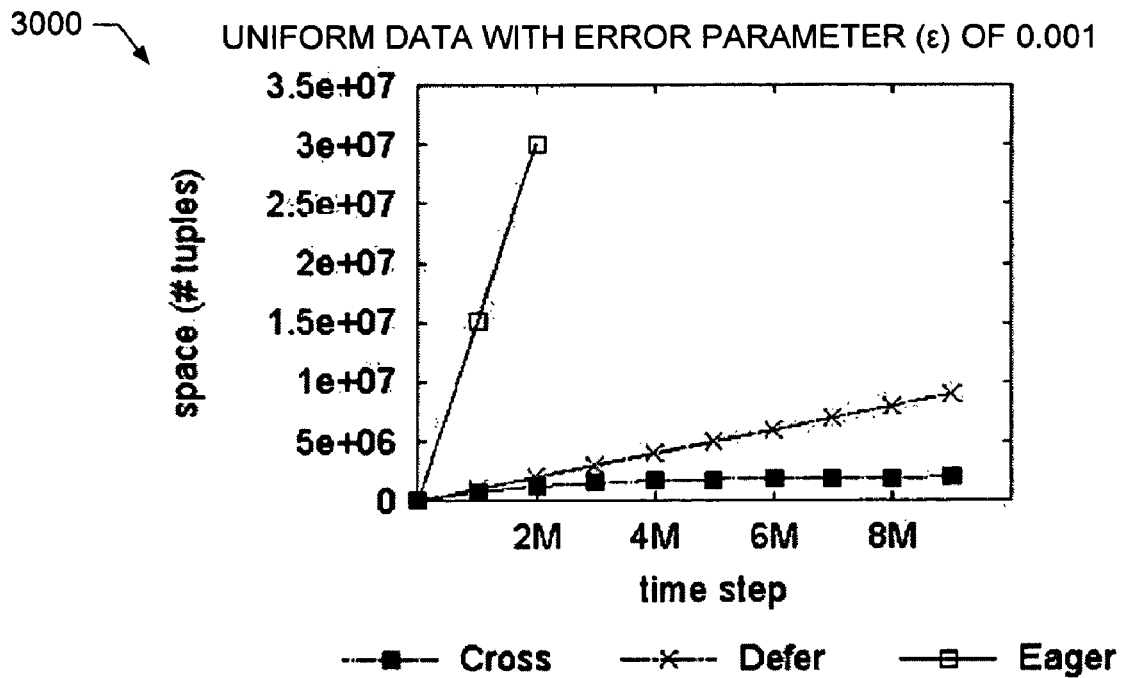
Figure 31:
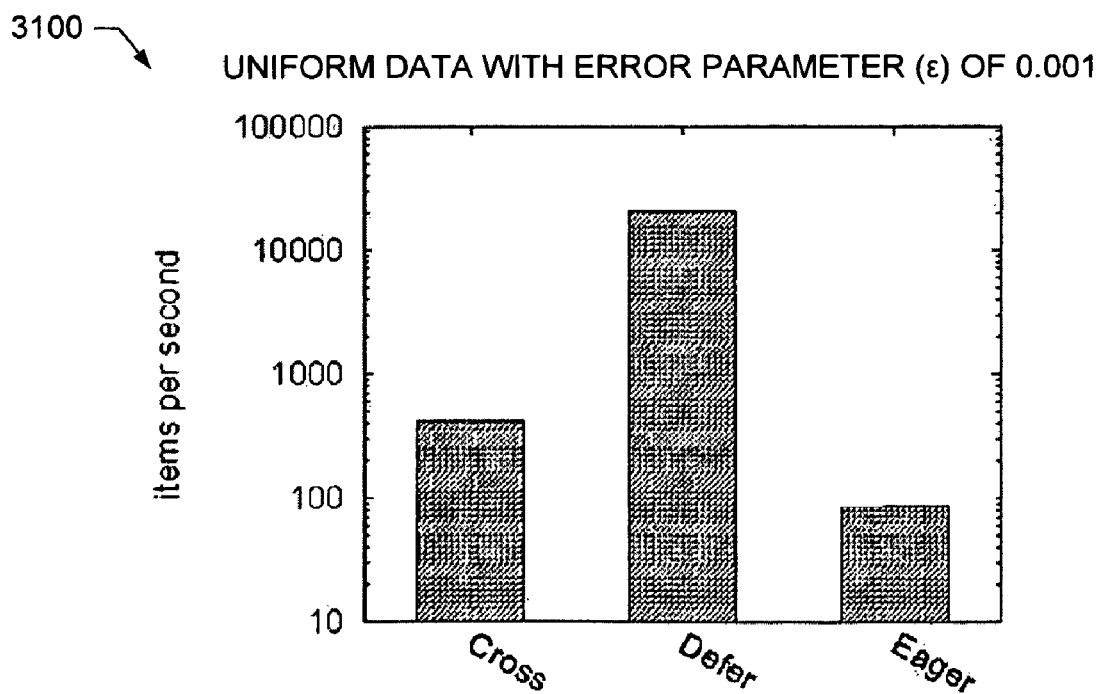
Figure 32:
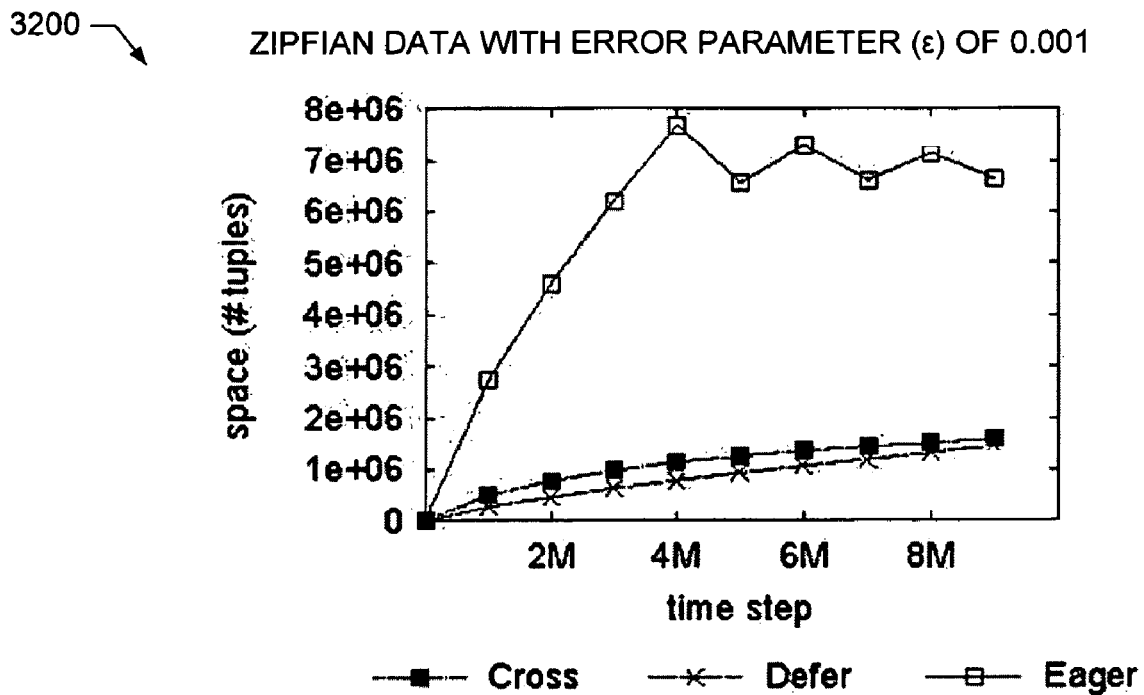
Figure 33:
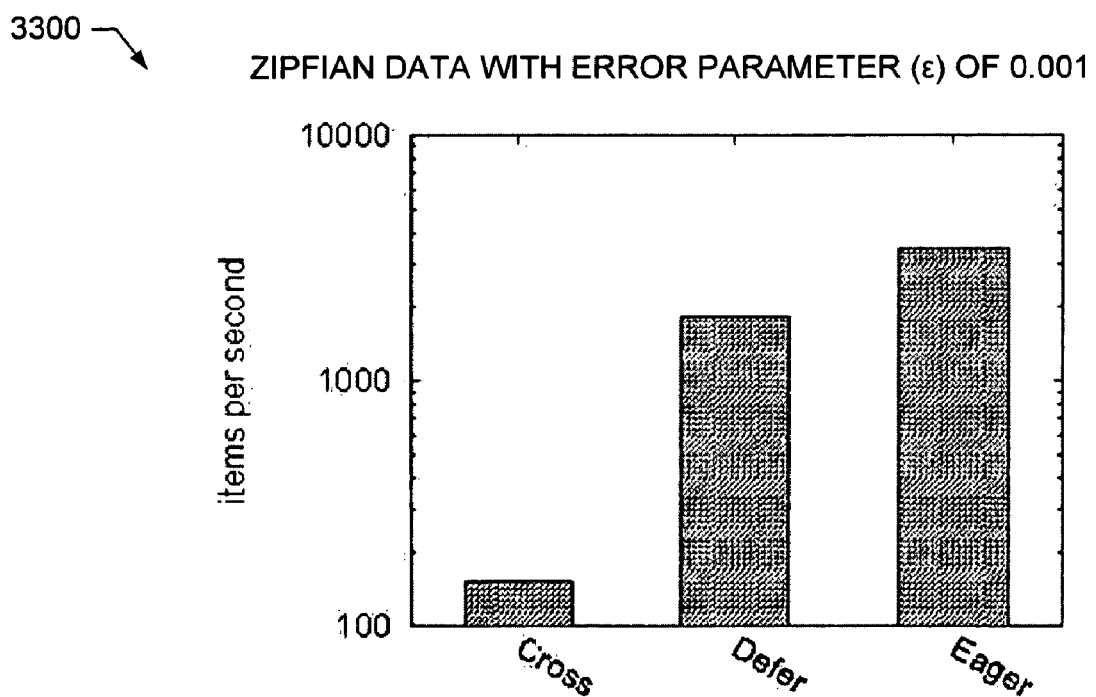
Figure 34:
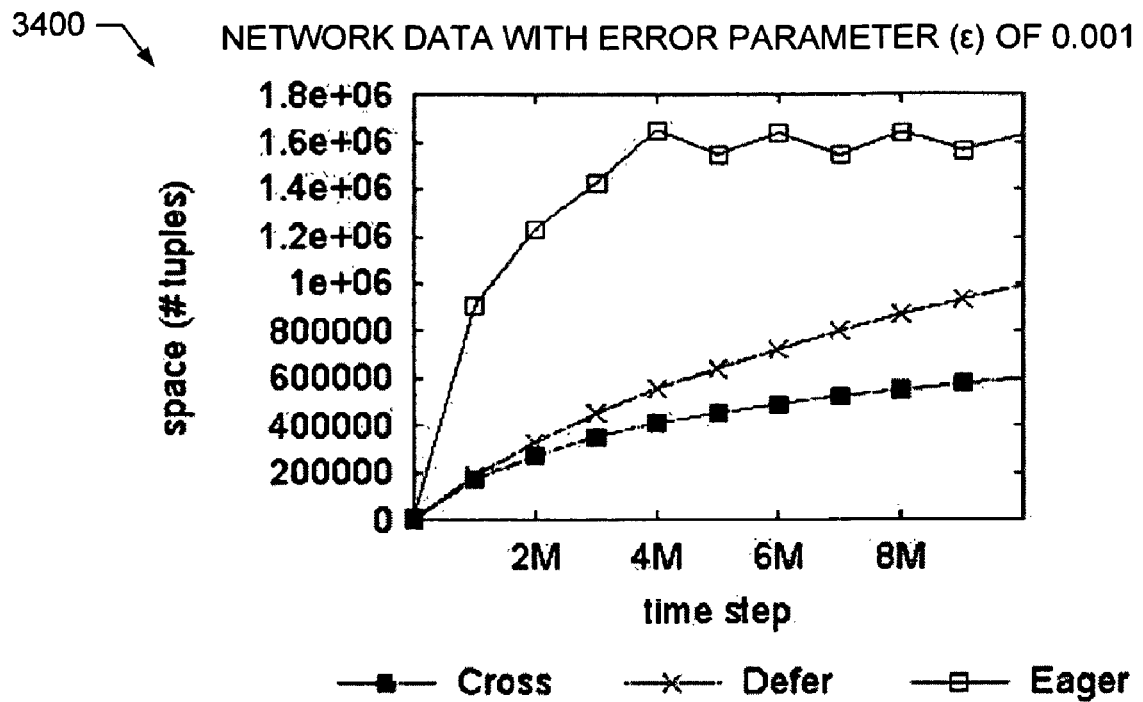
Figure 35:
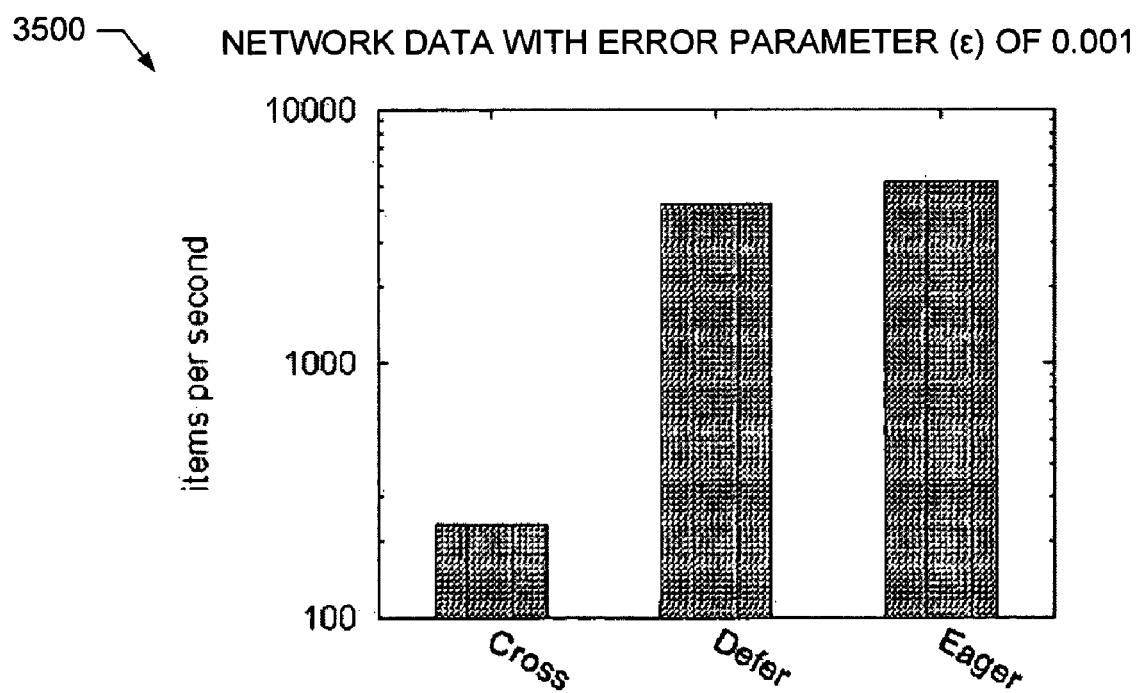

FIGS. 24 29 depict example space usage plots 2400, 2600 and 2800 and throughput comparison plots 2500, 2700 and 2900 (each in a log scale) for the different example summary data implementations (GK×GK cross-product, GK×QD deferred-merge and QD×QD eager-merge) each with a configured error parameter of $\epsilon=0.01$. FIGS. 30-35 depict example space usage plots 3000, 3200 and 3400 and throughput comparison plots 3100, 3300 and 3500 (each in a log scale) for the different example summary data implementations (GK×GK cross-product, GK×QD deferred-merge and QD×QD eager-merge) each with a configured error parameter of $\epsilon=0.001$. To generate each plot, the corresponding example summary data implementations was executed for a sufficient amount of data so that the space usage curves could be seen to level off and converge to approximately stable values. As can be seen from the example plots, none of the algorithms was the best performer in all cases. Furthermore, space usage and performance were not always correlated, as some scenarios exhibited a space-time trade-off.

Figure 28:
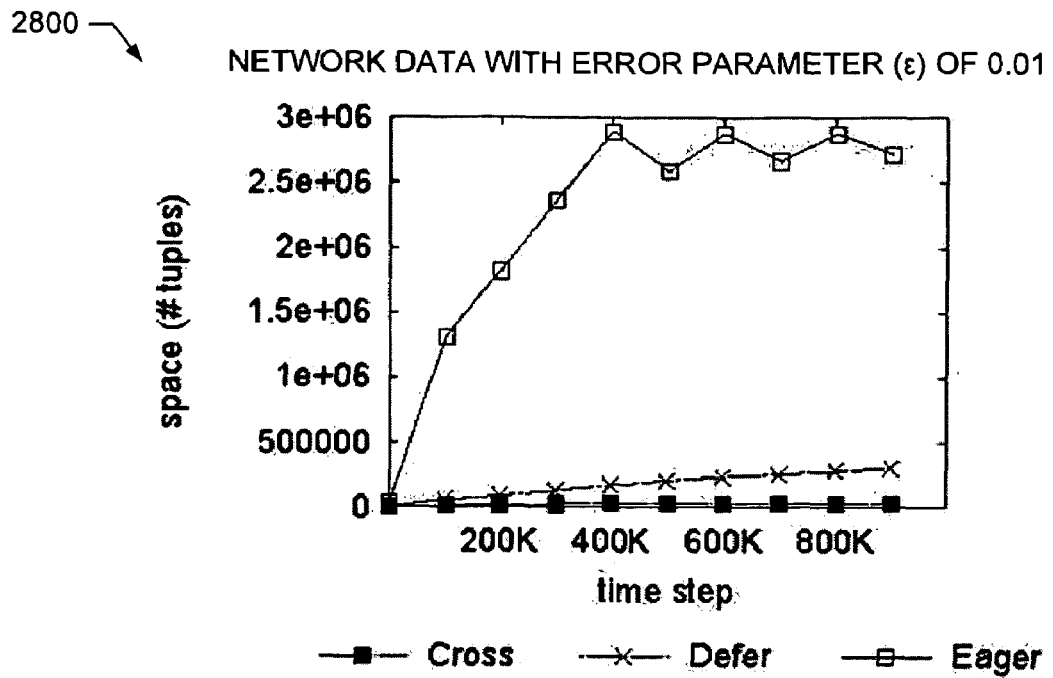

Data skew affected space usage and performance. For example, in general, there was smaller space and faster runtime with increasing skew. Furthermore, the GK technique (in one-dimension) is impervious to the actual data values because it utilizes rank-ordering, whereas the QD technique is a universe-based technique that can benefit from data non-uniformity. This effect of data skew on space size for QD-based techniques can be seen from comparing the space usage plot 2400 corresponding to uniform data and space usage plot 2600 corresponding to Zipfian data shown in FIGS. 24 and 26, respectively. The space usage plots 2400 and 2600 exhibit a gap between the curves for the eager-merge technique (based on QD) relative to the cross-product technique (based on GK) that narrows significantly when the input data is Zipfian (skewed) rather than uniform. Indeed, real data is often skewed, as is the case with flow data, although the flow data set was not quite as skewed as the Zipfian data set. Thus, the space usage plot 2800 corresponding to network data shown in FIG. 28 is more similar to the space usage plot 2600 corresponding to Zipfian data than the space usage plot 2400 corresponding to uniform data. Additionally, the deferred-merge algorithm, implemented using a hybrid of GK for the x-axis summary data structure and QD for the y-axis summary data structure approaches, exhibits asymmetric space usage for skewed input data and is more efficient when the attribute with higher skew is in the y-axis. For example, a difference of up to a factor of five in the space usage of the deferred-merge technique was observed by swapping the ordering of the x- and y-axes.

Another factor that can affect performance is correlation between attributes, as observed using bivariate Gaussian data of differing covariances. For example, the cross-product technique exhibits better space usage with increasing correlation because the cross-product effectively becomes one-dimensional, whereas correlation was observed to have little impact on the other summary data implementation techniques. Real data, such as flow packets and bytes, often exhibits correlations. Skew, which did not substantially benefit the cross-product technique but benefited the other summary data implementation techniques, appeared to be more significant in the examined experimental scenarios.

In the streaming scenario, throughput can be a more significant concern than space efficiency. For example, the Gigascope high-level query processor can make use of as much RAM as is available. When implemented in the Gigascope system, the deferred-merge summary data technique is a safe choice as, in the observed experiments, it achieved higher throughput than the cross-product implementations, often by 1-2 orders of magnitude, while being competitive with respect to space usage. Additionally, the deferred-merge summary data technique exhibited as good or better performance than the eager-merge implementation, with significantly better space usage. In some cases, such as the uniform data scenario with $\epsilon=0.001$ corresponding to the space usage plot 3000 and throughput comparison plot 3100 of FIGS. 30 and 31, respectively, the space usage of the eager-merge technique grew so large that it exceeded the available RAM size, causing the system to thrash and resulting in poor throughput.

In another experiment, the Gigascope system was used to implement example statistical dominance processors 105 using cross-product, deferred-merge and eager-merge techniques, and was configured to maintain per-minute ($\phi$, $\alpha$)-quantiles with $\epsilon=0.01$ over a cumulative window of pairs of approximate flow aggregates. These flow aggregates were computed by grouping on (srcIP, destIP, srcPort, destPort, svcByte) over one minute intervals, summing the number of packets and bytes in each group, and then computing ($\phi$, $\alpha$)-quantiles on data points representing (numPkts, numBytes). As a baseline, a null aggregate was performed which simply counted the number of flow-groups per minute. The observed number of groups was consistently between 130-140K and the CPU utilization stayed below 85% during null aggregate processing. However, when the example statistical dominance processor implementations were examined, the eager-merge technique performed unreliably under the experimental conditions, and could not keep up with even the lower flow rates. For example, less than 30K tuples were processed per minute, with this number decreasing over the run of the query. Such throughput degradation indicates the eager-merge techniques exhibited significant processing delays when implemented in a Gigascope system. Furthermore, the observed query output time was erratic, with reporting intervals as long as 4 minutes and as short as 1 second, apparently due to attempts by the CPU to catch up when resources became available. However, over time, CPU utilization rose to above 99%. In contrast, the deferred-merge technique as implemented on the Gigascope system was observed to have processing rates similar to the null aggregate (130-140K per minute) and query outputs occurred at regular 1-minute intervals with no reporting delays. Furthermore, CPU utilization stayed at approximately 88%.

Figure 36:
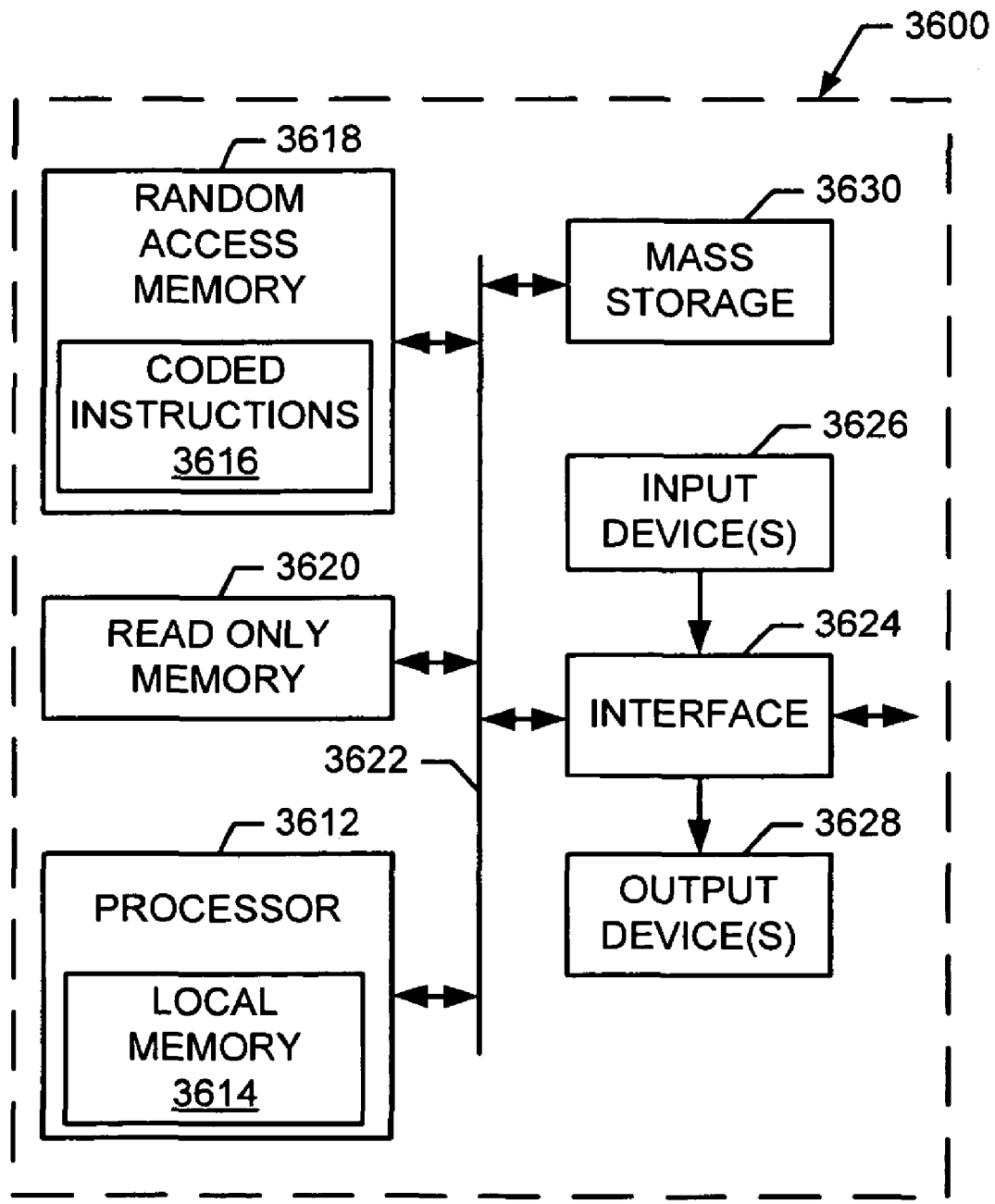
FIG. 36 is a block diagram of an example processing system that may execute the example machine readable instructions of FIGS. 21, 22 and/or 23 to implement the example statistical dominance processor of FIG. 2.

FIG. 36 is a block diagram of an example computer 3600 capable of implementing the apparatus and methods disclosed herein. The computer 3600 can be, for example, a server, a personal computer, a personal digital assistant (PDA), an Internet appliance, a DVD player, a CD player, a digital video recorder, a personal video recorder, a set top box, or any other type of computing device.

The system 3600 of the instant example includes a processor 3612 such as a general purpose programmable processor. The processor 3612 includes a local memory 3614, and executes coded instructions 3616 present in the local memory 3614 and/or in another memory device. The processor 3612 may execute, among other things, the machine readable instructions represented in FIG. 21 through FIG. 23. The processor 3612 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 3612 is in communication with a main memory including a volatile memory 3618 and a non-volatile memory 3620 via a bus 3622. The volatile memory 3618 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 3620 may be implemented by flash memory and/or any other desired type of memory device. Access to the main memory 3618, 3620 is typically controlled by a memory controller (not shown).

The computer 3600 also includes an interface circuit 3624. The interface circuit 3624 may be implemented by any type of interface standard, such as an Ethernet interface, a universal serial bus (USB), and/or a third generation input/output (3GIO) interface.

One or more input devices 3626 are connected to the interface circuit 3624. The input device(s) 3626 permit a user to enter data and commands into the processor 3612. The input device(s) can be implemented by, for example, a keyboard, a mouse, a touchscreen, a track-pad, a trackball, an isopoint and/or a voice recognition system.

One or more output devices 3628 are also connected to the interface circuit 3624. The output devices 3628 can be implemented, for example, by display devices (e.g., a liquid crystal display, a cathode ray tube display (CRT)), by a printer and/or by speakers. The interface circuit 3624, thus, typically includes a graphics driver card.

The interface circuit 3624 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 3600 also includes one or more mass storage devices 3630 for storing software and data. Examples of such mass storage devices 3630 include floppy disk drives, hard drive disks, compact disk drives and digital versatile disk (DVD) drives.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to determine statistical dominance point descriptors for a multidimensional data set, the method comprising:

determining, using a programmable processor, a first joint dominance value for a first data point in the multidimensional data set, each data point in the multidimensional data set comprising a multidimensional value, each dimension of the multidimensional value corresponding to a different measurement of a physical event, the first joint dominance value corresponding to a number of data points in the multidimensional data set dominated by the first data point in every dimension;

determining, using the programmable processor, a first skewness value for the first data point, the first skewness value corresponding to a size of a first dimension of the first data point relative to a combined size of all dimensions of the first data point; and combining, using the programmable processor, the first joint dominance value and the first skewness value to determine a first statistical dominance point descriptor associated with the first data point.

2. A method as defined in claim 1 further comprising:
storing the multidimensional data set in a computer memory; and
presenting the first joint dominance value via a graphical user interface.

3. A method as defined in claim 1 wherein the physical event corresponds to data network traffic, a first dimension of the multidimensional value corresponds to first measurements of numbers of packets in a data flow included in the data network traffic, and the second dimension of the multidimensional value corresponds to second measurements of numbers of bytes included in the packets in the data flow.

4. A method as defined in claim 1 wherein the physical event corresponds to an examination taken by a plurality of participants, the examination producing a plurality of measured scores for each participant, a first dimension of the multidimensional value corresponds to first measured scores attained by the plurality of participants and the second dimension of the multidimensional value corresponds to second measured scores attained by the plurality of participants.

5. A method as defined in claim 1 further comprising:
obtaining specified second joint dominance and skewness values;
identifying a first subset of data points in the multidimensional data set associated with joint dominance values less than or equal to the specified second joint dominance value;
identifying a second subset of data points in the multidimensional data set associated with skewness values less than or equal to the specified second skewness value;
identifying a third subset of data points comprising an intersection of the first and second subsets of data points;
identifying a fourth subset of data points comprising those data points in the third subset of data points that are not jointly dominated by any other data point in the third subset of data points; and
identifying a second data point in the multidimensional data set to be associated with a second statistical dominance point descriptor corresponding to the specified second joint dominance and skewness values, the second data point identified as being associated with a largest skewness value relative to all other data points in the fourth subset of data points.

6. A method as defined in claim 1 wherein determining the first joint dominance value for the first data point comprises:
determining a count of the number of data points in the multidimensional data set jointly dominated by the first data point, wherein the first data point jointly dominates a second data point when a first dimensional value of the first data point is greater than or equal to a first dimensional value of the second data point and a second dimensional value of the first data point is greater than or equal to a second dimensional value of the second data point; and
dividing the determined count by a total number of data points in the multidimensional data set.

7. A method as defined in claim 1 further comprising:
obtaining a specified second joint dominance value; and
determining a joint dominance quantour corresponding to the specified second joint dominance value, the joint dominance quantour comprising a subset of data points in the multidimensional data set associated with joint dominance values less than or equal to the specified second joint dominance value, each data point in the subset of data points also not being jointly dominated by any other data point in the subset of data points.

8. A method as defined in claim 1 wherein determining the skewness value for the first data point comprises:
determining a first rank of the first data point in the first dimension, the first rank corresponding to the size of the first dimension of the first data point;
determining a second rank of the first data point in a second dimension; and
dividing the first rank by a sum of the first and second ranks, the sum of the first and second ranks corresponding to the combined size of all dimensions of the first data point.

9. A method as defined in claim 1 further comprising:
obtaining a specified second skewness value; and
determining a skewness radial corresponding to the specified second dominance-skewness value, the skewness radial comprising a subset of data points in the multidimensional data set associated with skewness values less than or equal to the specified second skewness value, each data point in the subset of data points also having first dimensional values that are not less than and second dimensional values that are not greater than, respectively, corresponding first and second dimensional values of any other point in the subset of data points.

10. A method as defined in claim 1 wherein the multidimensional data set comprises a first summary data set, and further comprising:
obtaining a second measured data set comprising measured data points obtained by measuring the physical event;
summarizing the second measured data set to determine the first summary data set; and
storing the first summary data set in a computer memory, an amount of memory required to store the first summary data set being less than an amount of memory that would be required to store the second measured data set.

11. A method as defined in claim 10 wherein the summary data set comprises a first dimensional sequence of tuples, a second dimensional sequence of tuples and a two-dimensional data summary indexed by the first and second dimensional sequences of tuples, each tuple comprising (1) a value of one measured data point lying in the data value range represented by the tuple and (2) a count of the number of measured data points lying in the data value range represented by the tuple, and wherein summarizing the second measured data set to determine the first summary data set comprises:
inserting a first dimensional value of a measured data point from the measured data set into a first tuple included in the first dimensional sequence of tuples;
inserting a second dimensional value of the measured data point into a second tuple included in the second dimensional sequence of tuples;

inserting the measured data point into a cell of the two-dimensional data summary indexed by the first and second tuple by incrementing a count value associated with the cell; and compressing the first dimensional sequence of tuples, the second dimensional sequence of tuples and the two-dimensional data summary.

12. A method as defined in claim 10 wherein the summary data set comprises a first dimensional sequence of tuples and separate second dimensional sequences of tuples, each second dimensional sequence of tuples associated with a respective tuple in the first dimensional sequence of tuples, each tuple comprising (1) a value of one measured data point lying in the data value range represented by the tuple and (2) a count of the number of measured data points lying in the data value range represented by the tuple, and wherein summarizing the second measured data set to determine the first summary data set comprises:

inserting a first dimensional value of a measured data point from the measured data set into a first tuple included in the first dimensional sequence of tuples;

inserting a second dimensional value of the measured data point into a second tuple included in a particular second dimensional sequence of tuples indexed by the first tuple; and compressing the first dimensional sequence of tuples and the second dimensional sequences of tuples.

13. A method as defined in claim 10 wherein the summary data set comprises a first dimensional hierarchical arrangement of tuples and separate second dimensional hierarchical arrangements of tuples, each second dimensional hierarchical arrangement of tuples associated with a respective tuple in the first dimensional hierarchical arrangement of tuples, each tuple comprising (1) a value of one measured data point lying in the data value range represented by the tuple and (2) a count of the number of measured data points lying in the data value range represented by the tuple, and wherein summarizing the second measured data set to determine the first summary data set comprises:

inserting a first dimensional value of a measured data point from the measured data set into a first tuple included in the first dimensional hierarchical arrangement of tuples;

inserting a second dimensional value of the measured data point into respective second tuples included in corresponding second dimensional hierarchical arrangements of tuples indexed by the first tuple and all ancestors of the first tuple included in the first dimensional hierarchical arrangement of tuples; and compressing the first dimensional hierarchical arrangement of tuples and the second dimensional hierarchical arrangements of tuples.

14. A tangible article of manufacture storing machine readable instructions which, when executed, cause a machine to at least:

store a multidimensional data set in a computer memory;

determine a first joint dominance value for a first data point in the multidimensional data set, each data point in the multidimensional data set comprising a multidimensional value, the first joint dominance value corresponding to a number of data points in the multidimensional data set dominated by the first data point in every dimension;

determine a first skewness value for the first data point, the first skewness value corresponding to a size of a first dimension of the first data point relative to a combined size of all dimensions of the first data point;

combine the first joint dominance value and the first skewness value to determine a first statistical dominance point descriptor associated with the first data point; and present the first joint dominance value via a graphical user interface.

15. An article of manufacture as defined in claim 14 wherein the machine readable instructions, when executed, further cause the machine to:

obtain specified second joint dominance and skewness values;

identify a first subset of data points in the multidimensional data set associated with joint dominance values less than or equal to the specified second joint dominance value;

identify a second subset of data points in the multidimensional data set associated with skewness values less than or equal to the specified second skewness value;

identify a third subset of data points comprising an intersection of the first and second subsets of data points;

identify a fourth subset of data points comprising those data points in the third subset of data points that are not jointly dominated by any other data point in the third subset of data points; and identify a second data point in the multidimensional data set to be associated with a second statistical dominance point descriptor corresponding to the specified second joint dominance and skewness values, the second data point identified as being associated with a largest skewness value relative to all other data points in the fourth subset of data points.

16. A network monitoring device to determine statistical dominance point descriptors associated with monitoring network traffic, the network monitoring device comprising:

a data capture interface to obtain a two-dimensional data set, each data point in the data set comprising a first dimensional value corresponding to a first measurement of the data network traffic and a second dimensional value corresponding to a different second measurement of the data network traffic;

a joint dominance processor to determine a first joint dominance value for a first data point in the two-dimensional data set, the first joint dominance value corresponding to a number of data points in the data set dominated by the first data point in both dimensions;

a skewness processor to determine a first skewness value for the first data point, the first skewness value corresponding to a size of the first dimensional value of the first data point relative to a combined size of the first and second dimensional values of the first data point; and a dominance-skewness quantile processor to at least one of (1) combine the first joint dominance value and the first skewness value to determine a first statistical dominance point descriptor associated with the first data point, or (2) identify a second data point associated with a second statistical dominance point descriptor corresponding to specified second joint dominance and skewness values.

17. A network monitoring device as defined in claim 16 further comprising a presentation interface to present at least one of the first statistical dominance point descriptor determined to be associated with the first data point or the second data point identified as being associated with the second statistical dominance point descriptor.

18. A network monitoring device as defined in claim 16 wherein the dominance-skewness quantile processor is further to:

identify a first subset of data points in the two-dimensional data set associated with joint dominance values less than or equal to the specified second joint dominance value;

identify a second subset of data points in the two-dimensional data set associated with skewness values less than or equal to the specified second skewness value;

identify a third subset of data points comprising an intersection of the first and second subsets of data points;

identify a fourth subset of data points comprising those data points in the third subset of data points that are not jointly dominated by any other data point in the third subset of data points; and identify the second data point in the two-dimensional data set that is to be associated with the second statistical dominance point descriptor corresponding to the specified second joint dominance and skewness values, the second data point identified as being a particular point in the fourth subset of data points associated with a largest skewness value relative to all other data points in the fourth subset of data points.

19. A network monitoring device as defined in claim 16 wherein the joint dominance processor is further to:

determine a count of the number of data points in the two-dimensional data set jointly dominated by the first data point, wherein the first data point jointly dominates a third data point when the first dimensional value of the first data point is greater than or equal to the first dimensional value of the third data point and the second dimensional value of the first data point is greater than or equal to the second dimensional value of the third data point; and dividing the determined count by a total number of data points in the multidimensional data set to determine the first joint dominance value for the first data point.

20. A network monitoring device as defined in claim 16 wherein the skewness processor is further to determine a first rank associated with the first dimensional value of the first data point;

determine a second rank associated with the second dimensional value of the first data point; and divide the first rank by a sum of the first and second ranks to determine the first skewness value for the first data point.

* * * * *